(12) United States Patent
Wilks

(10) Patent No.: US 12,540,462 B2
(45) Date of Patent: Feb. 3, 2026

(54) WASHABLE FAUCET LEVER WITH CAM-ACTIVATED DETERGENT DISPENSER

(71) Applicant: Freeman Wilks, Sunrise, FL (US)

(72) Inventor: Freeman Wilks, Sunrise, FL (US)

( * ) Notice: Subject to any disclaimer, the term of this patent is extended or adjusted under 35 U.S.C. 154(b) by 0 days.

(21) Appl. No.: 18/704,780

(22) PCT Filed: Dec. 4, 2023

(86) PCT No.: PCT/US2023/082397
§ 371 (c)(1),
(2) Date: Apr. 25, 2024

(87) PCT Pub. No.: WO2024/119199
PCT Pub. Date: Jun. 6, 2024

(65) Prior Publication Data
US 2025/0283313 A1 Sep. 11, 2025

Related U.S. Application Data

(60) Provisional application No. 63/475,719, filed on Dec. 3, 2022.

(51) Int. Cl.
*E03C 1/046* (2006.01)
*E03C 1/04* (2006.01)

(52) U.S. Cl.
CPC ............ *E03C 1/046* (2013.01); *E03C 1/0412* (2013.01)

(58) Field of Classification Search
CPC ..... E03C 1/046; F16K 31/60; Y10T 137/4245
See application file for complete search history.

(56) References Cited

U.S. PATENT DOCUMENTS

| 2,625,176 | A | * | 1/1953 | Williams | ................ E03C 1/046 261/DIG. 26 |
| 3,439,698 | A | * | 4/1969 | De May | ..................... B60S 3/04 137/268 |
| 5,711,329 | A | * | 1/1998 | Soon | ..................... E03C 1/0412 239/113 |
| 8,100,299 | B2 | | 1/2012 | Phelps | |
| 11,982,074 | B2 | * | 5/2024 | Wilks | ........................ E03C 1/04 |

(Continued)

FOREIGN PATENT DOCUMENTS

KR 2019075708 A 7/2019

*Primary Examiner* — Reinaldo Sanchez-Medina
(74) *Attorney, Agent, or Firm* — Johnson Dalal; Mark C. Johnson

(57) ABSTRACT

A washable faucet lever with cam-activated detergent dispenser having a lever cartridge having a stem operably coupled to a hand lever and a cam member configured to rotate in a cam axis of rotation parallel to and simultaneous with a lever axis of rotation, a detergent reservoir member configured to house a liquid detergent therein and that includes a reservoir valve, an encasement member defining an enclosed region therein and an outlet, and having an outlet valve, wherein the dispenser includes a piston disposed within the enclosed region, coupled to the cam member with a follower, and operably configured to translate within the enclosed region upon rotating the hand lever in the lever axis of rotation to selectively and simultaneously displace the reservoir valve and outlet valve to permit flow of the detergent through an internal channel of the reservoir member, into the enclosed region, and out through the outlet.

13 Claims, 63 Drawing Sheets

(56) References Cited

U.S. PATENT DOCUMENTS

2007/0023094 A1\* 2/2007 Young .................. F16K 31/602
                                              137/801
2018/0318886 A1\* 11/2018 Libbrecht ............... E03C 1/046
2020/0360947 A1    11/2020 Kohler
2022/0186477 A1     6/2022 Wilks \* cited by examiner

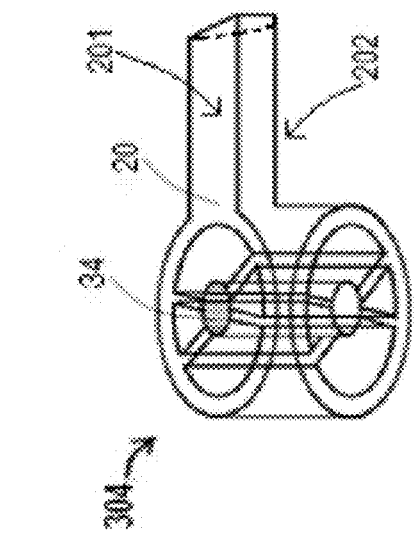
Fig. 11
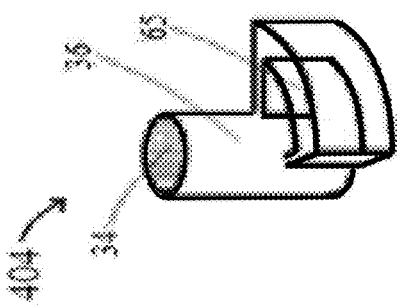
Fig. 13
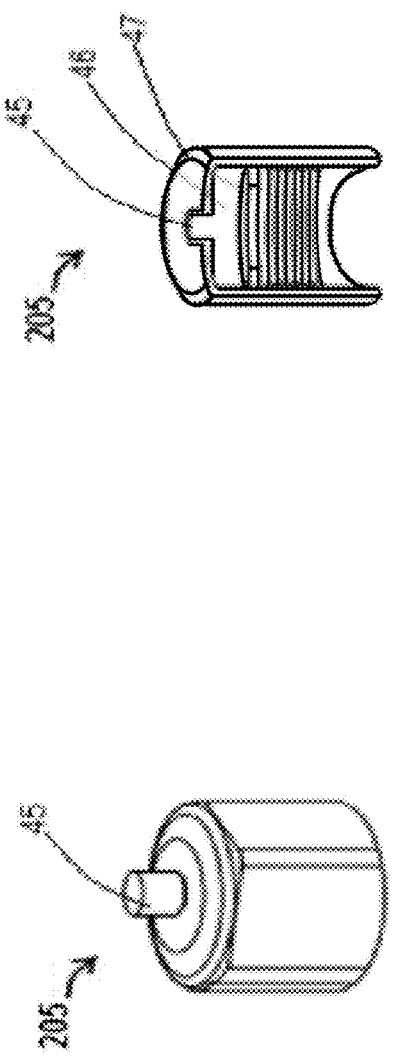
Fig. 10
Fig. 12
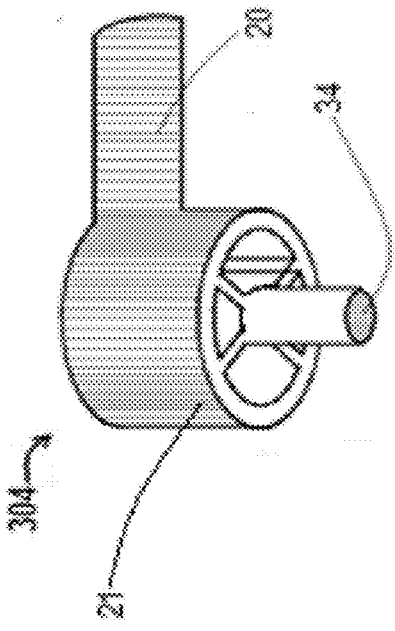
Fig. 9

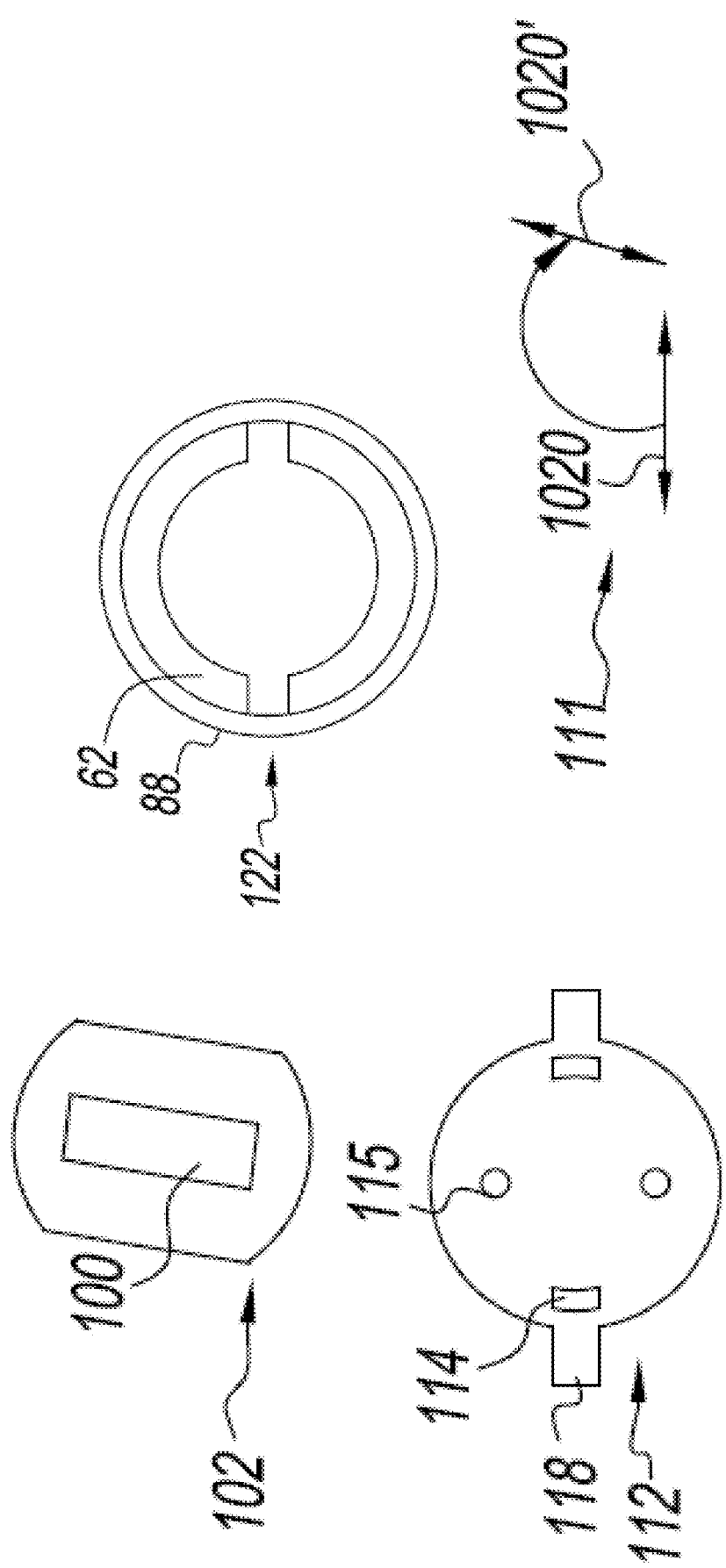

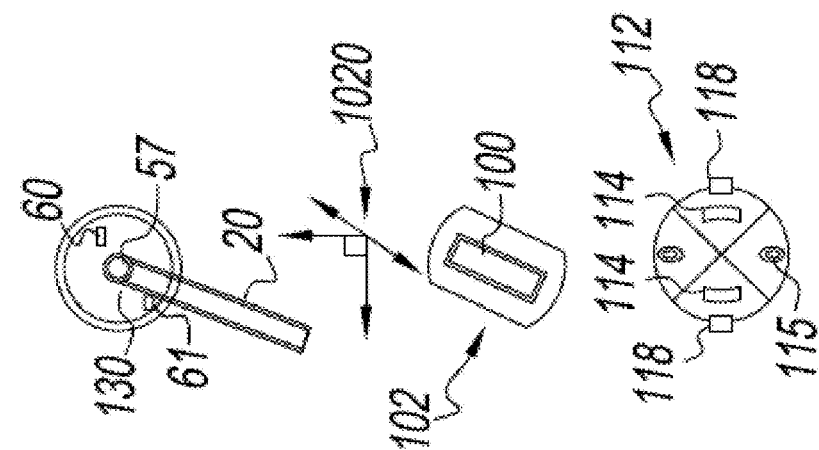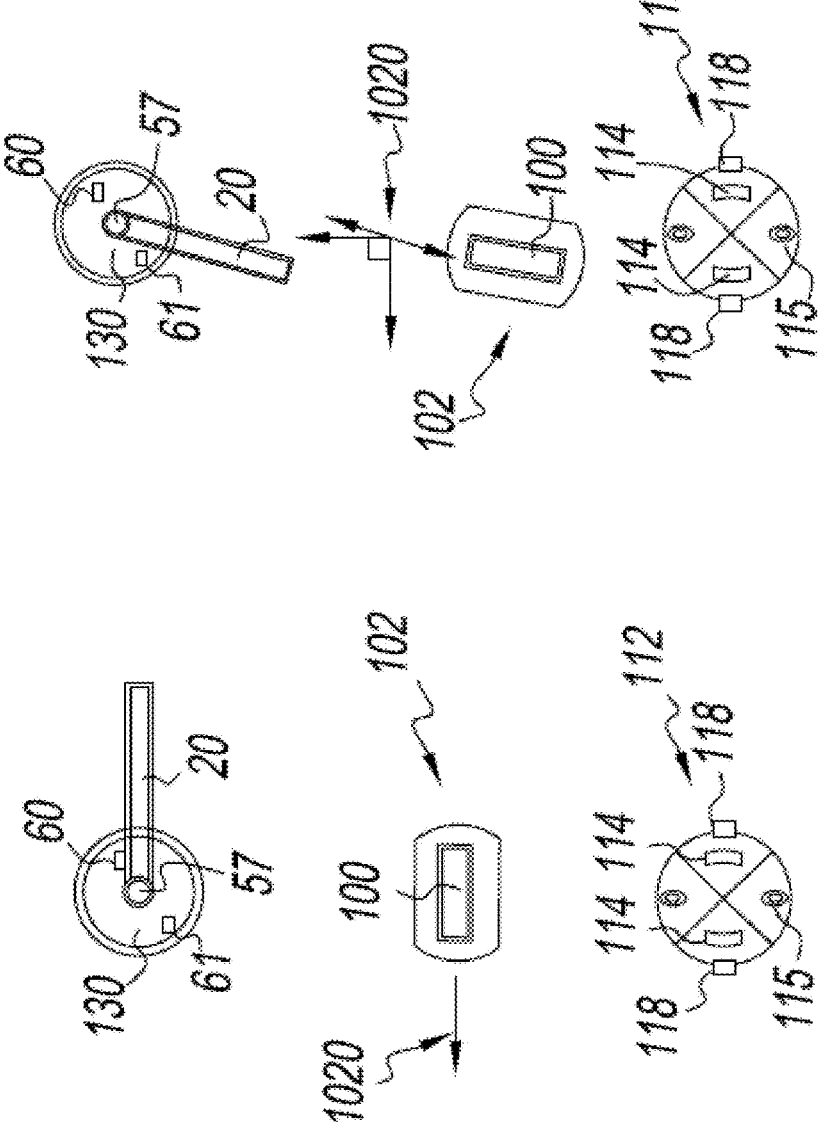
Fig. 33
Fig. 32
Fig. 31

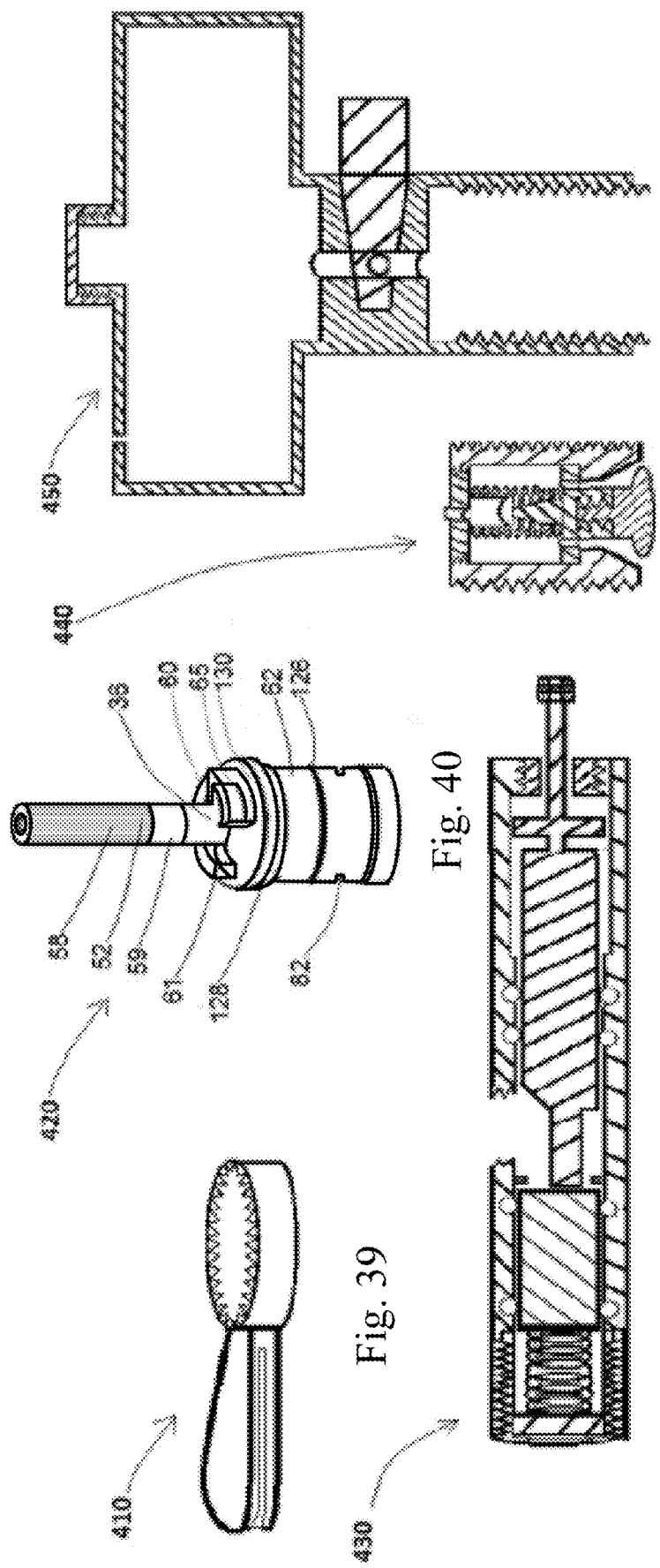

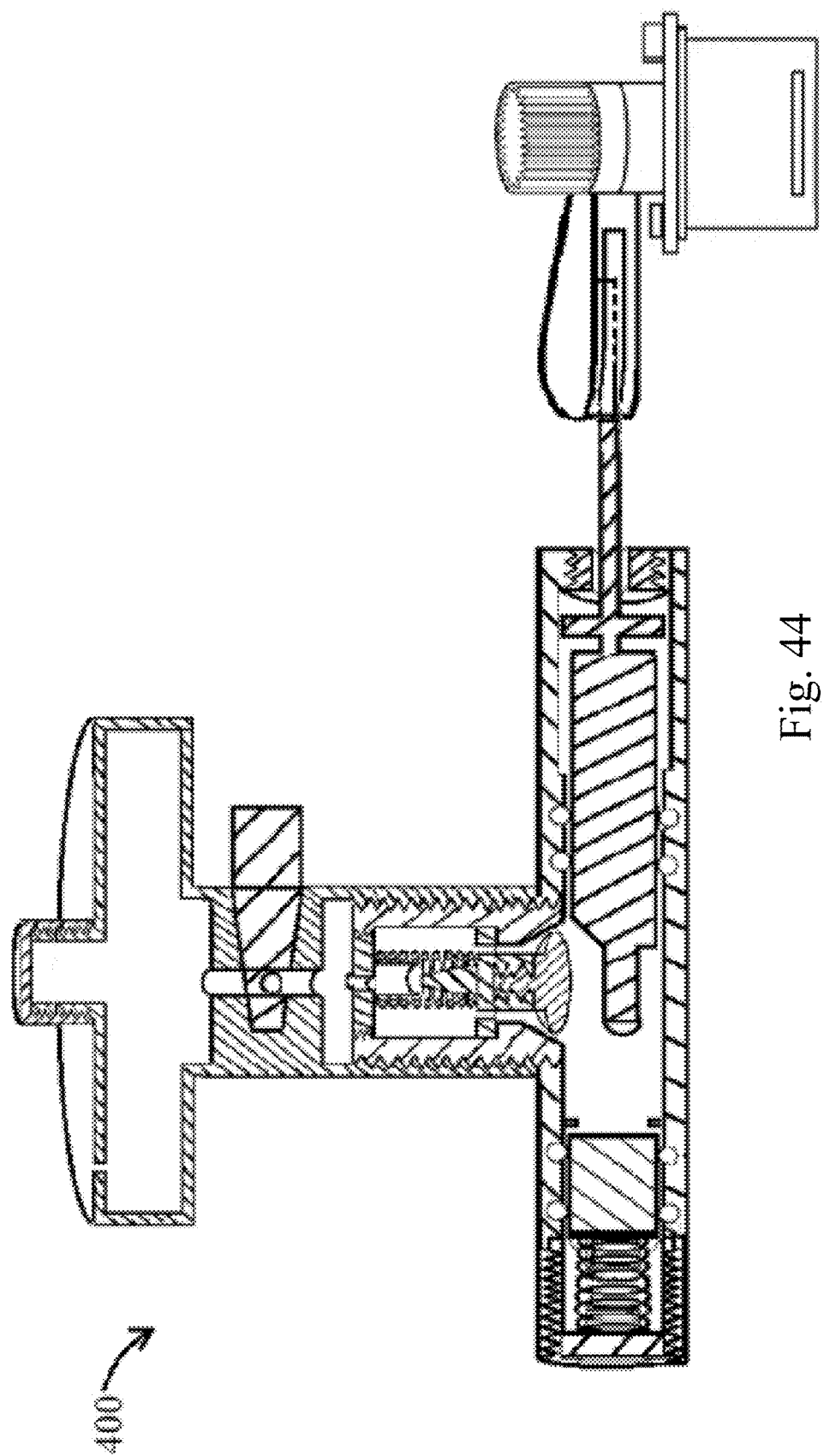

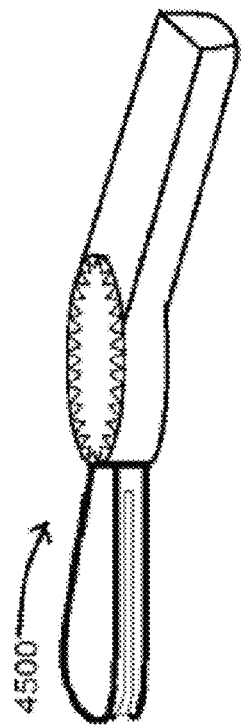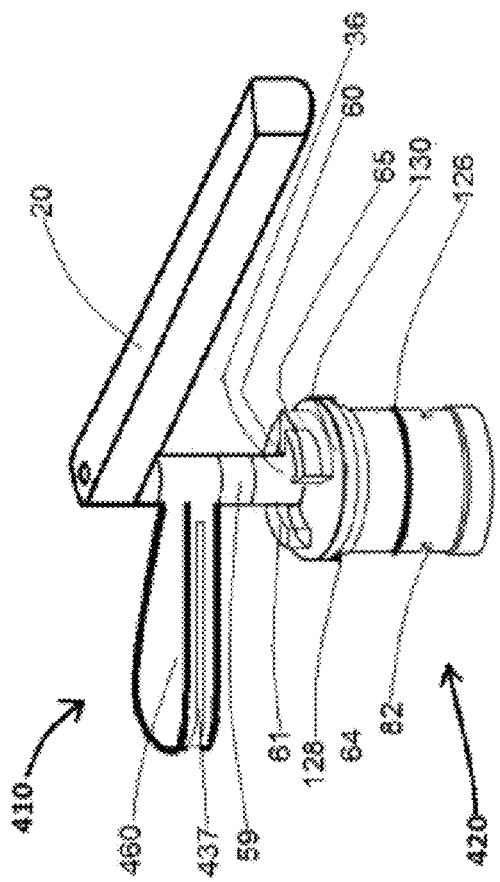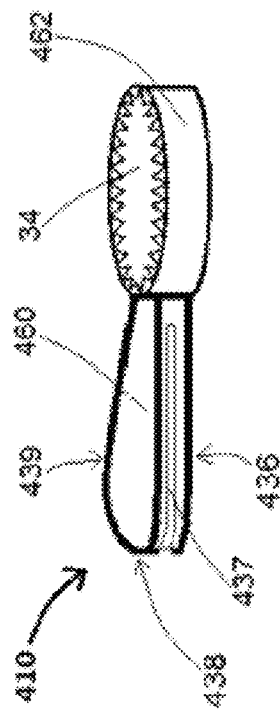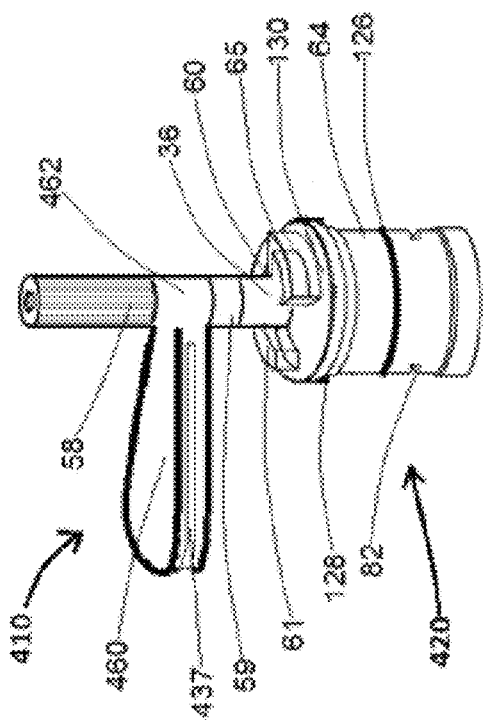

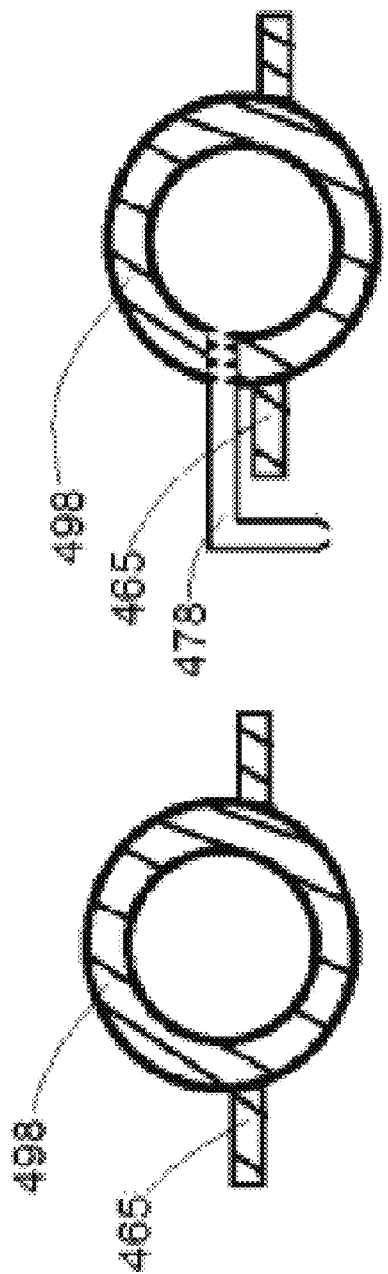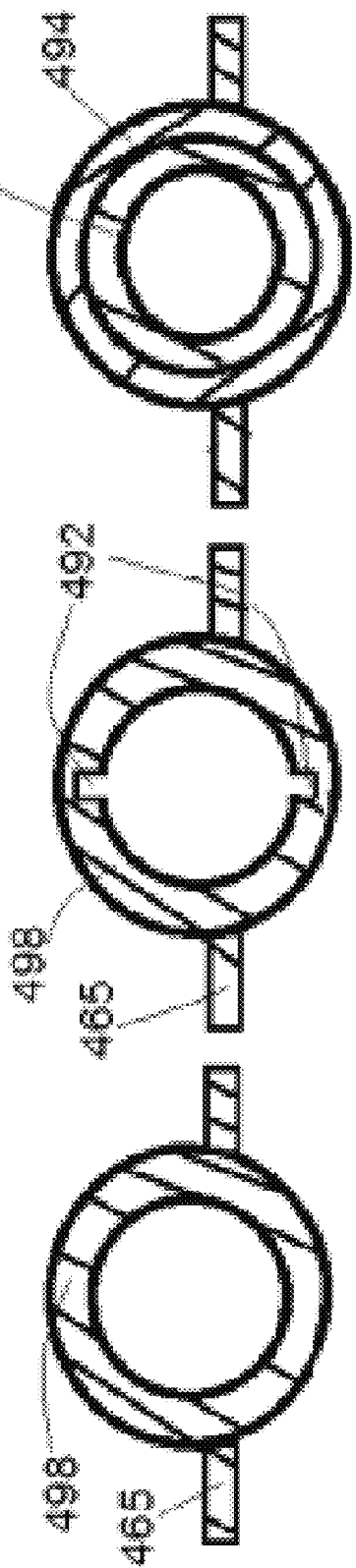

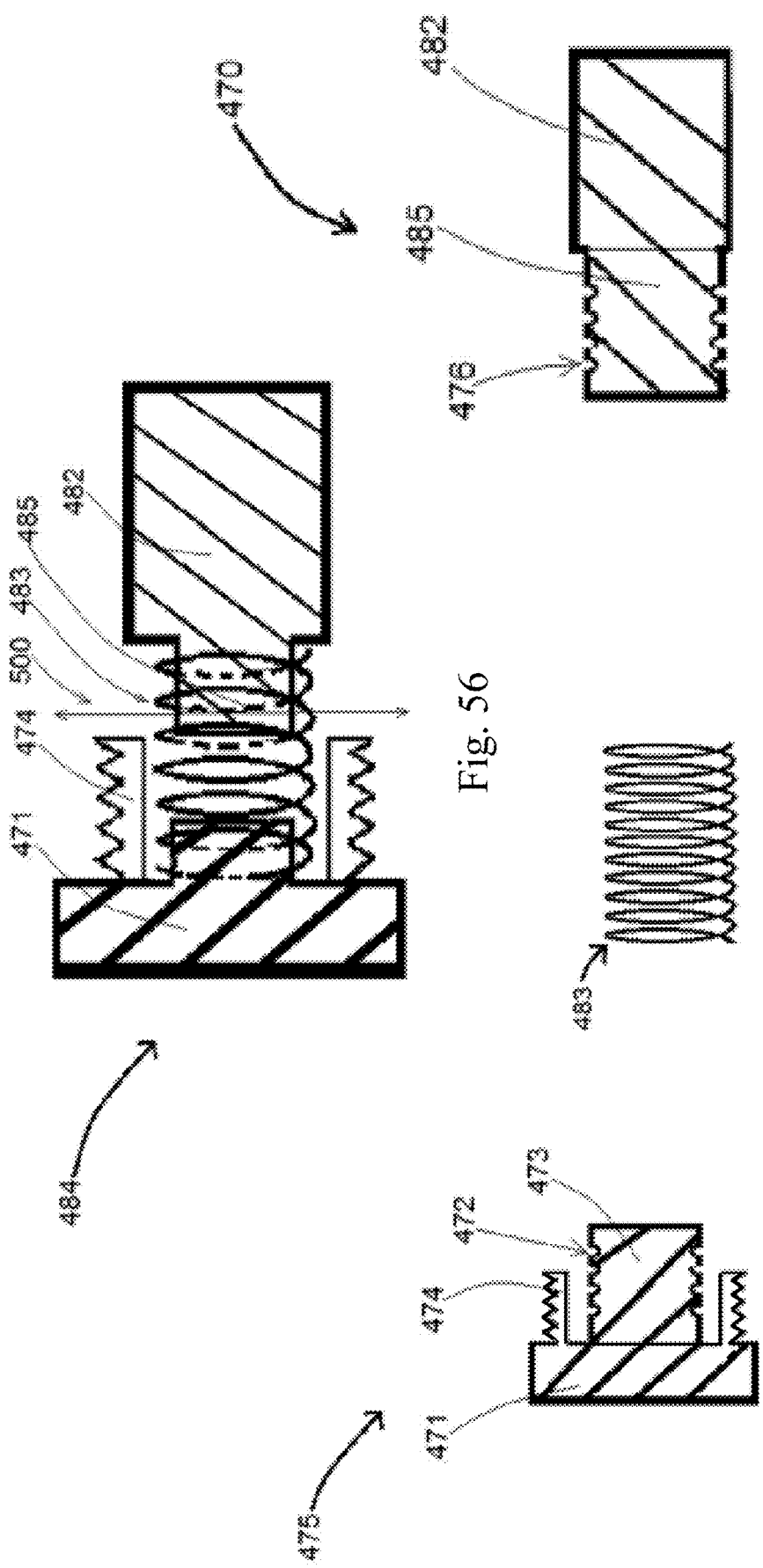

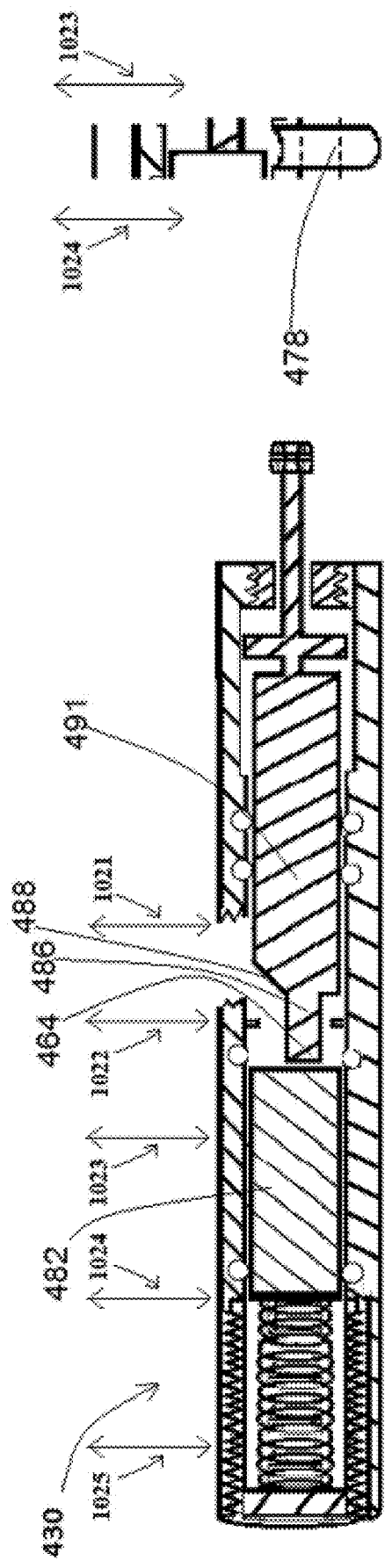

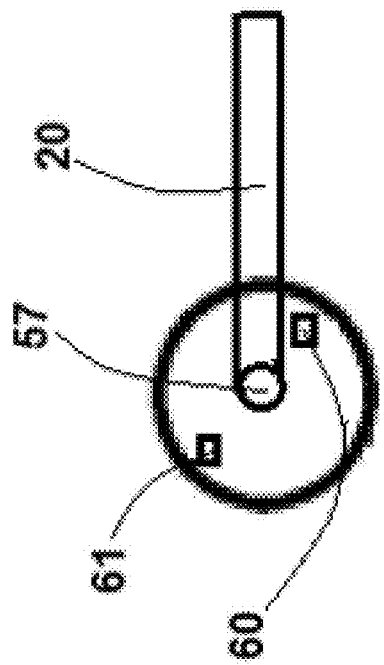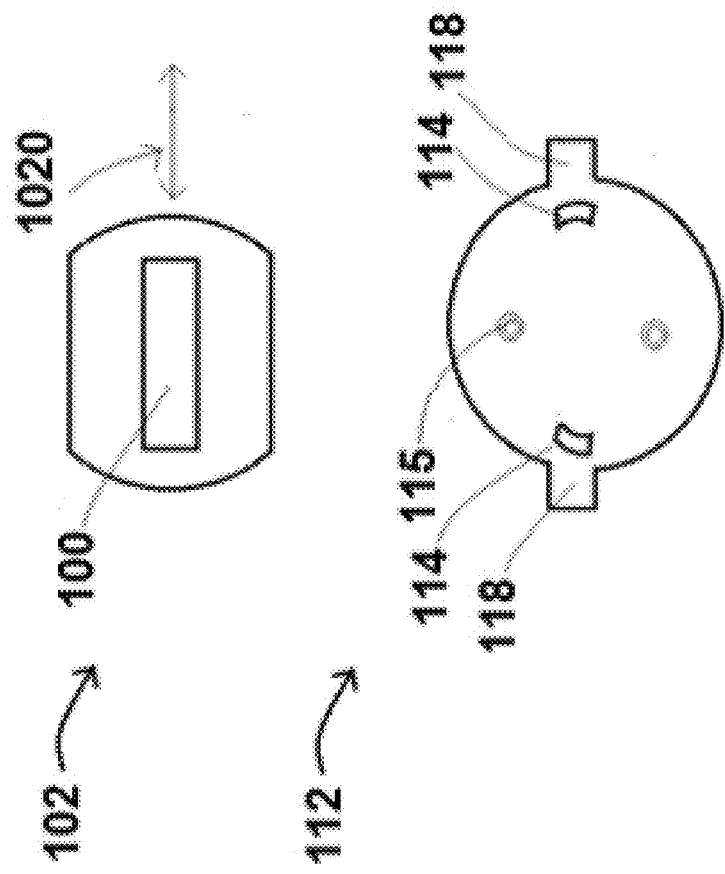
Fig. 89

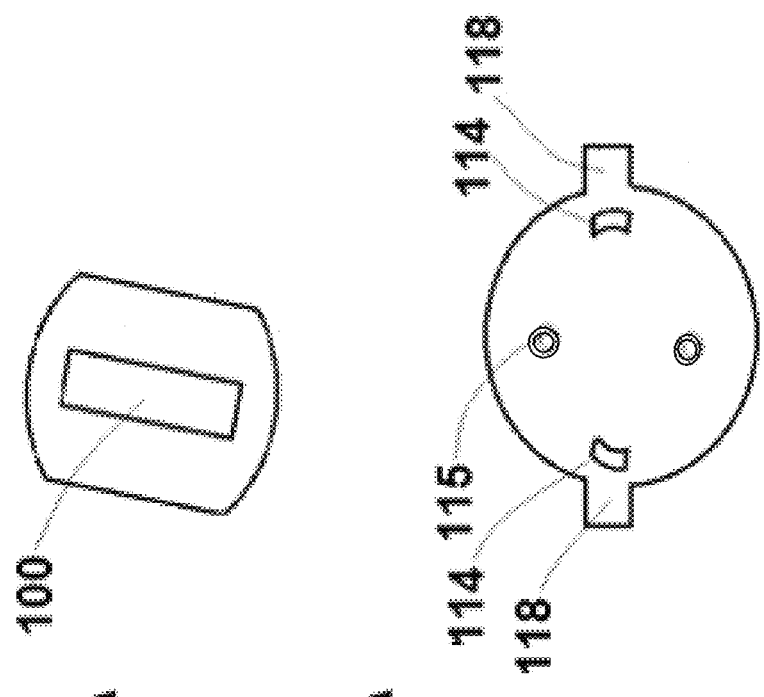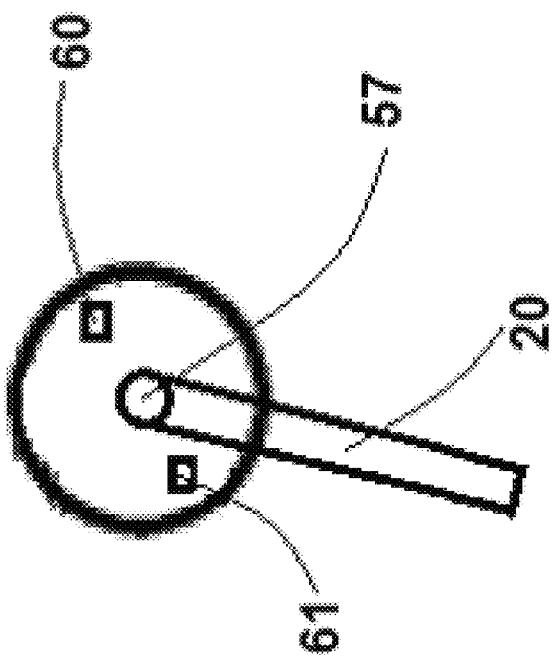
Fig. 91

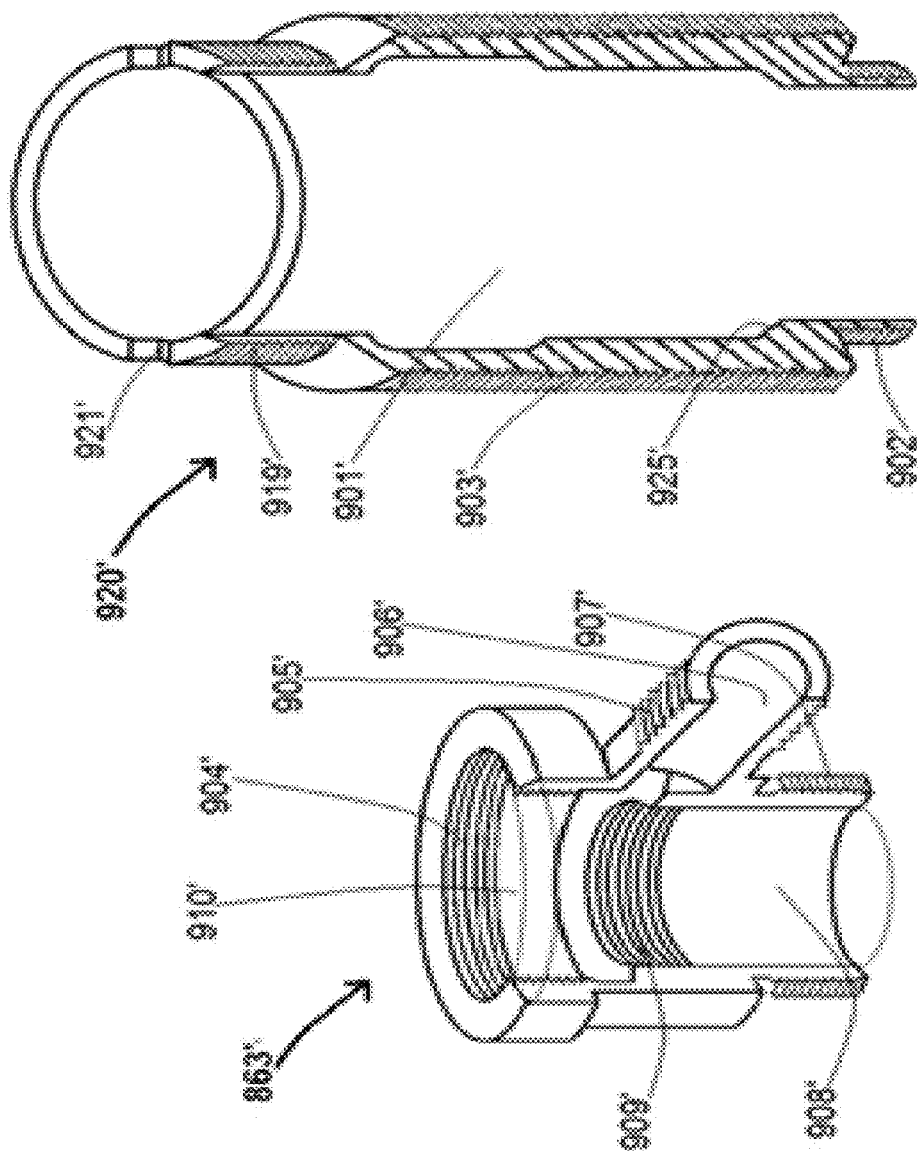
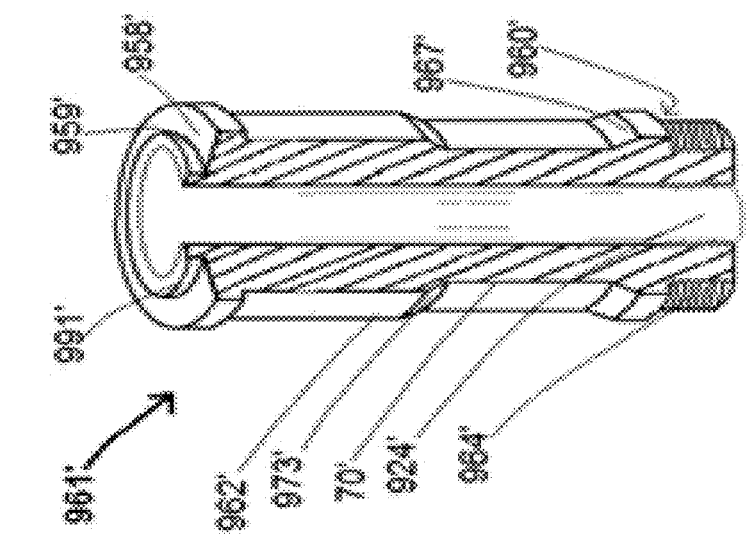
Fig. 103c
Fig. 103b
Fig. 103a

WASHABLE FAUCET LEVER WITH CAM-ACTIVATED DETERGENT DISPENSER

CROSS-REFERENCE

This application claims the benefit of provisional application Ser. No. 63/475,717 filed on Dec. 3, 2022 by the present inventor.

BACKGROUND TO INVENTION

The taps of bathroom faucets are usually activated by handles. Currently, handle-less faucets taps are predominantly located in restrooms of airports among other places. These handle-less faucets taps serve to significantly reduce the spread of contagious diseases that may have a devastating effect on the well-being of human beings amongst other possibilities. These faucets are not economical for most people and require maintenance by trained technicians for reliable and substantial continual and expected timely operation. Additionally, such faucets have a shorter life span in comparison to manually operated faucets.

Traditional manually operated faucets in homes are usually fitted with cartridge valves requiring a handle for their activation; consequently, everyone in a home or school or locations where faucets with handles are used is exposed to being infected by handle enabled faucets. Currently, handle enabled faucets require that a lever be turned through a right-angle handle for activation, however the spout is set apart from the handle; this is so because one is able to get water running by turning a lever handle through at most a right angle for current faucets.

Activating the lever can contaminate the lever handle with pathogens. After hands are washed for example, these same hands again are used to activate the lever in order to turn off the flow of water, consequently hands or other parts of the body may again be contaminated by the residual pathogens that initially were left on the lever before hand washing. Current faucets are not designed to wash the lever or dispense detergent or antibacterial solution when a faucet lever is activated.

There are many designs of manually operated faucet valves that exist; however, there is a need for a manually operated faucet enabled with a lever washable detergent dispensing capabilities. Furthermore for reasons of economy and human wellbeing such a lever washable detergent dispensing faucet should be affordable. Additionally, such a design of a lever washable detergent dish. sing faucet valve should be in keeping with creative modern faucet design features.

Additionally, the advent of globalization facilitates the rapid spread of diseases that could significantly impact world health and economies on large scale; such diseases previously were localized and thus did not pose a threat to the global economic or well being of humanity. It is conceivable that there are unknown pathogens and that there will always be the threat of life-threatening pathogens at this point of global human development and beyond.

Electronic eye faucets or handle-less faucets are available, for example, as seen in Stauffer, U.S. Pat. No. 4,767,922, entitled a Hand Presence Activated Water Faucet Controller, or in Chen, U.S. Pat. No. 9,347,207, entitled Faucet Assembly. However, these known faucets are not generally affordable by the global population in general. Consequently, a faucet system that inherently enables showering of the lever while being affordable thus mitigates the spread of pathogens in schools, homes and other institutions and facilities where people share the use of faucets.

Furthermore, by integrating a lever activated soap dispenser with a washable lever significant reduction in the transmission of pathogens can be achieved.

BRIEF SUMMARY

According to an embodiment of the disclosed subject matter, the invention provides greater protection against the transmission of pathogens such as the Covid-19 virus, H1N1 virus, flu virus and other transmittable pathogens and includes preferably a valve cartridge that operates efficiently while dispensing detergent and enabling washing of a lever handle when hands are being washed.

The invention includes a stem assembly that functions to enables the lever handle to be washed by water flowing from the spout of a bathroom faucet tap utilizing preferably a valve cartridge; this is enabled by appropriately dimensioning the length of the lever in relation to the positioning of the spout and faucet cartridge of the invention thus enabling the lever to intercept the line of flow of water from the spout of a faucet using preferably a cartridge valve. The stem also initiates a detergent dispensing unit to dispense detergent from a detergent dispensing unit while being enabled to reduce the rate of flow of solvent through the spout of the faucet unit when the lever is turned its maximum predetermined angle. The stability of the stem is also enabled by the application of a bonnet nut that stabilizes the stem to a cartridge mount. Embodiments of the invention enable detergent to be dispensed prior to the water from a faucet spout when the lever is initially turned or during timely rotation of the lever when water flows from the spout of the faucet as the lever is turned.

The faucet assembly may have at least one valve cartridge, the assembly comprising a faucet having at least one faucet handle; a fluid conduit influenced by the faucet handle for activating the cartridge valve, a faucet body having an outlet or spout for releasing fluid at an outlet end and an inlet end in fluid communication with the fluid conduit; a base for mounting the faucet handle and faucet body; the base having an upper surface and at least one cartridge comprising a cartridge body having an exterior surface, an interior surface defining a longitudinally extending passage extending from an inlet opening to an outlet opening, and at least one side opening extending transversely through the body from the interior surface to the exterior surface.

The stem of the cartridge unit is enabled with an upper end portion and a lower end portion. The upper end portion of the stem is enabled with means to rotate in reaction to the turning of a lever. The upper end portion is further enabled with means for initiating activation of a detergent dispensing unit and also with attachments enabling restriction the rotation of the lever to its predetermined maximum angle of rotation. The upper end portion extends outwardly beyond the outlet opening of the body when the stem member is situated in the passage of the body. The lower end portion is cylindrically configured to fit in rotatable relationship with the interior surface of the body when situated within the passage of the body. Additionally, the lower portion has a bottom surface configured to contact and interact with the upper surface of a moveable disc. The geometric side wall of the lower portion configured to fit within the passage of the body and in rotatable mirrored relationship with the interior surface of the body and with an inwardly extending sidewall portion defining at least one fluid receiving area wherein the receiving area is configured so that it can be rotated to align with the side opening in the body for allowing fluid flow out of the side opening of the body.

A fluid receiving area is somewhat parabolic in features and bordered by the surface of a fixed disc, the lower surface of the stem and one cartridge body sidewall opening.

The receiving area is configured so that it can be rotated to align with the side opening in the body for allowing fluid flow out of the side opening of the body; a stationary disk having at least one opening, but preferably two symmetrically arranged there through for allowing passage of fluid from an inlet opening of the body through the side opening of the body when the opening in the stationary disk is aligned with the fluid receiving area in the moveable disk, the stationary disk having a side wall capable of interacting with the interior surface of the body; and a sealing ring for stabilizing and retaining the stationary disk and moveable disk within the passage of the body, the sealing ring designed with tolerance simultaneously capable of mating with the body but ensuring stability and reliability. interacting stress on its function.

The exterior surface of the body preferably comprises at least one sealing groove for receiving a sealing component such as an o-ring. The exterior surface of the body may also be enabled with means for seating the valve cartridge within or on a fluid conduit; for example, the feature may be a locking tab and the body may comprise two diametric locking tabs on. The upper surface of the cartridge body may be enabled with means for limiting rotational movement of the valve cartridge when in use; for example, there may be two raised preferably rectangular prismatic shaped stop features on a circle of the upper body surface. The position of the raised stop features a function to restrict the rotation of the lever to its maximum predetermined angle of rotation. The lower end portion of the stem may have a groove on the exterior for receiving a seal, such as an o-ring, between the interior surface of the body and the lower end portion of the stem. The interior surface of the cartridge body may also be enabled with a groove near the inlet end of the body for receiving a sealing ring such as an o-ring. The sealing ring may be configured from silicone, nitrile rubber, fluoroelastomers or other appropriate allied sealing intervention.

The stationary disc and moveable disc are preferably configured from ceramic.

The stem preferably is made from metal, preferably stainless steel or brass. The body may be configured from metal such as brass, stainless steel, copper, nickel, alloy metal, polymeric or hard rubber such as polyether ketone, polymethylene copolymer or another compatible appropriate composite. The upper end cartridge body is preferably made from copper, brass, stainless steel. The lever handle is preferably configured from stainless steel.

The cartridge body preferably has two side openings, and the stationary disk preferably has two openings for allowing passage of water from the inlet opening of the body then through the side openings of the body when the openings in the stationary disk are aligned with the fluid receiving area in the moveable disk.

Preferably, there are two fluid receiving areas in the moveable disk, and the stationary disk is enabled with locking mechanism that is capable of mating with a mating groove on an exterior surface of the body thus ensuring restrictive rotary motion. The preferably two opening access on the stationary disk is further oppositely aligned to accommodate the function of the lever assembly; the function of the lever assembly is to ensure that the lever can be enabled for washing while ensuring convenient location of the lever relative to the function and positioning of faucet parts when not in use.

The relational distances between the base of the faucet spout and the base of the spindle handle a, the distance between the vertical line of fluid stream from the faucet spout and the base of the spout b and the distance be tween the vertical line of fluid stream and the base of the faucet handle c satisfy the relationship $\sqrt{a^2+b^2} \leq c$ The said washable lever handle initiate flow of solvent by activating rotation of the spindle thus a cam attached to the upper end of the stem will rotate when the lever is rotated, hence by attaching a cam to the lever where such a cam influences a follower with connection to a piston where the piston functions as a projection retraction activating unit for dispensing detergent significant reduction in the transmission of pathogens can be achieved.

DESCRIPTION OF DRAWINGS

The accompanying drawings, which are included to provide further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 9 shows a view of bonnet nut 205.

FIG. 10 shows a section through the bonnet nut of FIG. 9

FIG. 11 shows a view of the net of lever assembly 304.

FIG. 12 shows a view of the lever assembly of FIG. 11.

FIG. 13 shows a view of a stop interceptor.

FIG. 28 shows the stationary disc 112, orientation of the moveable disc 102 and a configurative template 122 for receiving stationary disc 112, moveable disc 102 when the system is in open mode.

FIG. 31 shows a configuration in closure mode of the cartridge of the orientation of lever 20, the stationary disc 112 and the moveable disc 102.

FIG. 32 shows a configuration of lever 20, the stationary disc 112 and the moveable disc 102 when the cartridge is in open mode and maximum rate of flow is enabled through spout 10. Lever 20 does not abut stop 61.

FIG. 33 shows a configuration of lever 20, the stationary disc 112 and the moveable disc 102 when the cartridge is in open mode and the lever 20 has turned its maximum predetermined angle thereby reducing flow. Lever 20 abuts stop 61.

FIG. 39 shows an embodiment of a cam unit 410.

FIG. 40 shows an embodiment of a cartridge unit 420.

FIG. 41 shows a section view of a detergent activation unit in a vertical plane of symmetry for an embodiment of a detergent activation unit 430.

FIG. 42 shows a section view of a valve for regulating detergent fluid from a fluid reservoir to a detergent activation unit 440.

FIG. 43 shows a section of an embodiment of a detergent reservoir unit 450.

FIG. 44 shows a configuration of the assembling cam unit, a cartridge unit, with a section view of the detergent activation, a section view valve, and a section view of the detergent reservoir.

FIG. 45 shows labeled parts of cam unit 410.

FIG. 45a shows an alternate configuration for a cam and lever handle combined.

FIG. 46 shows the positioning of cam unit 410 on cartridge unit 420. Bonnet nut 205 is not shown.

FIG. 47 shows the positioning of cam unit 410 and lever unit 305 on cartridge unit 420. Bonnet nut 205 is not shown.

FIGS. 50-54 show cross-sectional views of the encasement unit in accordance with one embodiment of the invention through line 465 in a vertical plane at right angles.

FIG. 56 shows a sectional view embodiment of a valve dispensing unit 484 in a plane with 471, 474 and 482 in a diametric plane.

FIG. 57 shows a section view of an embodiment end cap member 475 of the valve dispensing unit 430.

FIG. 58 shows an embodiment of the spring member for the valve dispensing unit 483.

FIG. 59 shows a section view of an embodiment of a member 470 for the valve dispensing unit 484.

FIG. 87a shows a phase of configuration of the detergent activation unit in the activation mode for a relation between the input of detergent and the output of detergent and the closing of the detergent inlet valve and the closing of the detergent outlet valve.

FIG. 89 shows a configuration of the lever, the moveable disc 102 and the fixed disc for the closed mode for FIG. 88

FIG. 91 shows a configuration of the lever, the moveable disc 102 and the fixed disc in the open mode for FIG. 90.

FIG. 93b shows a configuration for directing water from an inlet to the interior passage of 93a.

FIG. 103a shows an image of the configuration for interfacing with the cartridge unit and enabling water from an inlet to the cartridge valve.

FIG. 103b shows an alternative configuration for input to the cartridge unit and output from the cartridge unit and 981' interface to the cartridge unit.

FIG. 103c shows a section of an alternative configuration 920' for the mounting of the cartridge, bonnet nut, and inlet interfacing member 981'.

FIG. 109 shows a section of the bonnet nut with a circular cross-section for stabilizing the alternative cartridge system.

FIG. 110 shows a view of the bonnet nut with a circular for stabilizing the alternative cartridge system.

FIG. 111 shows a view of the cam unit 810 with a rectangular cross-section for assembly with the stem alternative 104' as shown in FIG. 105.

FIG. 112 shows an alternative configuration for the cartridge unit assembled with stop 89 and cam alternative 810.

DETAILED DESCRIPTION

Figure 1:
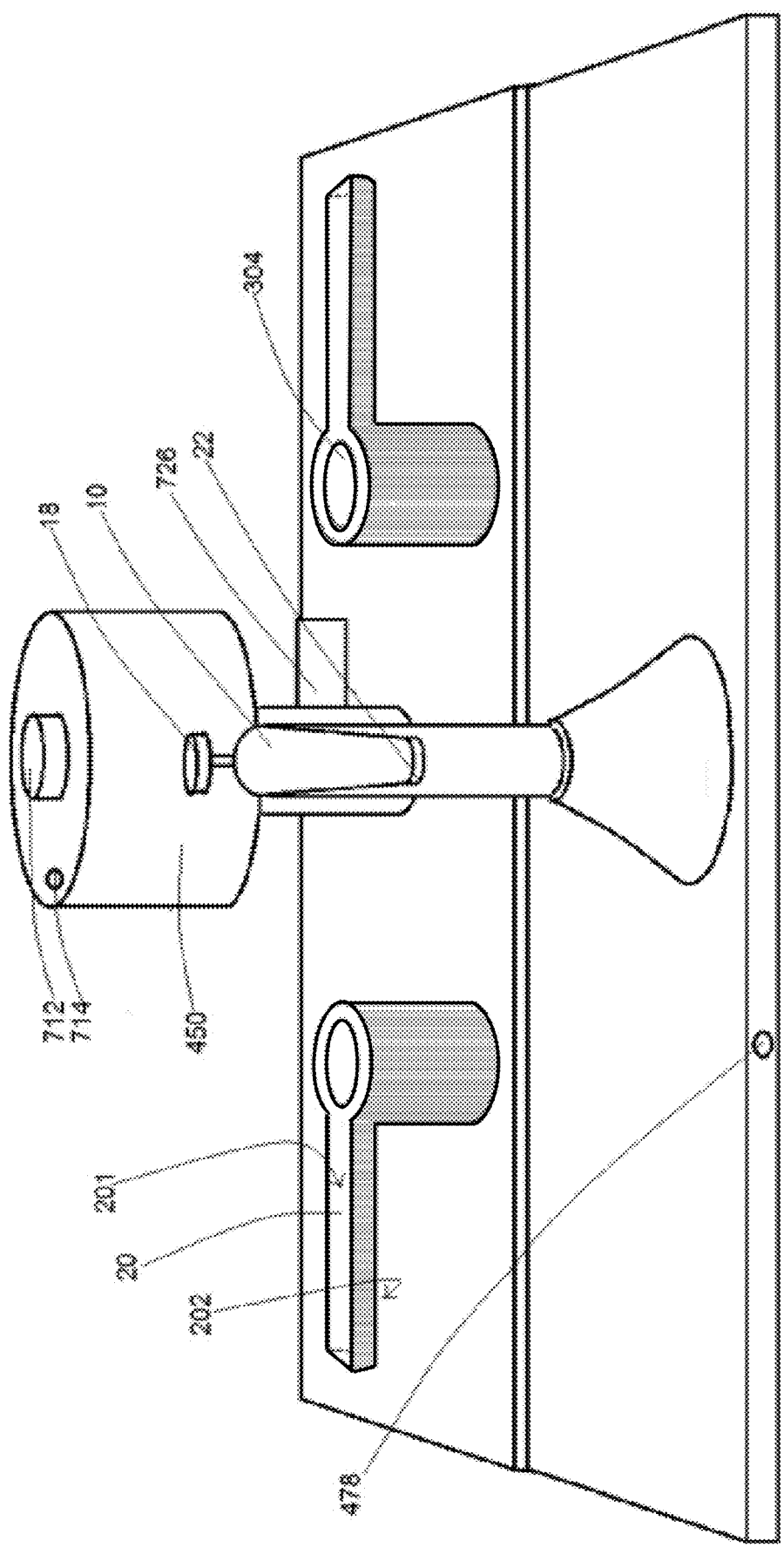
FIG. 1 shows an embodiment of a two-handle embodiment of the invention as seen when a finished unit of the invention is mounted and available for utilization.

Referring to FIG. 1, what is shown is configuration of an embodiment of the invention as seen in a faucet mount in relation to a wash basin.

Figure 2:
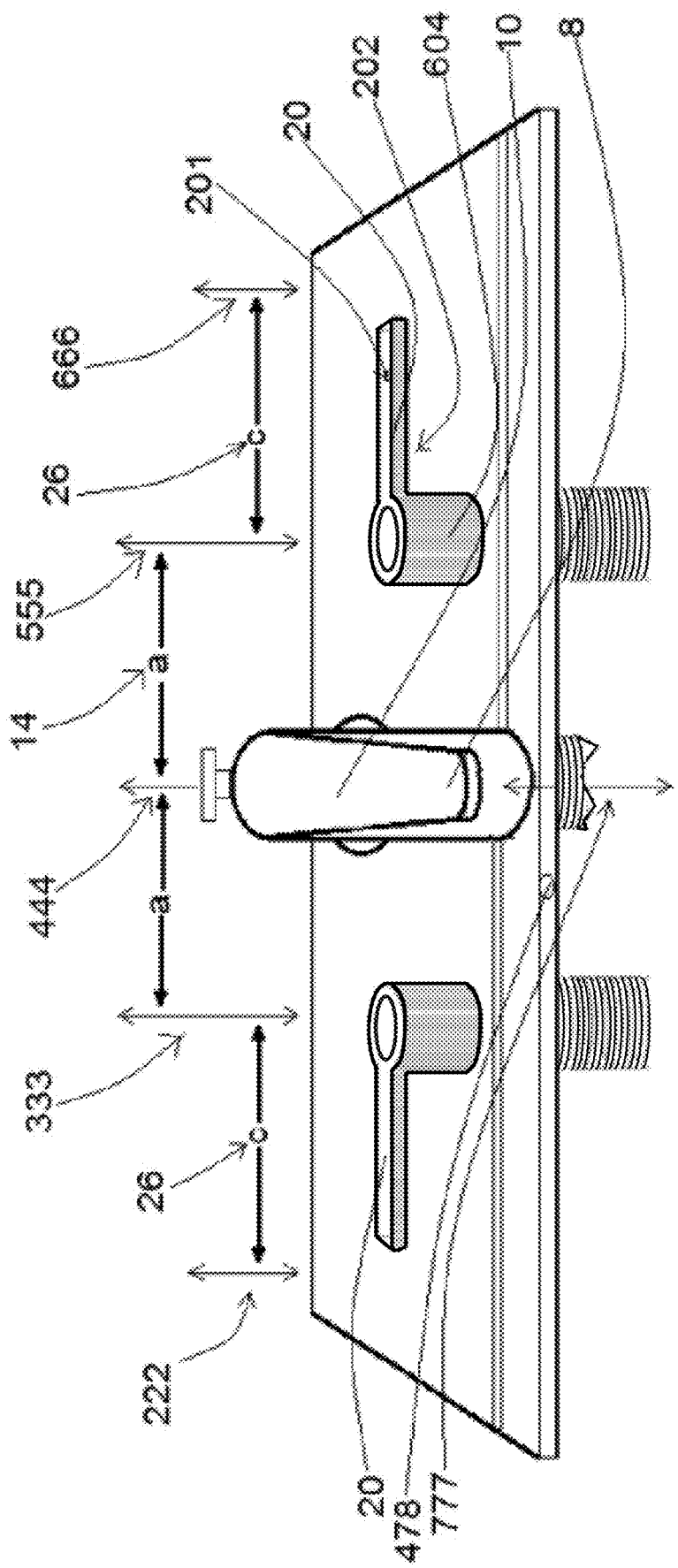
FIG. 2 shows a positioning between the lever, the spout, the cartridge and the base of the spout of a finished unit of the invention. The detergent reservoir 450 and spout escutcheon 977 are not shown in FIG. 2.

Referring to FIG. 2 what is shown a geometric positioning relation of the base 12 of a faucet spout 10, and distance 14, labeled a of said base 12 of said faucet spout 10 from said base 12 of spout 10 to a base 16 of a lever handle 20 of said faucet where said lever handle 20 is enabled with means for rotational motion when said lever handle 20 is attached to cartridge assembly 420. Said lever handle 20 rotation being enabled by connection to the upper portion of a spindle of a faucet cartridge valve. Said lever 20 is preferably configured with an upper flat surface region 201 and a lower curved surface region 202 to better to facilitate disbursement of liquid on said upper flat surface region 201 and adhesion of liquid to said lower curved surface region 202 thus substantially facilitating washing of total surface area of said lever 20 when said lever 20 is disposed to intercept line of flow 777 from spout portion 8. The members detergent reservoir 450 and spout escutcheon 977 are not shown in FIG. 2. Said lever 20 is preferably made from brass or stainless steel.

Figure 3:
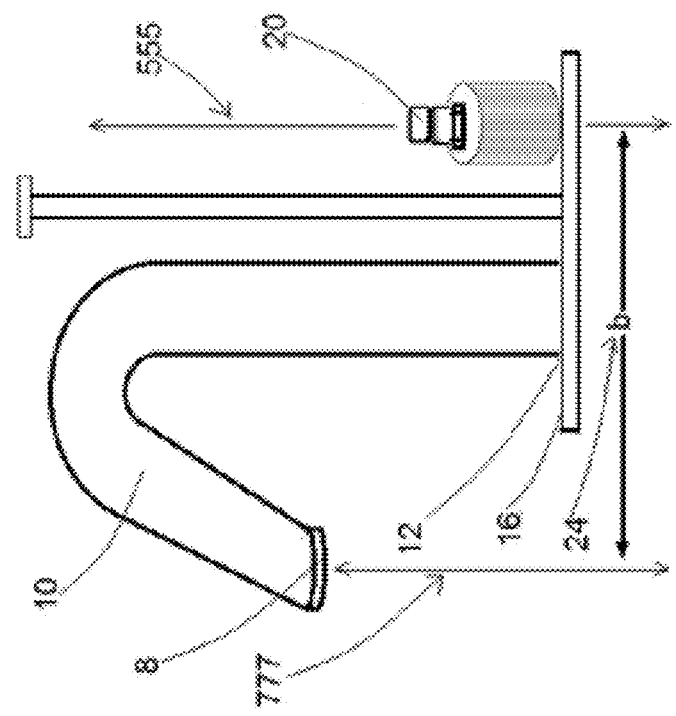
FIG. 3 shows a right-side view of FIG. 2.

Referring to FIG. 3, what is shown is a view from the right of FIG. 2. Line 777 shows a direction of vertical flow of fluid from a faucet spout portion 8 of said spout 10 on said faucet mount. The horizontal distance 24, labeled b, between line 444 and line 777 and in the plane containing line 444 and line 777 is such that the vertical line 555 projects between line 444 and line 777 and in the plane containing line 444 and line 777 and where line 555 is the vertical line of axis 555 of said cartridge unit 420.

Figure 4:
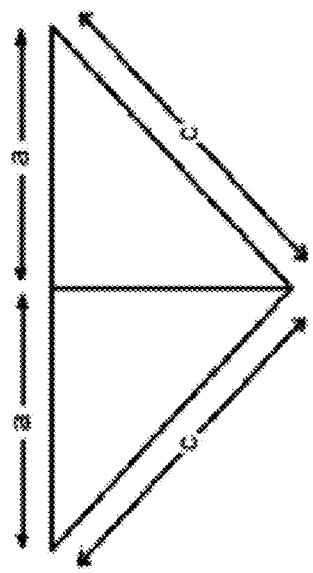
FIG. 4 shows a geometric relation for the positioning of the lever, the spout, the cartridge and the base of the spout for a finished two handle unit of the invention.

Referring to FIG. 4 and FIG. 2 geometric length 26 labeled c of said handle lever 20 can be related to the said geometric distance a and said geometric distance b by the inequality $\sqrt{a^2+b^2} \leq c$ When said relation $\sqrt{a^2+b^2} \leq c$ exists in said faucet said lever handle 20 can be enabled to intersect said line of fluid flow 777 from said spout portion 8 of spout 10 of said faucet; thus said lever portion 20 can be 20 exposed to interact with said fluid flowing from said spout portion 8 of said spout 10.

Figure 5:
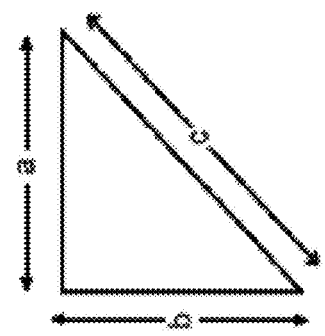
FIG. 5 shows a geometric relation for the positioning of the lever, the spout, the cartridge and the base of the spout for a single handle unit of the invention.

Referring to FIG. 5, what is shown is a geometric configuration for a single lever faucet unit.

Figure 7:
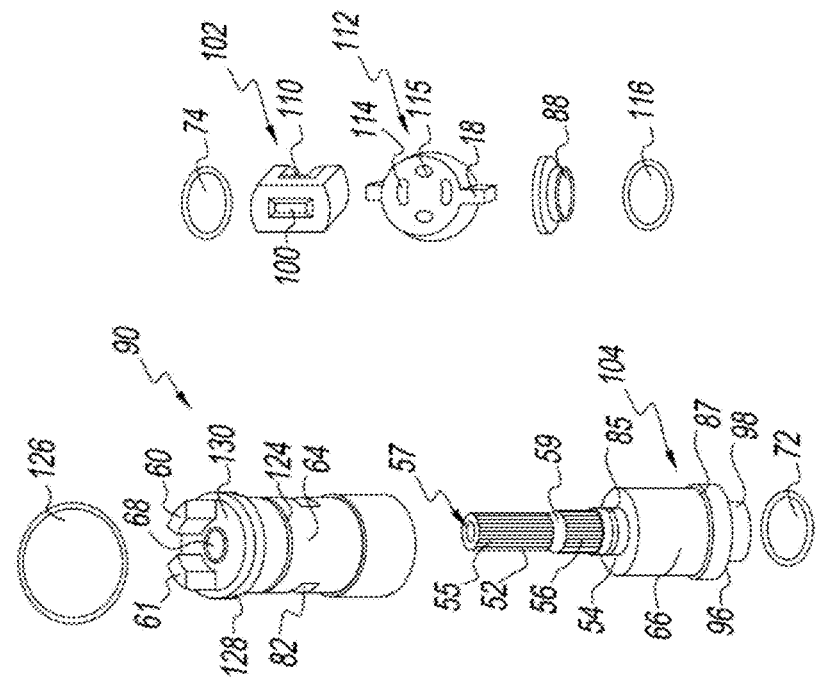
FIG. 7 shows an exploded view of the cartridge unit of FIG. 6.
Figure 6:
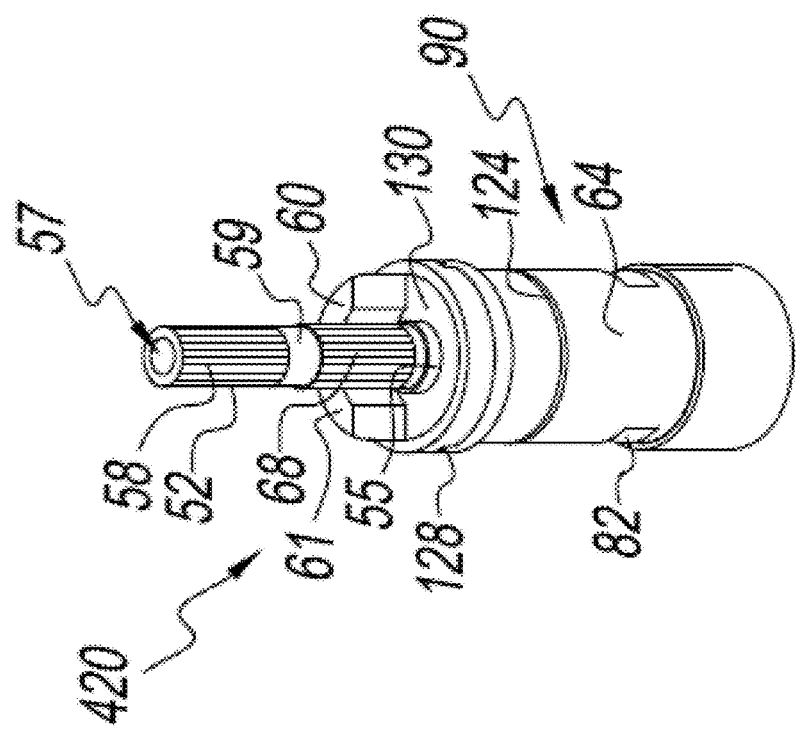
FIG. 6 shows an embodiment of cartridge unit 420.
Figure 8A:
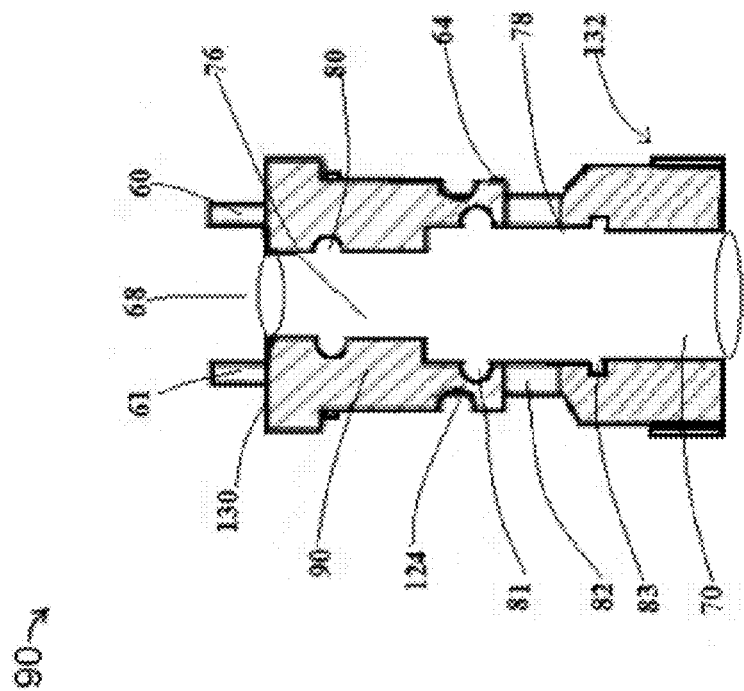
FIG. 8a shows a diametric section of the cartridge body 90 shown in FIG. 8.
Figure 8:
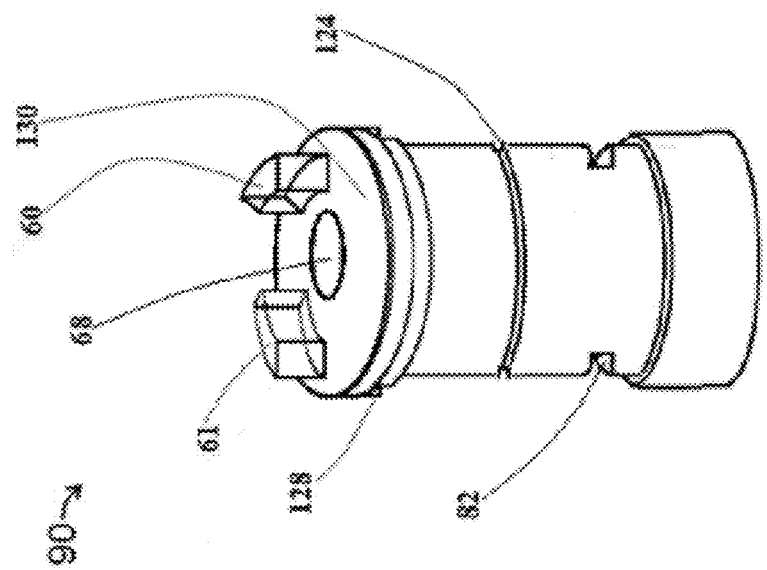
FIG. 8 shows a view of the cartridge body 90.

Referring to FIG. 6, what is shown is an embodiment of a cartridge unit 420. Referring to FIG. 7 what is shown are the exploded components of said cartridge unit 420. As shown in FIG. 6 cartridge 420, includes a body 90, said body 90 has an exterior surface 64 and an interior passage 68. FIG. 8 shows a configuration of said body 90 while FIG. 8a shows the configuration of a cross-section of said body 90. As shown in FIG. 8 exterior surface is preferably generally cylindrical in shape so as to be easily situated in a flow conduit for fluid and thus enable the action of an inline valve between the conduit and the outlet of a faucet. The body may be formed of a variety of materials such as metal, metal alloys or other utility compatible economical nonmetallic composite or thermoplastic.

The interior passage 68 of the body 90 defines a longitudinally extending passage 68 through the body as shown in FIG. 8a. Passage 68 preferably extends from an inlet opening 70, at the bottom of the body to a lateral outlet opening 82 at the top of the body. The passage 68, preferably has a cylindrical configuration conducive to use of rotating parts therein and can also have one or more sections or ones to accommodate the size and shape of various parts therein. As shown the passage has an upper portion 76 which is preferably of a narrower cross-sectional diameter as shown in FIG. 8a to correspond to the dimensions of the region 57 of said stem 104, and a lower wider cross-sectional diameter section 78 that is preferably wider to accommodate other parts of the valve such as a disk, sealing rings and rotatable base portion of said stem 104.

The body further includes at least one side opening 82 extending transversely through the body from the interior passage 68 to the exterior surface of the body 90. The side opening 82 is preferably located to be in keeping with current faucet design in that water or other fluid flowing upwards through the inlet end 70 of the body into passage 68 would encounter the stationary disk and pass through the opening therein when in the open valve mode until it entered the receiving area of the moveable disk and could then flow out the side opening 82 in the body to continue on to feed the faucet body and outlet of the faucet.

Thus, one or more side opening 82 for this embodiment should preferably be positioned to accommodate that flow out said side openings 82 in an unimpeded manner within the design. The opening is preferably rectangular for fluid flow characteristics but can have other configurations. As shown two such side openings 82 are shown which is compatible with the number of openings and receiving areas in the disk cartridge.

The openings 82 is preferably rectangular for fluid flow characteristics but can have other configurations. As shown two such side openings 82 are shown which is compatible with the number of openings and receiving areas in the disk cartridge.

FIG. 9 shows a configuration of body stop interceptor member 205 while FIG. 10 shows a cross-section of said member 205.

Figure 16:
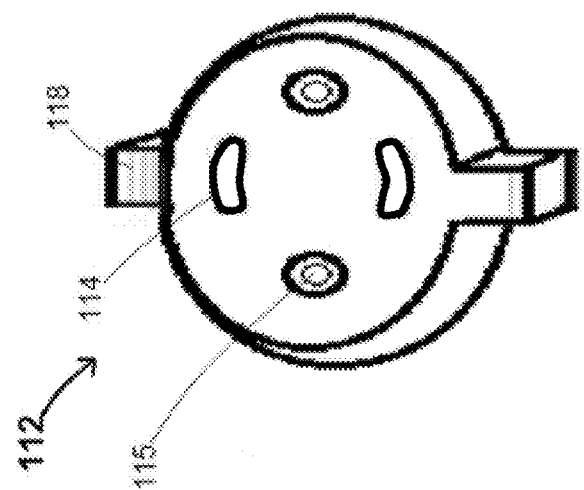
FIG. 16 shows a view of the stationary disc 112.
Figure 15:
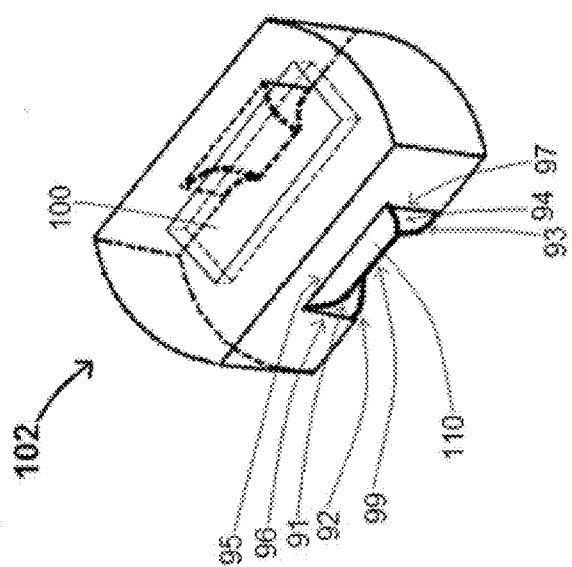
FIG. 15 shows a view of the moveable disc 102.

Referring to FIG. 8, said body 90 has an upper substantially flat surface 130 enabled with means for limiting the rotation of handle 20 and thus the rotation of stem 104. Said means for limiting the rotation of stem 104 is enabled by raised feature 60 and raised feature 61 where said feature 60 and said feature 61 are designed to limit the turning of said stem 104 by said lever 20 to a maximum predetermined angle of rotation; such limiting is enabled when said stop 60 and said stop 61 are rigidly connected to said upper surface 130 of said cartridge body 90. As will be shown said maximum predetermined angle of turn limits the range of motion of a moveable disc 102 against the openings of a fixed disc 112 and thus enables desired coordination of the various flow openings within a particular predetermined rotational range. The embodiment of such a moveable disc is shown in FIG. 15 while the embodiment of such a fixed disc is shown in FIG. 16. Said stop feature 60 and said stop feature 61 are enabled on said upper surface 130 and arranged such that with the centre of a circle lying on the axis of rotation of stem portion 57, said stop features location 60 and 61 may characterize end points on separate radii where said radii originate from a common point lying in the plane of surface 130 on the axis of rotation of stem portion 57.

Referring to FIG. 10, interior flange 47 of bonnet nut 205 shown in FIG. 9 contacts outer region of body surface portion 130. Access region opening 45 of said bonnet nut 205 mates with and surrounds region 59 of stem 104; however, said access opening 45 of said bonnet nut 205 is enabled to rotate substantially freely around region 59 of stem 104. Said bonnet nut 205 fully accommodates passive stop 60, passive stop 61 and said active stop 404 such that a measurable distance exists between the interior region of 205, passive stop 60, passive stop 61 and active stop 404 thus enabling stability of stem 104 when said active stop 404 is mated to region 56 of said stem 104. Member 65 of active stop 404 interact with static stop 60 and static stop 61 to substantially enable the maximum predetermined angle of rotation of stem 104. The bonnetnut 205 functions to ensure stability of the stem 104 and by extension, the stable function of the cartridge unit 604.

Figure 14:
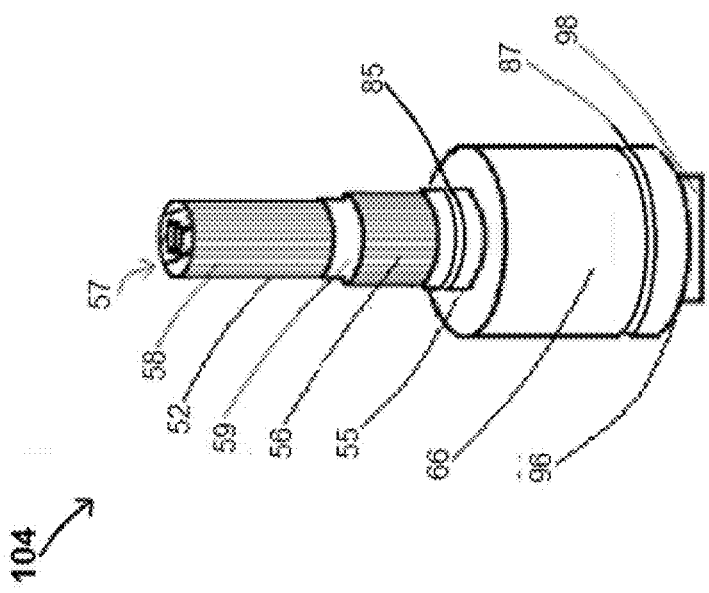
FIG. 14 shows a view of the stem member 104.

Referring to FIG. 14, what is shown is cartridge unit member 104 generally called the stem of a ceramic faucet unit. Said stem 104 includes a reduced cylindrical diameter region 57 of said stem member 104. The upper region 58 of said region 57 is contiguous with a lower region 52 of said region 57. Said region 58 is configured to be in rotatable relationship with lever handle unit 304 of FIG. 12 while said region 52 will be shown to be configured to be in rotatable relation with faucet system member shown in FIG. 39.

Contiguous to region 52 is region 59 of said region 57. Said region 59 is configured to be substantially frictionless and configured to move substantially frictionless against the interior 45 of component member 205 shown in FIG. 10.

Contiguous to region 59 of said region 57 is region 56 of said region 57. Said region 56 of FIG. 14 is configured to be in rotatable relation with interior 34 of 404 depicted in FIG. 13.

Referring to FIG. 13, faucet unit member 404 when assembled with region 56 of upper stem portion 57 functions to interact with body stops 60 and 61. Said member 65 of member 404 will be shown to interact with body stop 61 and body stop 60 and also will be shown to enable a predetermined angular rotation of region 57 and consequently, ensure rotation of a moveable disc 102 by said stem 104.

Referring to FIG. 12 portion 58 of stem 104 is enables rotation of said stem 104 when said stem 104 is in locking relationship with lever unit 304; such locking means between exterior region 58 of region 57 of 104 and interior 34 of lever unit 304 may be enabled by a grooved locking between region 58 of portion 57 and the interior wall of circular slots 34 of said 304. The interior wall 34 of cam member 410 is also grooved for locking means with region 52 of region 57 of said stem 104 while the interior 34 of 404 is grooved for locking means with region 55 of region 57 of said stem 104. Region 59 of region 57 is substantially smooth and enables rotation of the interior surface 45 of 205 to substantially frictionless motion on the said surface 59 of region 57. FIG. 9 shows a configuration of member 205 while FIG. 10 shows a cross-section of said member 205. It will be shown that such locking may be enabled by rectangular slots.

As shown in FIG. 14 region 57 is part of the stem 104 of said cartridge unit 604. Said region 57 has an upper portion 58 configured to fit in rotatable relationship with the interior surface 34 of lever assembly 304 shown in FIG. 12, and with the lower portion 66, configured to be accommodated within the body 90 when said stem 104 is situated within the passage 68 of said body 90.

As shown in FIG. 14 region 57 is part of the stem 104 of said cartridge unit 604. Said region 57 has an upper portion 52 contiguous to upper region 58 configured to fit in rotatable relationship with the interior surface 34 of cam assembly 410 shown in FIG. 39, and with the lower portion 66, configured to be accommodated within of the body 90 when said stem 104 situated within the passage 68 of the body 90.

As shown in FIG. 14 the stem 104 of said cartridge unit 604 has a region 59 configured to rotate independently and substantially frictionless within member 45 of bonnet nut 205 shown in FIG. 9 and FIG. 10 and with the lower portion 66, configured to be accommodated within the interior of the body 90 when said stem 104 is situated within the passage 68 of said body 90. Said region 59 is contiguous to member region 52.

Said region 57 of stem 104 has portion 56 configured to fit in rotatable relationship with the interior surface 34 of stop assembly 404 shown in FIG. 13, and with the lower portion 66, configured to be accommodated within the interior of the body 90 when said stem 104 is situated within the passage 68 of the body 90. Said region 56 is contiguous with region 59.

Referring to FIG. 14 the stem 104 of cartridge 604 has a lower portion 66 which is configured to fit in rotatable relationship with the interior passage 68 of the body 90 when said stem 104 situated within the said passage 68 of said body 90. As shown in FIG. 14 the upper portion 55 of said stem 104 is enabled with groove 85 for receiving at least one sealing ring 72. Referring to FIG. 14, when said stem 104 is integrated within passage 68 of the body 90 said sealing ring 72 functions to prevent leakage around the stem in said region 55. As shown in FIG. 14 lower portion 66 of said stem 104 is enabled with a groove 87 at least one sealing ring 74. Referring to FIG. 14 when said stem 104 is integrated within passage 68 of the of said body 90 said sealing ring 74 functions to prevent leakage between the interior surface of the said body 90 and the lower end portion 66 of said stem 104. Said sealing ring 74 sits in inclusion 87 of said stem 104.

The upper end region 57 of the stem 104 may preferably have a threaded or other snap-fit, slide in, friction fit or gripping surface for attaching the cartridge to a faucet handle so as to be rotatable and function with the handle 20. The lower end portion 66 of the stem 104 has a bottom surface 96 to which is attached a feature 98. The upper end portion 58 of the said region 57 as shown in FIG. 6 is configured to be fitted within a faucet handle assembly 304 shown in FIG. 12. The stem 104 may be formed of a one-piece construction from stainless steel, brass or zinc alloy or copper alloy or other safe metal plastic.

The bottom surface 96 of said stem 104 preferably has rectangular prismatic feature 98, extending from said surface 96. Said rectangular prismatic feature 98 when within tolerance is accommodated within rectangular prismatic slot 100 of moveable disc 102 will be shown to allow for interaction with said moveable disc 102 so that when said portion 58 of region 57 of said stem 104 is fitted within a faucet handle assembly 304 and lever 20 is turned a predetermined angle, it will then in turn rotate the said moveable disc 102 substantially that of said predetermined angle of said lever assembly 304 and consequently activate the open/closure feature of the cartridge valve. FIG. 12 shows a configuration of a faucet handle assembly 304. FIG. 15 shows a configuration of a moveable disc.

Referring to FIG. 14, a region defined by 59 of region 57 moves freely substantially frictionless within reduced diameter region 45 of bonnet nut 205. Said bonnet nut functions to substantially ensure stability of the cartridge unit.

Referring to FIG. 15 what is shown is a configuration of the moveable disc 102. Said moveable disc 102 is enabled with an inclusion 110, said inclusion 110 is contained by parabolic arc 91, and mirrored parabolic arc 94, parabolic arc 92 and mirrored parabolic arc 95, line segment 96 and mirrored line segment 97. Said inclusion is further defined by line segments 95 and line segment 99. Said inclusion 110 is mirrored on an opposite surface of said moveable disc 102. Said moveable disc 102 is further enabled with a preferably prismatic inclusion 100 where said inclusion 100 functions to tolerably accept extended tab 98 of the stem 57 thus enabling turning of moveable disc 102 against fixed disc 112 when said unit 57 is activated to rotate by activation of lever 20 for its utility and disc 102 enables fluid through 114 of fixed disc 112 into harbor 110 of said moveable disc 102.

Additionally, the upper surface of said moveable disc 102 is disposed to be described as a section of a cross-section of a cylinder defined by two parallel chords shaped to fit within a generally cylindrical portion of the passage 68 in the lower portion 78 of said passage 68. Said diametric inclusions 110 in the lower portion of moveable disc 102 function as fluid receiving harbors is the said moveable disc 102.

The movable disk 102 included within the body in passage 68 is enabled with means on its upper surface 104 configured to contact and interact with the bottom surface 96 of the lower end portion of the stem 66 in a rotatable relation. As shown, upper surface 104 is preferably configured with a slot 100 for receiving a tab 98 therein. The disk upper surface may preferably be defined as a portion of the cross-section of a solid cylinder defined by symmetrically parallel chords shaped to fit within a preferred generally cylindrical portion of the passage 68 in the lower portion 78 in the passage 68. There are preferably two side wall portions defining preferably two fluid receiving areas 110 within the moveable disk 102. The receiving area 100 is configured so that when the disk 102 is rotated to align the receiving area 100 with the side opening 82 in the body 68 it will allow fluid flow out of the side opening of the body for feeding the faucet to which is installed with fluid entering the cartridge from a conduit through the open inlet 70 of the cartridge.

Referring to FIG. 16 what is shown is a stationary disk 112. Said disc 112 is fixed in position for interacting with moveable disc 102. Said fixed disc 112 is preferably provided with openings 114 extending through the stationary disk 112 for enabling passage of fluid flow from an inlet end 70 of the body 90 then into the passage 68, and through the stationary disk and then into the receiving area 110 of the moveable disk, and then out the side opening 82 of the body when the cartridge is in the open position mode. The stationary disk 112 is preferably enabled with lubricant containing pits 115; said lubricant in lubricant containing pits function to reduce friction between moveable disc 102 and stationary disc 112 thus further prolonging functional integrity of said moveable disc 102 and said stationary disc 112. Said fixed disc is further provided with diametric tabs 118; said tabs 118 enables the said disc 112 to be fixed in recesses in the interior passage 68 of the body cartridge 90.

Figure 19:
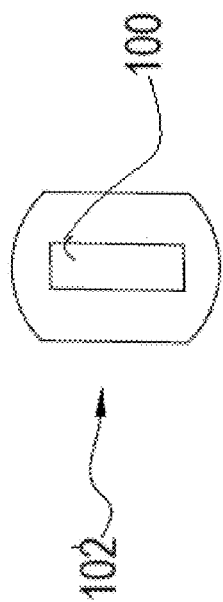
FIG. 19 shows a planar view of movable disc 102.
Figure 21:
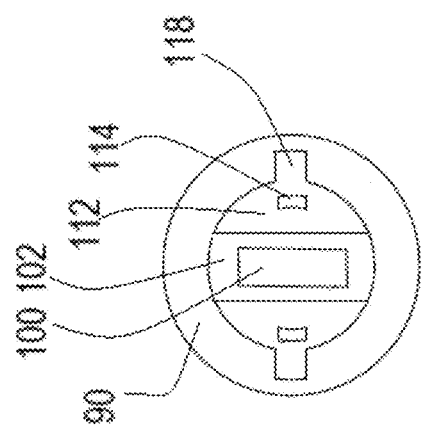
FIG. 21 shows an integration of the stationary disc 112, the moveable disc 102 inserted in the lower part of the cartridge body 90 when in open mode.
Figure 18:
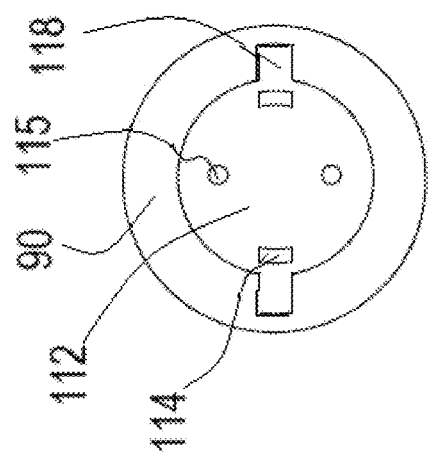
FIG. 18 shows the stationary disc inserted in the interior of the lower end of cartridge body 90.
Figure 17:
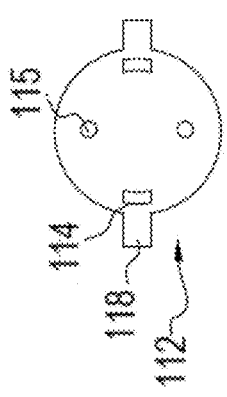
FIG. 17 shows a planar view of stationary disc 112.
Figure 20:
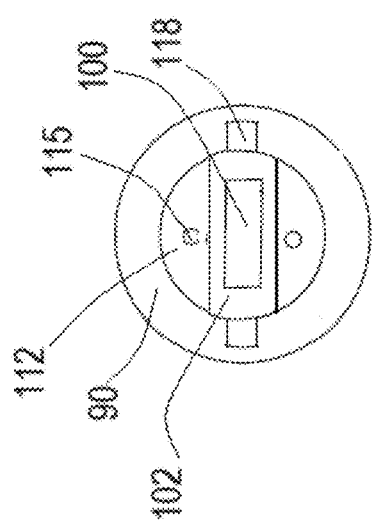
FIG. 20 shows an integration of the stationary disc 112 and the movable disc 102 inserted in the lower part.

Referring to FIG. 17 what is shown is another view of the stationary disc 112. Referring to FIG. 18, what is shown is a configuration of said fixed disc 112 positioned with diametric tabs 118 recessed in said body 90 of the cartridge unit 420. Referring to FIG. 19 what is shown is a view of the moveable disc 102. Referring to FIG. 20 what is shown is a relationship between said moveable disc 102 and said stationary disc 112 when cartridge valve unit 604 is in closure mode thus substantially resisting the flow of liquid from conduit 70 through passage 68 and to side openings 82. Referring to FIG. 21 what is shown is a relationship between said moveable disc 102 and said stationary disc 112 when said cartridge valve unit 420 is the open mode thus enabling the flow of liquid from conduit 70, through the passage 68 and to side openings 82. As will be shown said disabling and enabling of the flow of liquid through the valve cartridge unit is enabled when a lever handle 20, when fitted to portion 58 of the region 57 of the stem 104 shown in FIG. 14 can be turned to reduce and shut off flow. The handle 20 thus initiates the closing of the valve from the open mode of said valves and the opening of the valves from a closure mode of said valves when said handle 20 is initiated to turn.

Figure 23:
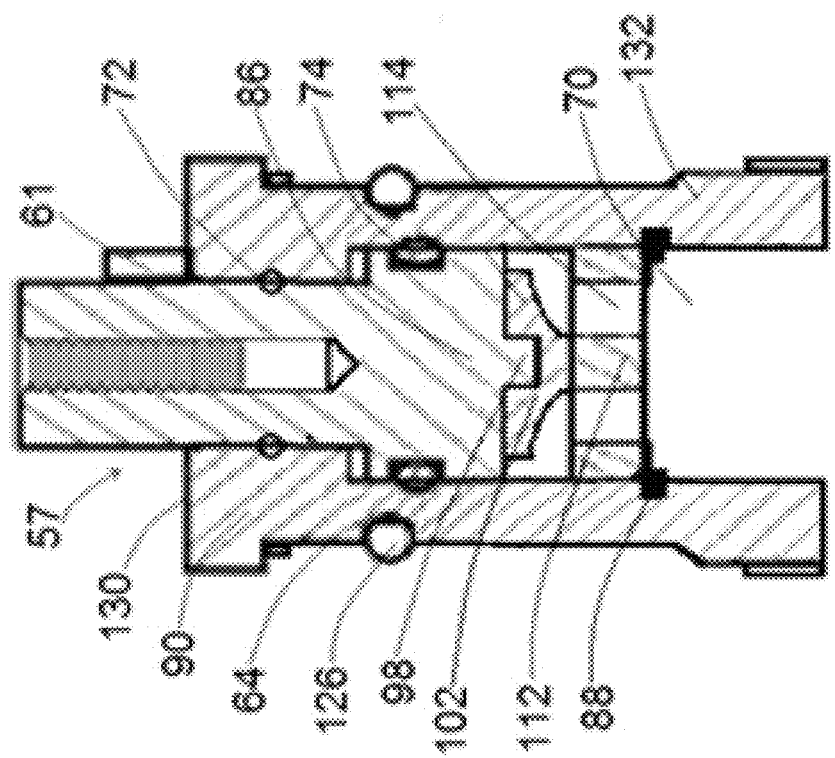
FIG. 23 shows a section through the cartridge of FIG. 22
Figure 22:
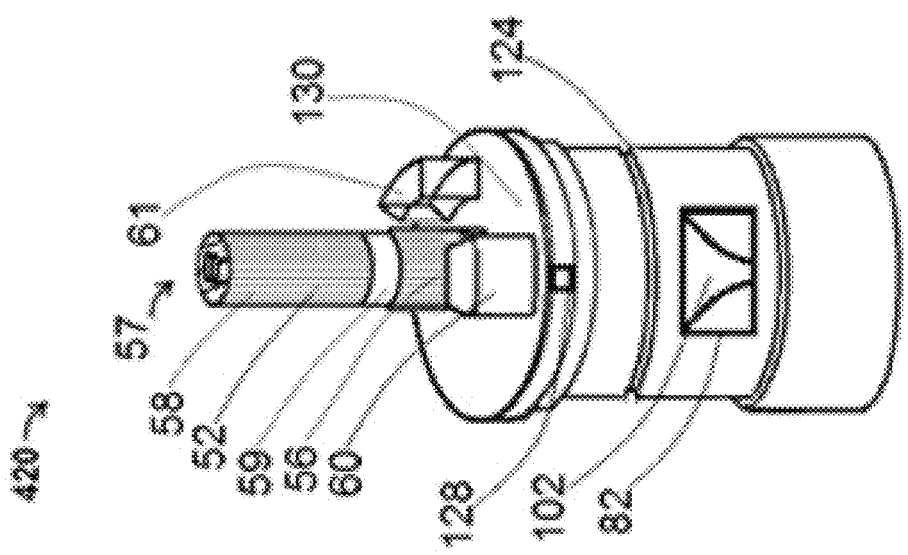
FIG. 22 shows a view of the cartridge from opening 82 in the closure mode.

Referring to FIG. 22 what is shown is a view from the side opening 82 of said cartridge unit 420 when said cartridge unit 420 is in closure mode. FIG. 23 shows a diametric cross-section of the view of FIG. 22 and here said diametric cross-section lies in a plane of symmetry across the most substantial dimensions of preferably rectangular prismatic slot t100 of said movable disc 102.

Figure 25:
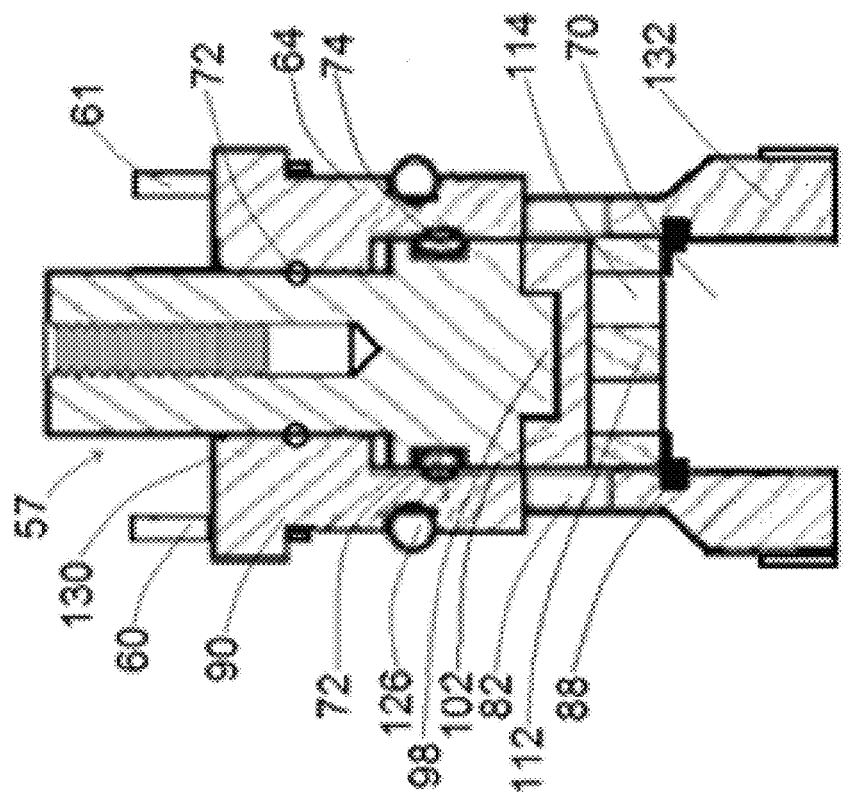
FIG. 25 shows a view of a section of the cartridge of FIG. 24 in a plane perpendicular to the plane of FIG. 23.
Figure 24:
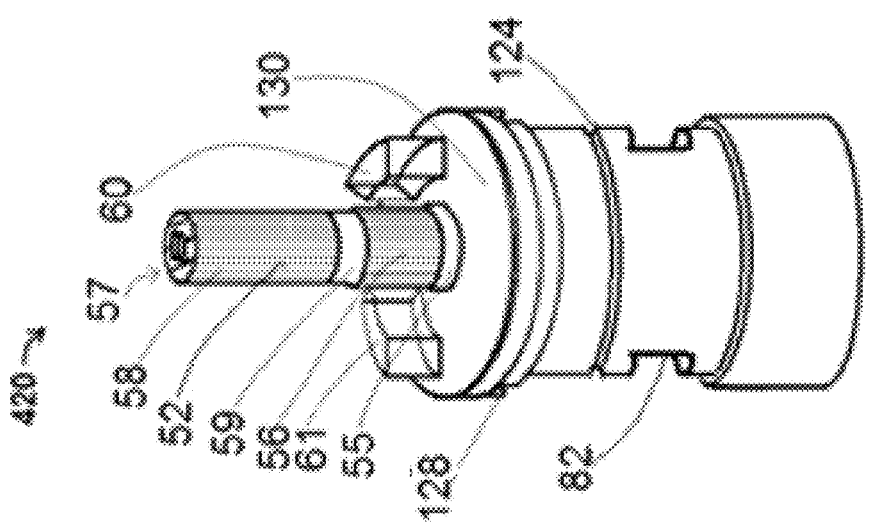
FIG. 24 shows a view of the cartridge of FIG. 22 rotated counterclockwise by 90 degrees.

Referring to FIG. 24, what is shown is a view of said cartridge 420 of FIG. 22 rotated through 90 degrees. FIG. 25 shows a diametric cross-section of the view of FIG. 24 where said diametric cross-section lies in a plane of symmetry across the lesser dimensions of preferably rectangular prismatic slot 100 of said movable disc 102.

Referring to a cartridge configuration say FIG. 23 for clarity; for the washing of the lever 20 the turn of stem 104 when lever handle 20 is attached to said stem portion 58 of stem 104 enables opening and closing of valves 102 and 112 and thus enables utility of the invention. The washing of the lever 20 of the invention is enabled when said lever arm 20 is attached to stem region 58 of said stem 104 and said lever 20 is initiated to rotate through a maximum predetermined angle that is greater than the angle turned to the said line of flow 777 from spout 10. The initial maximum predetermined turn of the stem 104 by lever 20 from an off mode of the cartridge 420 will be shown to reduce flow rate through spout 10 to enable spreading of detergent over ones hand and washing of hands; a subsequent counter turn through a predetermined angle enables said lever 20 to intercept line of flow 22 from spout 10 and also increases flow rate through spout 10 to its predesigned maximum thus enabling the washing said lever 20 and further washing of hands. A subsequent counter turn of said lever 20 through a predetermined angle enables repositioning of lever arm 20 back to its off position. The reduction in flow rate of solvent through spout 10 thus enables significant conservation in the use of water as a solvent while the washing of said lever 20 significantly enables reduction in the spread of pathogens thus enhancing health and safety.

Referring to FIG. 16 said stationary disk 112 is enabled with preferably diametric paired extension 118 for locking said stationary disc 112 within the interior passage 68 of the cartridge body 90; thus, enabling reliability and stability of said cartridge unit 420. As shown in FIG. 18. said means for locking said stationary disc 112 may be achieved when inclusion is designed within the interior passage 68 of said body 90 and were said inclusions in the passage 68 of said body 90 are dimensioned to accommodate and fit said diametric extensions 118 of said stationary disc 112. Said stationary disc 112 interfaces with the moveable disc 102 located in the passage 68 of the cartridge body 90 and with conduit 70 where preferably openings 114 in said stationary disc 112 accommodate flow to the receiving are 110 of moveable disc 102 and then through side openings 82 to the exterior of body 90 of cartridge unit 420.

Referring to FIG. 25 said conduit 70 is external to said interior passage 68, thus, to ensure reliability of the cartridge unit an elastomeric seal 88 is introduced to interface said stationary disc 112 and said conduit 70 in region 132 of the cartridge body 90. Said sealing ring 88 included within component 132 functions to apply pressure between 132 stationary valve member 112, and moveable valve member 102. The pressure exerted by said sealing ring 88 ensures optimal functioning of the cartridge for flow of liquid. The stationary disc 112 is also enabled with a pit like feature 115. Lubricant in said pit like feature 115 function to substantially be frictionless movement of said moveable disc 102 over the surface of fixed disc 112 thus also to prolong the functional integrity of the cartridge unit 420.

Figure 27:
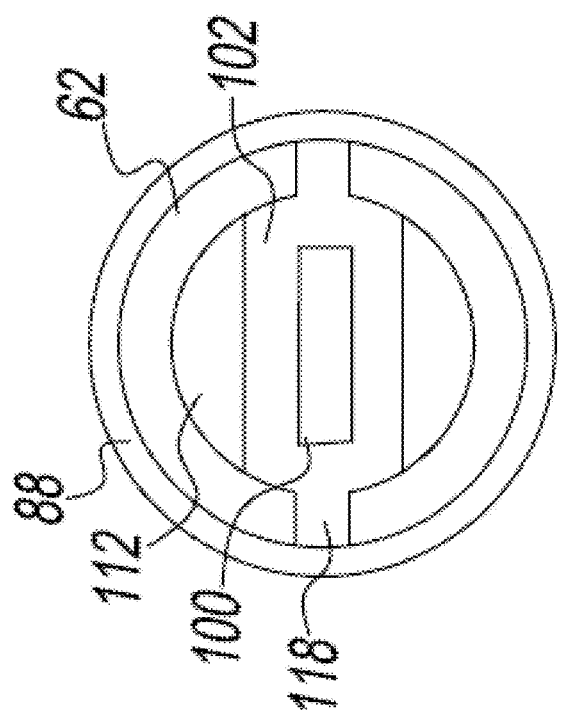
FIG. 27 shows an integration of the stationary disc 112, the movable disc 102, in the configuration template when the cartridge is in closure mode.
Figure 26:
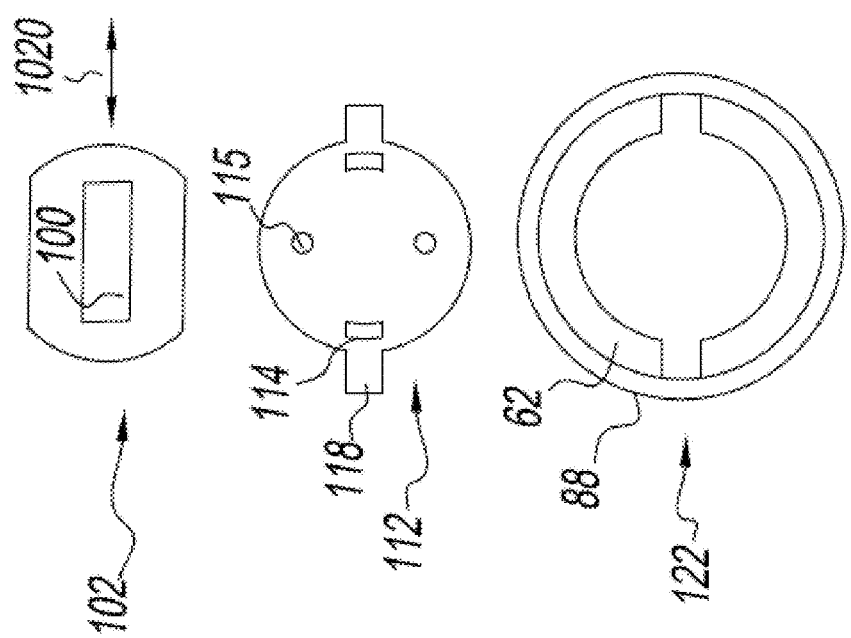
FIG. 26 shows the stationary disc 112, orientation of the moveable disc 102 and a configuration template 122 for receiving stationary disc 112 and moveable disc 102 when the system is in closure mode.
Figure 30:
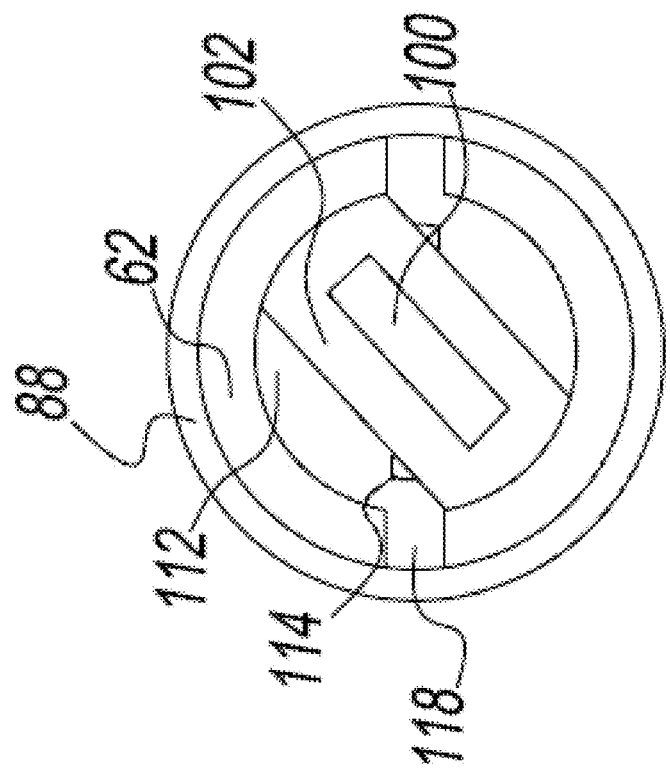
FIG. 30 shows an integration of the stationary disc 112, the moveable disc 102 in the configurative template 122 when the cartridge is in open mode and the lever 20 has turned from its at rest position through its maximum predetermined angle of rotation thereby enabling in reducing rate of flow through spout 10 of the faucet by partially blocking openings 114.

Referring to FIG. 26; what is shown is an explosion of the order of contiguous assembly of the position of tabs 118, the orientation of the moveable disk 102 and the orientation stationary disk 112 and a cross-section through the lower part 132 of the said cartridge body 90 when the faucet system shown in FIG. 1 is in the off mode but disposed to enable flow of liquid to said faucet when activated. Referring to FIG. 27 in contrast to FIG. 26, what is shown is an integration and relative contiguous orientation of said moveable disk 102 and said stationary disk 112 in the passage 68 of the lower part 132 of said body 90 when the faucet system of FIG. 1 is in the off mode but disposed to enable flow of liquid to said faucet when activated.

Figure 29:
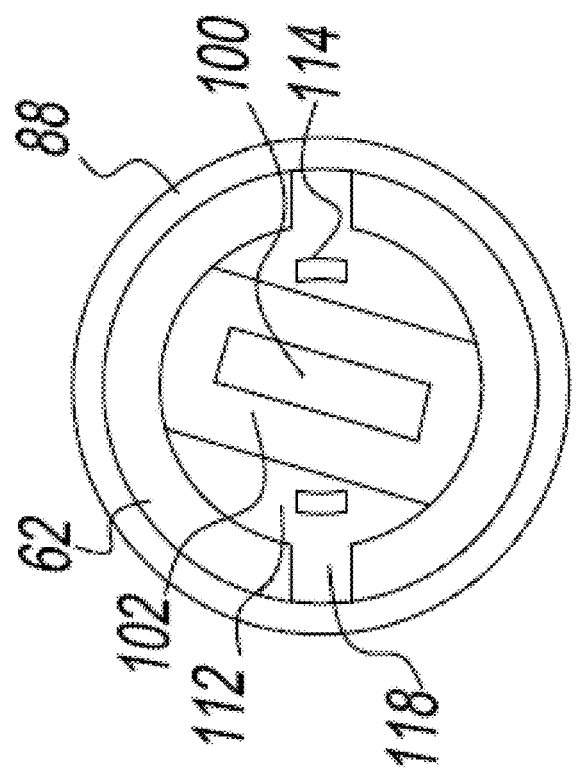
FIG. 29 shows an integration of the stationary disc 112, the moveable disc 102 in the configuration template 122 when the cartridge is in open mode and maximum rate of flow is enabled through the faucet spout 10.

Referring to 28; what is shown is an explosion of the order of contiguous assembly of the position of tabs 118, the orientation of the moveable disk 102, the orientation of stationary disk 112 and a cross-section through the lower part 132 of the said cartridge body 90 when the faucet system shown in FIG. 1 is in the activated mode but disposed to enable substantial flow of liquid through spout 10 when said lever 20 does not intercept the line of flow 777 from spout 10 to a wash basin. Referring to FIG. 29 in contrast to FIG. 28, what is shown is an integration and relative contiguous orientation of said moveable disk 102 and said stationary disk 112 in the passage 68 of the lower part 132 of said body 90 when the faucet system of FIG. 1 is in the activated mode but disposed to enable substantial flow of liquid through spout 10.

Referring to 30, what is shown is an integration and relative contiguous orientation of said moveable disk 102 and said stationary disk 112 in the passage 68 of the lower part 132 of said body 90 when the faucet system of FIG. 1 is in the activated mode but disposed to reduce flow of liquid through spout 10 where said reduction in flow rate of liquid conserves water as a solvent when hands are being soaped.

Referring to FIG. 31; what is shown is the order of contiguous assembly and relative orientation of the handle 20, the orientation of the moveable disc 102 and the orientation of the stationary disk 112 when faucet system is in the off mode and liquid flow is disabled through spout 10 of faucet assembly for a right hand side positioned unit of the invention.

Referring to FIG. 32, moveable disc 102 is shown with a line of symmetry 1020 for said moveable disc 102; now referring to 1020 of FIG. 31 and consistent with the properties of a rigid body, said 1020 characterizes initial orientation of said line of axis of symmetry 1020 for 102 of FIG. 31 and transformation of said axis of symmetry 1020 in 102 in FIG. 32 subsequent to lever 20 executing its predetermined angle of rotation; thus indicating a sense and angle of rotation of moveable disc 102 from the inactive mode to the utility mode of configuration where said lever arm 20 is not disposed to intercept line of flow 22 from portion 8 of spout 10.

Referring to FIG. 33 the predetermined maximum turn of moveable disc 102 is shown with a line of symmetry 1020 for said moveable disc 102; now referring to 1020 of FIG. 32 and consistent with the properties of a rigid body, said 1020 characterizes initial orientation of said line of axis of symmetry 1020 for 102 of FIG. 32 and transformation of said axis of symmetry 1020 in 102 in FIG. 33 subsequent to lever 20 executing its predetermined maximum angle of rotation; thus when the cartridge system 604 exists in this mode the flow rate of solvent say water is significantly reduced for enabling soaping of hands and thus as mentioned enabling economic utilization of water and by extension economic, environmental and health conservation because the lever is now washed by hands that have been washed before the cartridge system is returned to its inactive mode by the turning of said lever 20 and thus also mitigating the spread of pathogens. The washing of lever 20 is enabled when said lever 20 is counter turned to intercept the line of flow 22 of liquid from spout 10 thus said lever 20 is disabled from the line of flow of solvent from spout 10 when hands are being washed.

Figure 36:
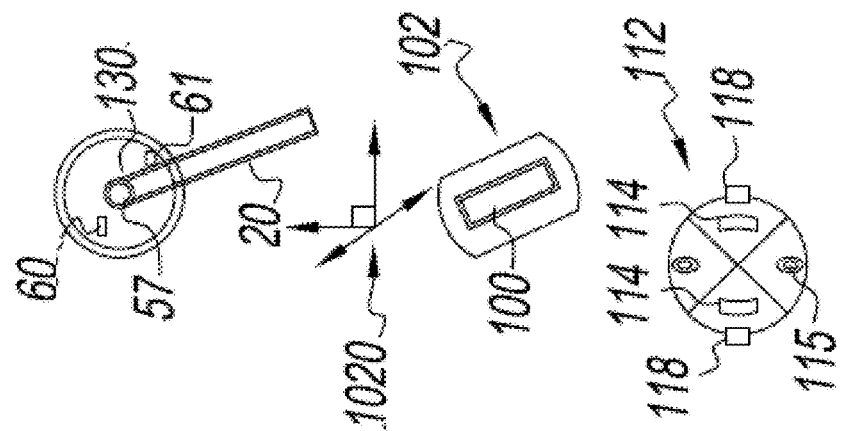
FIG. 36 shows a view of FIG. 33 for a left-handed user.
Figure 35:
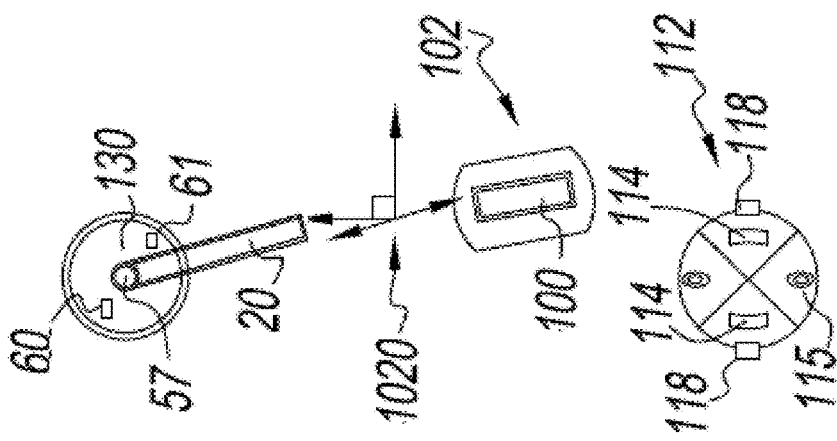
FIG. 35 shows a view of FIG. 32 for a left-handed user.
Figure 34:
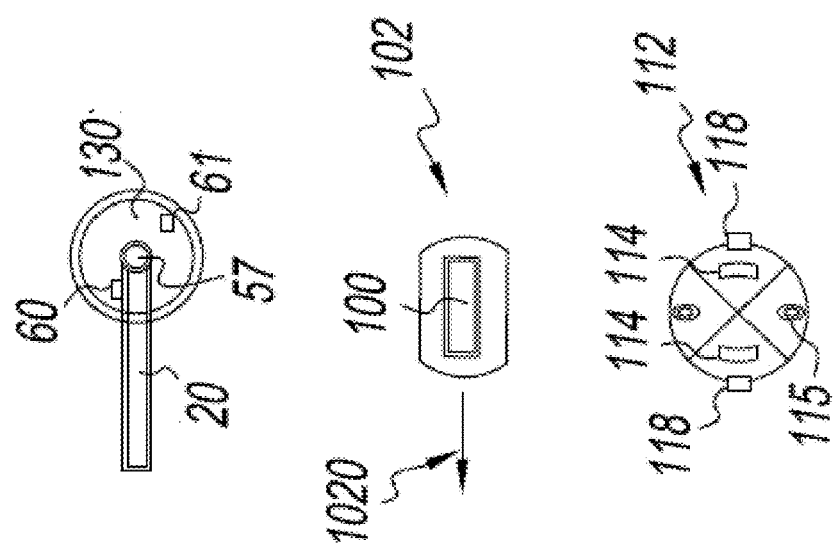
FIG. 34 shows a view of FIG. 31 for a left-handed user.

Referring to FIG. 34, FIG. 35 and FIG. 36 what is shown is a configuration of FIG. 31 FIG. 32 and FIG. 33 for an embodiment of the invention in which the said cartridge valve 420 is configured for activation by turning a lever counterclockwise for said systems activation. Such a system is a configuration in which the cartridge unit is left side of the base of a faucet basin and more suited for a left-handed person.

Figure 37:
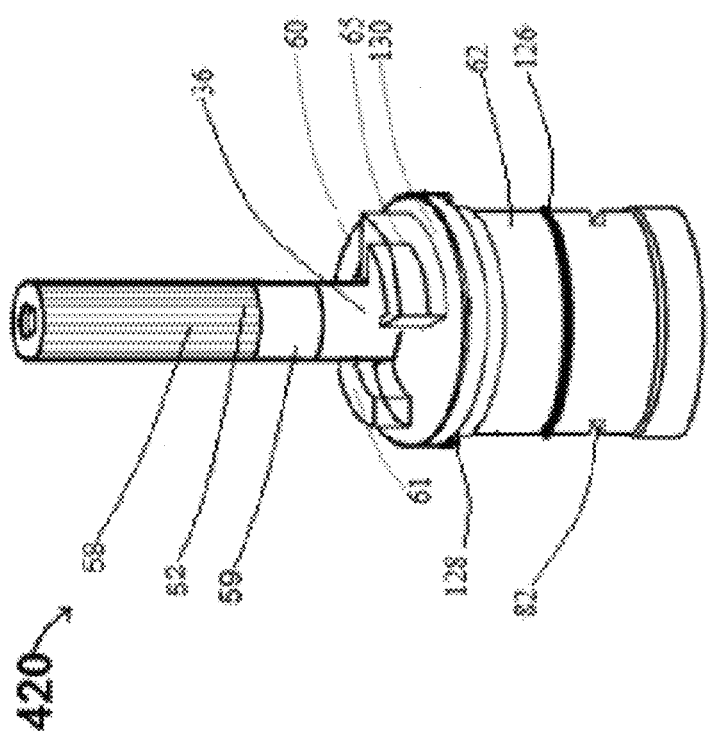
FIG. 37 shows a configuration of the cartridge unit 420 in closed mode. Cam unit 410 and lever unit 304 not shown.

Referring to FIG. 37, what is shown is an embodiment of a right-hand side cartridge valve 420 in the inactive mode were said member 65 attached to said stem 104 would abut stop member 60 to effect closing of openings 114 of stationary disc 112.

Figure 38:
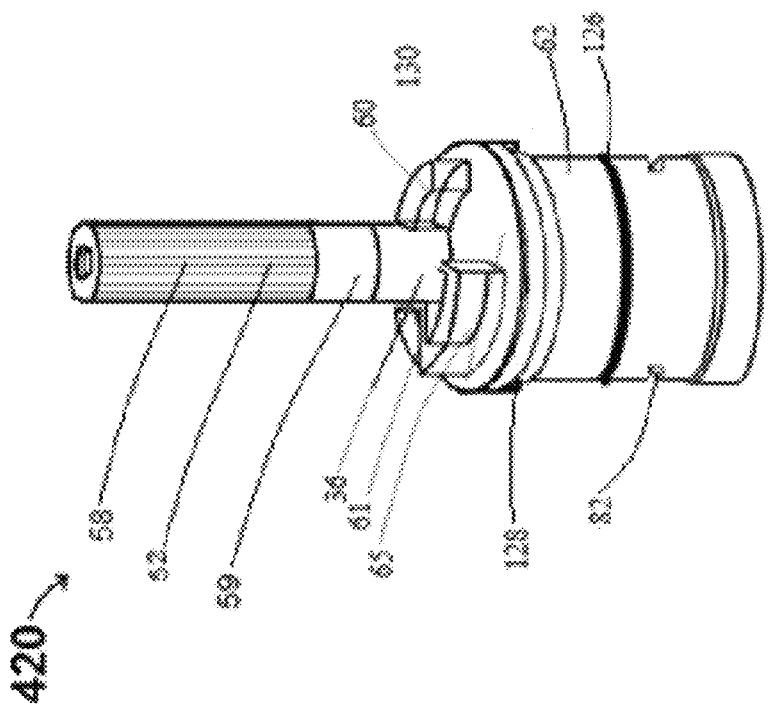
FIG. 38 shows a configuration of the cartridge unit 420 in open mode. Cam unit 410 and lever unit 304 not shown.

Referring to FIG. 38 what is shown is an embodiment of a right hand side cartridge valve 420 in the active mode and where rotation of the stem 104 through a maximum predetermined angle from the off configuration of the cartridge 420 would have been limited by stop member 61 when said member 65 of said stem 104 intercepts said stop member 61.

Referring to FIG. 39, what is shown is an embodiment of a cam attachment component unit 410. FIG. 40 shows an embodiment of the cartridge unit 420; cam attachment 410 and bonnet nut 205 not shown in FIG. 40. FIG. 41 shows a section in a vertical plane substantially symmetric through an embodiment of a cylindrically disposed detergent activation unit 430. FIG. 42 shows a section in a vertical plane substantially symmetric to an embodiment of a cylindrically disposed valve component unit 440. FIG. 43 shows a section in a vertical plane substantially symmetric to an embodiment of a cylindrically disposed detergent reservoir unit 450. FIG. 44 shows an integration of components units 410, 420, 430, 440 and 450.

Referring to FIG. 45, cam component member 410 shows a cam region while 460 with an inner grooved attachment region 34 of stem attachment region 462 of said cam component unit 410. Said inner grooved attachment 34 locks to region 52 of upper stem portion 57 of stem unit 104 in a complete assembled unit of the invention such that rotation of stem 104 substantially simultaneously rotates said cam component unit 410. Said cam unit component 410 is preferably made from non-corrosive metal such as copper, brass or hard plastic in order to ensure maximum and prolonged functional reliability; portion 462 of cam unit component 410 is shaped like an open cylinder such that said cam unit component region 462 inner region 34 is disposed to be modified to enable mating with region 52 of the upper portions 57 of stem 104. Referring to FIG. 45 region 460 of cam unit component 410 is disposed to have an arc outer cross-section 438 contiguous with a greater sloping side 439 and a lesser sloping side 436 of a truncated obolid. Said open circular annulus section 462 is grooved on its interior for mating attachment to said region 52 of upper region 57 of stem 104 for said cartridge unit 420. Alternatively, said lever 20 and said cam unit 410 are disposed to be a component unit 4500 with an open but common inner grooved open cylindrical region and where said cam region 462 and said lever handle 20 are angularly positioned on said open but common cylindrical region 462 as shown in FIG. 45*a*.

Referring to FIG. 45, said cam component 460 is enabled with a channel guide 437 that functions as a guide to a mini roller bearing 495 attached to a cam follower component 496.

Referring to FIG. 46, what is shown is an integration of said cam attachment component unit 410 to portion 52 of upper portion 57 for said stem unit 104 of said cartridge unit 420. Said cam component unit 410, said lever 20 and said upper portion 57 constitute a rigid body thus rotation of the stem 104 results in rotational movement of cam 460 and said stem 104 as a unit. Consequently, said cam component unit 410 and said lever 20 and said upper portion 57 will move as a rigid body, thus consistent with the properties of a rigid body said cam 460 will rotate consistent with the sense of clockwise or counter clockwise rotation of said lever 20. Additionally, said cam 460 rotation occurs with substantially relative invariance in angular configuration relative to said lever 20 thus enabling substantial invariance in a predetermined said angular separation of said cam component 460 and said lever 20 when said cam 460 and said lever 20 are attached to said stem 104. Said cam 460 is thus substantially constrained to move in a horizontal plane. Said cam 460 and said lever 20 are disposed to be separately mated to said upper stem portion 57 by groove fit thus enabling ease of manipulation for adjustment or replacement of the cam unit 410; furthermore a relationship between the cam and follower is enabled within the circular area generated by the lift of the cam 460 consequently enabling convenient positioning of a detergent activation unit for activation by said cam and follower; said detergent activation unit would also be in a relation to a wash basin. FIG. 46 functions to show the positioning of the cam unit 410 relative to the lever assembly 304; in an assembly of the invention the positioning of the bonnet nut 205 would precede the positioning of the cam unit 410 to be followed by the positioning of the lever unit 305.

Referring to FIG. 47, what is shown is an integration of cam unit component 410 and lever 20 to said upper portion 57 of stem unit 104; thus as stated said integration of cam unit 410 and lever 20 to said upper portion 57 substantially constitutes a rigid body, consequently initiation of rotation of lever 20 initiates rotation of stem 104 and thus rotation of cam unit 410. FIG. 47 functions to also show the positioning of the cam unit 410 relative to the lever assembly 304; in an assembly of the invention the positioning of the bonnet nut 205 would precede the positioning of the cam unit 410 to be followed by the positioning of the lever unit 305.

Figure 48:
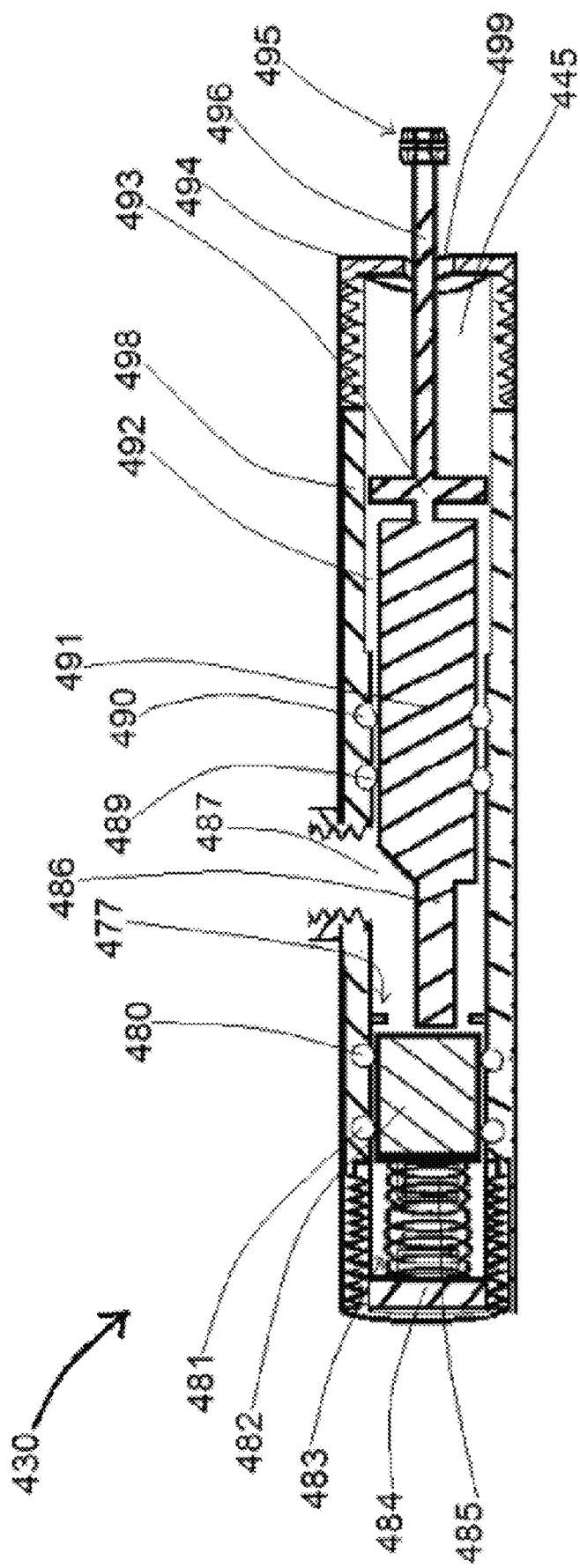
FIG. 48 shows the labeled parts of detergent activation unit 430 in a vertical plane of symmetry.

Referring to FIG. 48, what is shown 430 shown is a planar cross-section in a plane of symmetry for an embodiment of a detergent activation unit 430. Said section shown in FIG. 48 is symmetric to contiguous diametric flanges 465 and thus said flanges are not shown. Said detergent activation unit 430 comprises an outer stabilizing component unit 498 shown in FIG. 49, an inner valve component unit 484 shown in FIG. 56 and an inner piston component unit 449 shown in FIG. 60. FIG. 48*a* shows an embodiment of a planar cross-section in a plane at right angle to said section of detergent activation unit 430 shown in FIG. 48. As will be shown access openings 497 shown in FIG. 48*a* serve as a conduit for screws for securing said detergent activation unit 430.

Figure 49A:
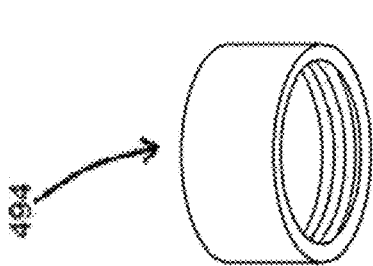
FIG. 49a shows a view looking into end cap 494.
Figure 49B:
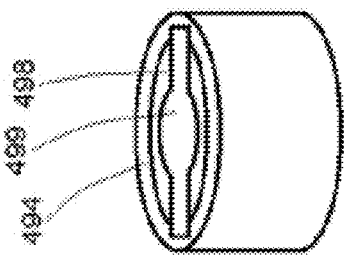
FIG. 49b shows an external view of the end cap 494.
Figure 49:
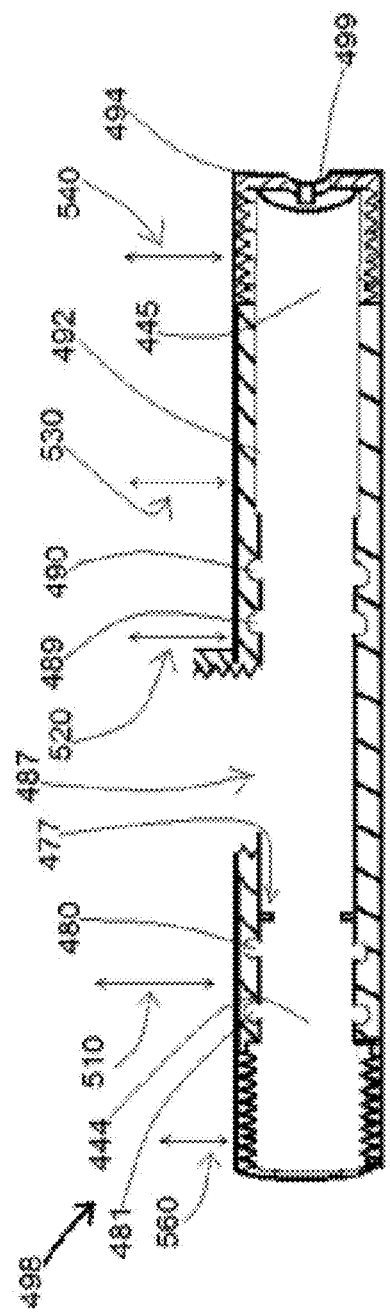
FIG. 49 shows the labeled parts of the encasement unit 498 for the detergent activation unit in a vertical plane of symmetry for the internal configuration of encasement unit 498.
Figure 55:
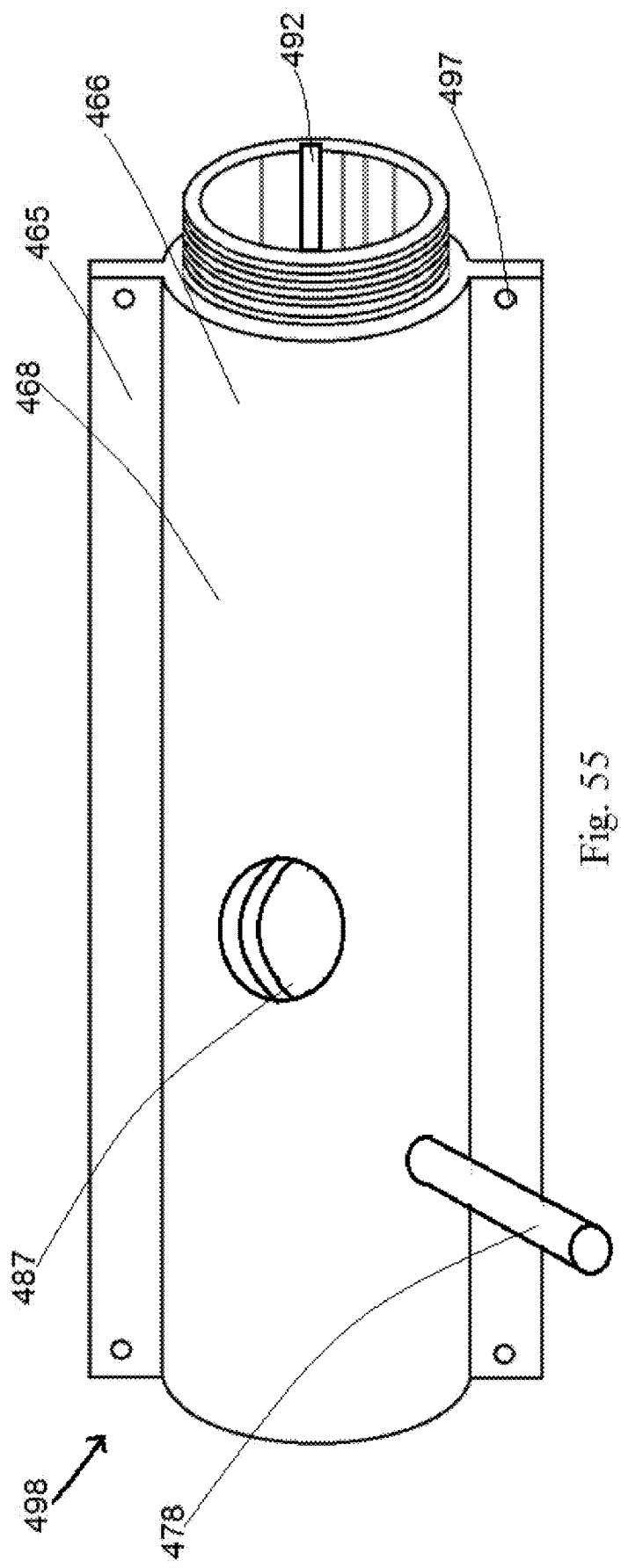
FIG. 55 shows an external view of an embodiment of the detergent activation unit 498.

Referring to FIG. 49, said stabilizing containment component 498 depicted in FIG. 49 may be described as a cylindrically disposed entity contiguous with diametrically rectangular prismatic flanges 465 as shown in FIG. 55. Said rectangular prismatic flanges 465 function to anchor said detergent activation unit 430 on a mounting base for a faucet. As shown in FIG. 55 said cylindrical disposed section of 498 is enabled with spirally grooved access opening 487 for attaching a detergent reservoir 450.

Referring to FIG. 49 components 480, 481 489 and 490 show access for sealing rings. It will be shown that said sealing rings in access 480, 481, 489 and 490 function to restrict the leaking of detergent from detergent reservoir region 450 when said reservoir 450 is assembled in access slot 487.

Referring to FIG. 49 said outer containment component 498 has end region 445 externally grooved to be compatible with end cap 494 were said end cap 494 is internally spirally grooved such that said end cap 494 is disposed to enclose externally spirally grooved region 445. It will be shown that said end cap 494 is enabled with an appropriately shaped access slot 499 were said access slot 499 functions to enable means for access of cam follower 496 of piston unit shown in FIG. 60. Said end cap region 494 thus enables removal and reattachment from said externally grooved region 445 when the need arises for insertion removal or assemble of the piston unit component 449 shown in FIG. 60. FIG. 49*a* shows a view looking into the spirally grooved interior of said end cap 494 while FIG. 49*b* shows an exterior view for said end cap 494. Said detergent activation unit components may preferably be configured from Bakelite, melamine or nylon or other compatible material.

Referring to FIG. 49, said component 498 has its internal region modified for insertion, translation, stability and optimal function of the piston unit component 449. Referring to FIG. 54 what is shown is a conceptual cross-section of through a vertical plane of said 445 through line 540 of FIG. 49 where said cross-section depicted in FIG. 54 lies in a plane containing line 540 and where said plane is perpendicular to the height of said cylindrically disposed 498. Referring to FIG. 53 what is shown is a conceptual cross-section of said 498 through line 530 of FIG. 49 where said cross-section depicted in FIG. 53 lies in a plane containing line 530 and where said plane is perpendicular to the height of said cylinder disposed 498. Referring to FIG. 52 what is shown is a conceptual cross-section of said 498 through line 520 of FIG. 49 where said cross-section depicted in FIG. 52 lies in a plane containing line 520 and where said plane is perpendicular to the height of said cylindrically disposed 498. Referring to FIG. 51 what is shown is a conceptual cross-section of said 498 through line 510 of FIG. 49 where said cross-section depicted in FIG. 51 lies in a plane containing line 510 and where said plane is perpendicular to the height of said cylindrically disposed 498. Referring to FIG. 50 what is shown is a conceptual cross-section of said 498 through line 560 of FIG. 49 where said cross-section depicted in FIG. 50 lies in a plane containing line 560 and where said plane is perpendicular to the height of said cylindrically disposed 498.

Figure 60:
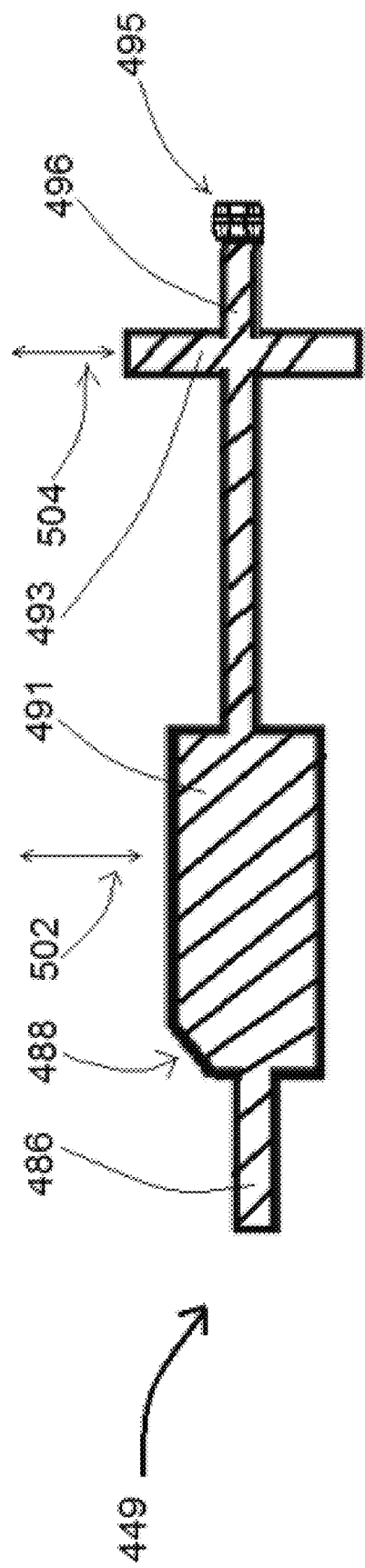
FIG. 60 shows a section view in a plane symmetric to the cylindrically disposed height of an embodiment of the piston unit 449 for the detergent activation unit.

Referring to FIG. 49 in combination with FIG. 53, diametrically paired slots 492 function to substantially resist rotation of piston unit 449 when diametrically paired flanges 493 are enabled on said piston unit 449 shown in FIG. 60. Said rectangular recessed slots 492 do not extend to region of said cylinder 464 were said slots 492 would impinge the function of o-rings 489 and 490.

Referring to FIG. 49, sealing rings 489 and 490 are enabled with access within the region defined by line 530 and line 520 of the interior of wall of said cylindrical component 498. Said piston component 449 is excluded from translation to regions of 498 defined between lines 530 and 520 as depicted in FIG. 49 thus enabling o-ring 489 and o-ring 490 to substantially resists entry of detergent fluid to said region 445 of said cylindrically disposed 498 depicted in FIG. 49.

Referring to FIG. 49, said cylindrical component 498 is enabled with a detergent containment region 487 where liquid detergent is enabled to enter said detergent region 487 and when detergent liquid in said detergent region 487 is initiated to be substantially dispelled. Region 487 is enabled with a circular flange 477 enabled on the interior wall of said cylinder 498. It will be shown that said flange 477 functions to contain a valve 482.

Referring to FIG. 51, what is shown is a conceptual cross-section of said 498 through line 510 where said cross-section depicted in FIG. 51 lies in a plane containing line 510 and where said plane is perpendicular to the height of said cylinder 498. Said cross-section is enabled with detergent outlet attachment extension 478 to said cylinder component 498 such that said outlet attachment extension 478 is sandwiched by sealing ring 480 and sealing ring 481. Said outlet attachment 478 is preferably connected to said cylinder 498 by spiral connection thus said outlet attachment 478 is enabled with detachment and attachment characteristics.

Referring to FIG. 49 and end cap component 475 of FIG. 57, said cylindrically disposed component 498 has end region 444 internally grooved to be compatible with closed end cap 475. Said end cap 475 is externally spirally grooved such that said end cap 475 is disposed to be enclosed by an internally spirally grooved region 444 of said 498. Said end cap 475 is preferably enabled with an inclusion for enabling removal and re-installation of said end cap 475 from said region 444 of said cylinder 498 by say a screwdriver.

Referring to FIG. 55, what is conceptually shown is a view of the detergent activation encasement unit 498. Said encasement unit 498 may preferably be configured from Bakelite, melamine or nylon or other appropriately compatible hard thermosetting nonmetallic or metallic material.

Referring to FIG. 56, what is shown is an embodiment of the detergent outlet valve unit 484. FIG. 57, FIG. 58 and FIG. 59 show embodiment of the individual component of said detergent outlet unit 484. FIG. 57 shows component 475 of said detergent outlet unit 484; FIG. 58 shows a spring component 483 of said detergent outlet unit 484 and FIG. 59 shows component 470 of said detergent outlet unit 484. Referring to FIG. 57, component 475 has a preferably solid cylindrical portion 471 contiguous with a cylindrically disposed annulus region 474 were said annulus 474 is spirally on its outer surface for spiral insertion in region 444 of said cylinder 464. Said outer spirally grooved cylindrically disposed component 474 is of a lesser radius than cylindrical component 471. Again referring to FIG. 57 said cylindrical region 471 of 475 is contiguous with a cylindrically disposed but preferably solid region 473 portion. Said portion 473 is preferably externally grooved for accepting spring 58. Said preferably solid region 473 is of a lesser radius than cylindrically disposed 474. Referring to FIG. 59, component 470 shows a cylindrical component 482 where said cylindrical component 482 is preferably concentrically contiguous with cylindrically shaped lesser radius component 485; said component 482 is excluded from translation to region of 498 defined between lines 510 and 560 as depicted in FIG. 49 thus enabling o-ring 481 to substantially resists entry of detergent fluid to said region defined between said line 510 and said line 560 of FIG. 49.

Said outlet valve 484 components may preferably be configured from Bakelite, melamine or nylon while the spring unit 483 is preferably made from stainless steel for resistance to the humid environment of a faucet.

Said component 485 depicted in FIG. 59 is further enabled with one or more spiral grooves 476 were said groove 476 function to stabilize spring component 483 when said spring 483 enshrouds said 485. When said 475, 483 and 470 are integrated in a functioning unit of the invention said spring unit straddles 473 and 485, however the sum total of the heights of said cylinder 473 and said cylinder 485 is less than that of the relaxed length of spring 483 thus enabling a compressive length of said spring 483 where, as will be shown the length of said compressive length of said spring 483 is greater that the translation of said piston unit 449 when said piston unit 449 is initiated to translate by a cam 460; under such restrictions components 473 and 485 thus function to enable stability of the spring 483 for the opening and closing of outlet 478 while disabling contact between said components 473 and 470.

Figure 63:
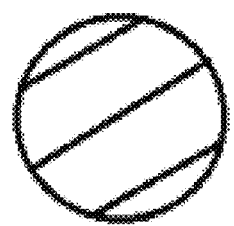
FIG. 63 shows a section view through line 502 in a plane at right angles to the cylindrically disposed height of piston unit 449 for FIG. 60.

Referring to FIG. 60, what is shown is an embodiment of the piston component unit 449. Said piston component 449 is disposed to be described as cylindrically varying disposed. Said piston component 449 is enabled with a larger diameter region 491 were said region 491 is predisposed to move substantially frictionless against the interior wall of said cylindrically disposed component 498. FIG. 63 shows a cross-section of said 491 through line 502 were said line 502 lies in a plane perpendicular to the axis of cylindrical disposed component section 491. As will be shown said component 491 is further enabled with a beveled upper component 488 were said beveled upper component 488 will be shown to function as a wedge for initiating motion of a valve member 632. Said piston component may be configured from Bakelite, melamine or nylon.

Contiguous with said piston component 491 within the interior of 498 is component 486 with a lesser radius than that of the radius of region 491. As will be shown said component 486 is of a lesser radius in comparison to the radius of said 491. It will be shown that said reduced radius of 486 in comparison to the radius of member 491 functions as a leading edge of the piston unit 449 for initiating contact with 482 of outlet valve unit 484 to enable dispensing of detergent through outlet 478 and for replenishing region 487 of 498 with detergent fluid in said region 487. Said component 486 is preferably concentrically contiguously enabled on said 491 and in region 487 of said cylindrically disposed 498. Contiguous with said component 491 and in region 445 of cylindrical disposed 498 is component 496. Said component 496 is of a lesser radius in comparison to the radius of 491 and will be shown function as a cam follower to said cam 460. Said component 496 is preferably concentrically contiguously enabled on said 491 and in region 445 of said cylindrically disposed 498. Enabled contiguously on 496 is a flange 493. Said flange 493 is enabled to be within the limits of access slots 492. Said flange 493 is disposed to be vertically oriented enabled on initiation to translate within said access slots 492 of region 445 of said cylinder 498. As will be shown said flange 493 functions to stabilize said piston component unit 449 and ensures said 491 stays within the function of sealing rings 489 and 490. End portion 495 of 496 is predetermined to interact with cam 460 when initiated. Said 495 region of 496 is preferably vertically enabled with a roller bearing to ensure longevity of the piston unit component in an assembly and mounted unit of the invention.

Figure 64:
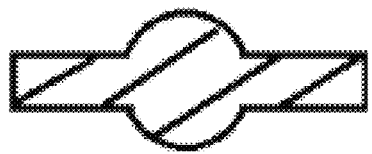
FIG. 64 shows a section view through line 504 in a plane at right angles to the cylindrical disposed height for member 493.
Figure 62:
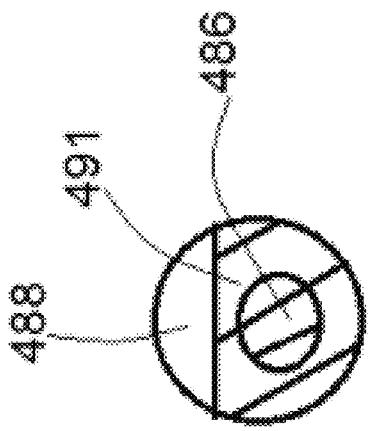
FIG. 62 shows a view from the left of piston unit 449 of FIG. 60.
Figure 61:
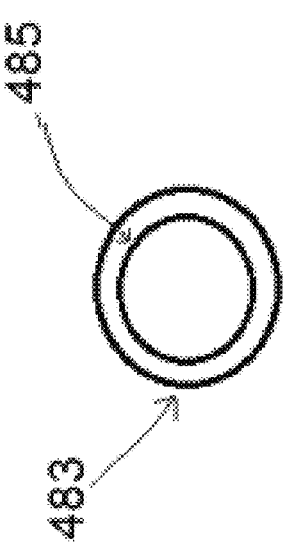
FIG. 61 shows a view through line 500 of FIG. 56 in a plane at right angles to the cylindrically disposed height of member 485.

Referring to FIG. 61 what is shown is a cross-section in a vertical plane at right angles to the cylindrical height of 485 through line 500 of FIG. 5 of the assemble of spring 483 and a cross-section of 485. Referring to FIG. 62, what is shown is a view of piston component 449 of FIG. 60 from the left. Referring to FIG. 63 what is shown is a cross-section projection of 491 in a vertical plane at right angles to the height of cylinder 491 through line 502. Referring to FIG. 64, what is shown is a cross-section in a vertical plane at right angles to the deposition of the cylindrical height of 496 through 493 and containing the line 504.

Figure 65:
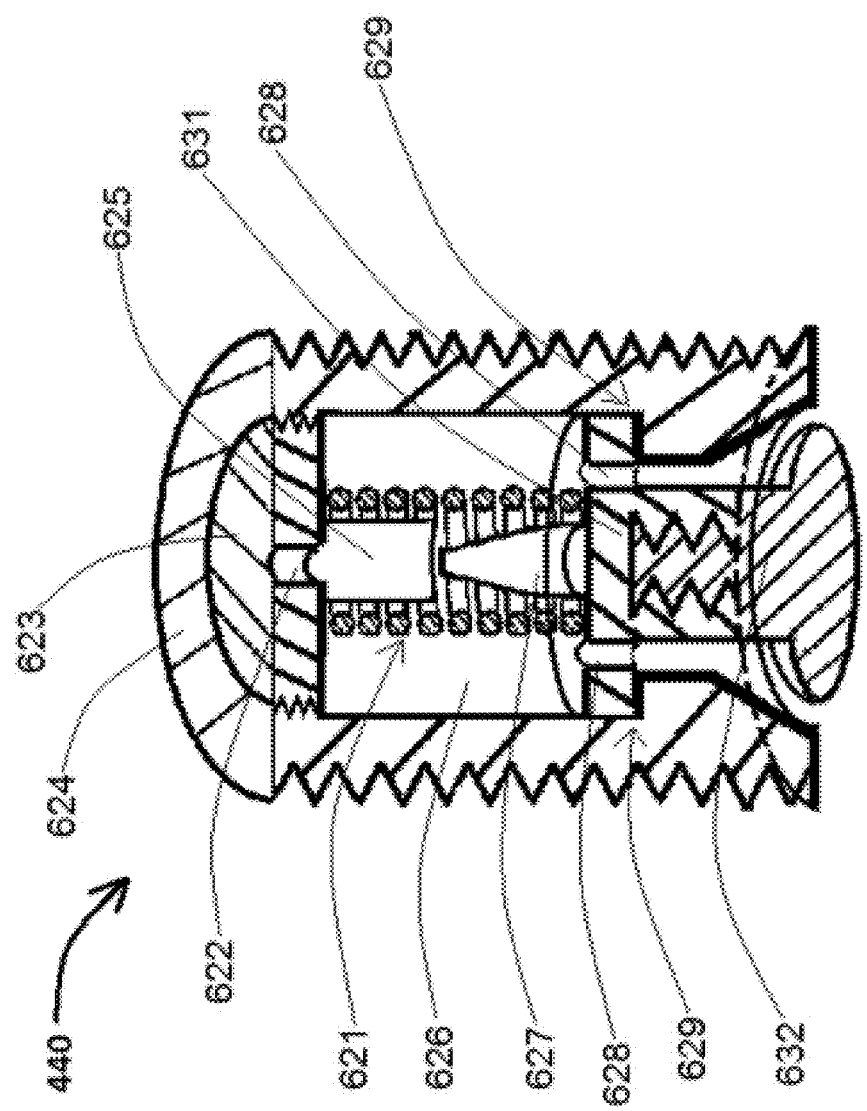
FIG. 65 shows a section view in a vertical plane of the cylindrically disposed inlet detergent valve unit 440.
Figure 68:
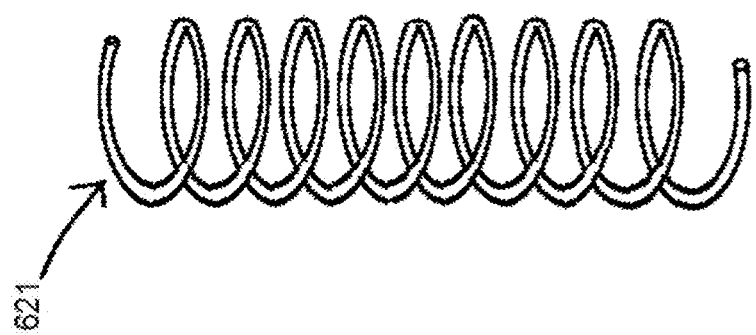
FIG. 68 shows spring component 621 for the inlet detergent valve unit 440 shown in FIG. 65.

Referring to FIG. 65, what is shown is an embodiment of a vertical semicircular disposed cross-section of an inlet valve unit 440. Said inlet valve 440 functions to enable flow of detergent to reservoir region 487 of detergent activation unit 430. The components of said valve component unit 440 are labeled 680 shown in FIG. 66, 681 shown in FIGS. 67 and 682 and 621 shown in FIG. 68.

Said inlet valve 440 components may preferably be configured from Bakelite, melamine or nylon while the spring unit 621 is preferably made from stainless steel for resistance to the humid environment of a faucet.

Figure 66:
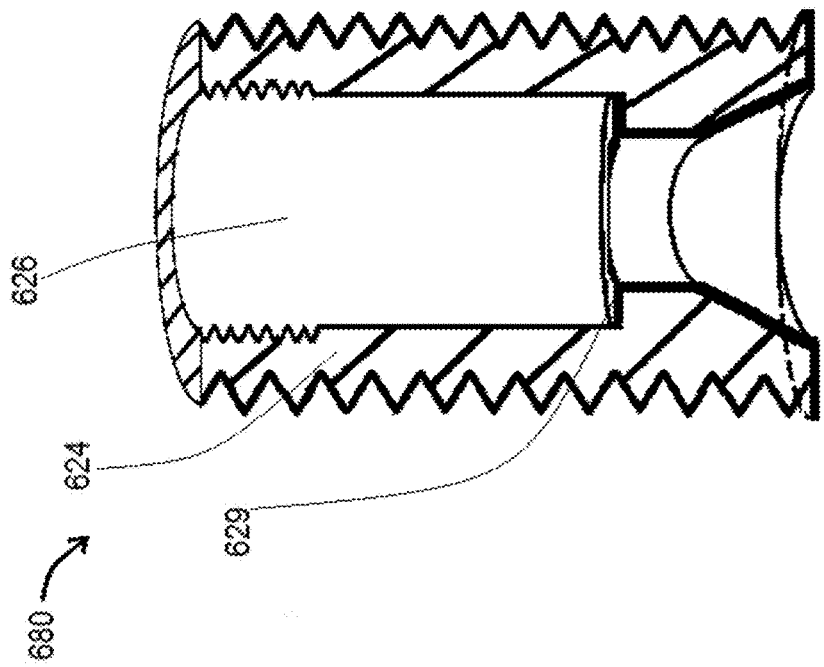
FIG. 66 shows a section view in a vertical plane of encasement 680 for inlet detergent valve unit 440.

Referring to FIG. 66, component 680 shows a cylindrically disposed containment 624. Said containment 624 has a region 626 internally spirally grooved for receiving external spirally grooved component 623. Also enabled in the interior of said 624 at the region distal to region 626 is a shoulder 629. As shown in FIG. 65 said valve component 682 shown in FIG. 67 is enabled to freely rest on said shoulder 629 of the interior of said 624. Said containment 624 is externally spirally grooved for insertion connection in the conduit component 724 of an internally grooved detergent conduit depicted in FIG. 74. Said region of 624 distal to region 626 flares conically to reservoir region 487 of said cylinder 498.

Figure 67:
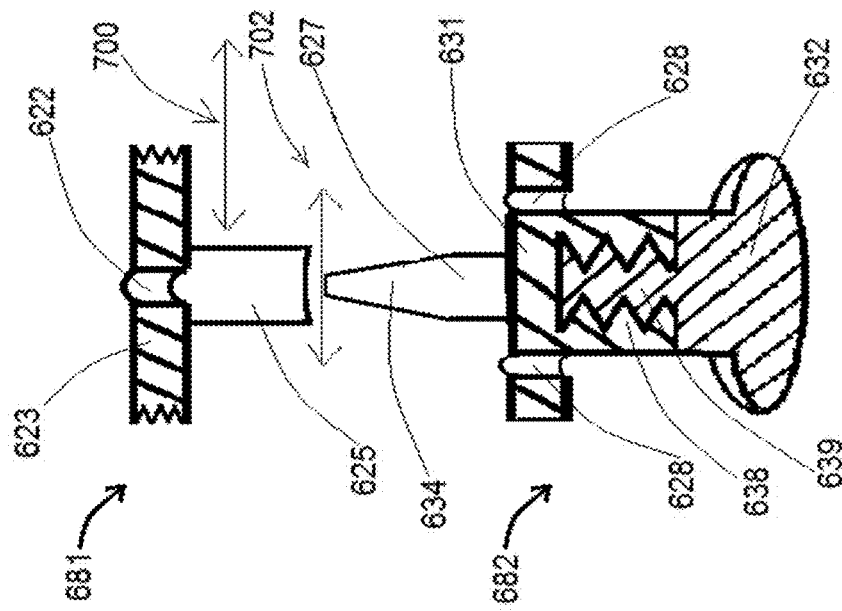
FIG. 67 shows a relation view in a vertical plane for members 681 and 682 for the inlet detergent valve unit.

Referring to component 681 shown in FIG. 67 is an annulus shaped component 623 were said component 623 is spirally grooved on its outer curved surface. Said component 623 is concentrically enabled with a circular access opening 622 were said access opening 622 functions as a conduit for detergent fluid. Contiguous and concentric to component 623 is component 625 were said component 625 is an annulus shaped. The radius of said component 625 is less than the radius of component 623 but greater than the radius of component access conduit opening 622. Said component 625 functions as a guide for spring component 621.

Referring to component 682 depicted in FIG. 67 said component 682 is disposed to be a composite shape characterized as a solid truncated cone 634 contiguous with a preferably solid cylindrical section 627 where the larger base radius of said solid truncated cone 634 is common to the radius of said cylinder 627. Said preferably solid cylinder 627 is concentrically contiguous with a circular face of an alternate cylinder 631 were said cylinder 631 is enabled with a larger radius than that of said cylinder 627. Said cylindrical component 631 is further enabled with conduit channels 628 extending from a circular face of said cylinder 631 to the alternate face of said cylinder 631. Said channels 628 enable the flow of detergent to said region 487 of detergent activation unit 430. Said cylinder 631 alternate circular face is further enabled concentrically and contiguously with an alternate solid cylinder 638 were said alternate solid cylinder 638 is internally spirally grooved for insertion of externally spirally grooved extension 639 of component 632 depicted in FIG. 67. Said externally grooved extension 639 is contiguous with said 632. Said component 632 is disposed to be characterize as a cylinder enabled with a partial spherical component where said cylindrical section is internally spirally grooved.

Figure 71:
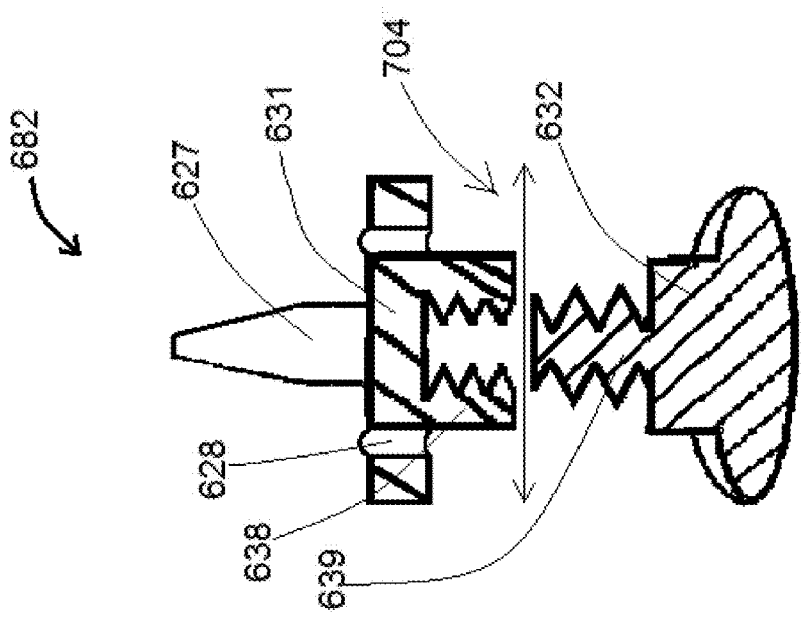
FIG. 71 shows a view in a vertical plane of symmetry for members 682 and 632 of inlet valve unit 440 as shown in FIG. 42.
Figure 70:
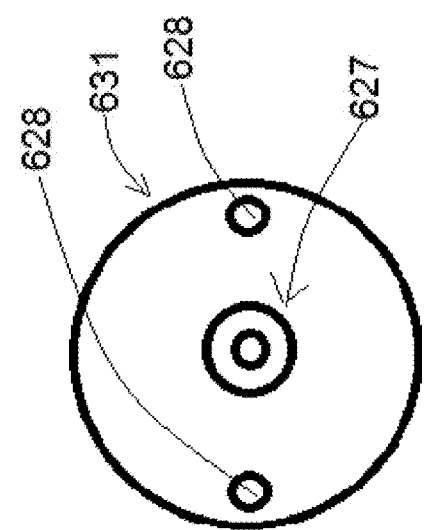
FIG. 70 shows a view in a horizontal plane containing the line 702 of FIG. 67 looking down to 682.
Figure 69:
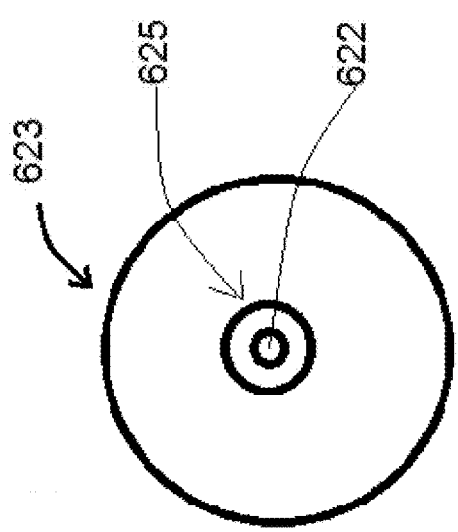
FIG. 69 shows a view in a horizontal plane containing line 700 of FIG. 67 looking up to 681.
Figure 73:
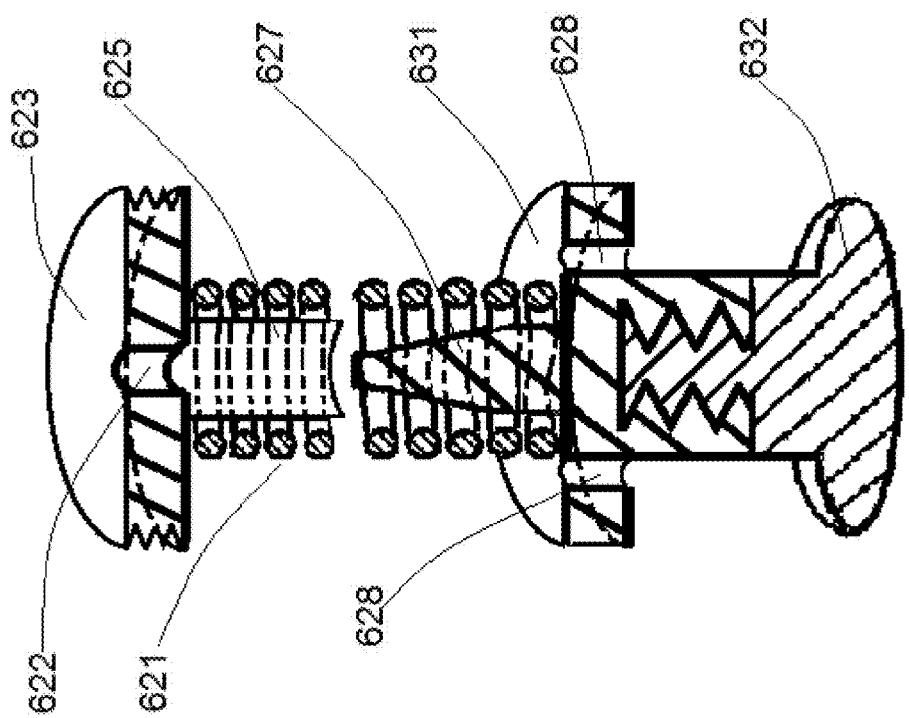
FIG. 73 shows a view in a vertical plane of symmetry for the internal parts of the valve unit of 440 of FIG. 65.
Figure 72:
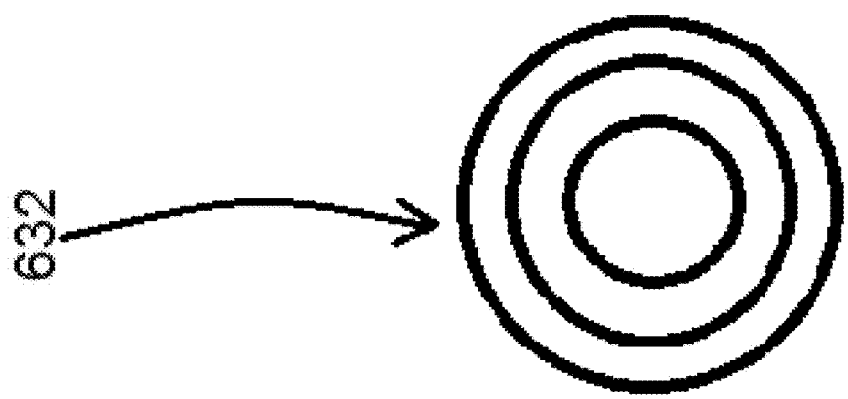
FIG. 72 shows a section outline view in a horizontal plane containing line 704 of FIG. 71 looking down to 682.

FIG. 69 shows a relative upward looking view of 681 through a horizontal plane at right angles to the height of cylindrical annulus 625 where said plane contains the line 700 of FIG. 67. FIG. 70 shows a depressive view of 682 through a horizontal plane containing line 702 and where that plane is parallel to a circular face of cylinder 631 shown in FIG. 67. FIG. 72 shows a depressive view of 632 with its spirally grooved extension 639 through a plane containing line 704 of FIG. 71 and where that said plane is parallel to a circular face of cylinder 631. FIG. 73 shows a section of the configuration of said component 681 and said component 682 enabled with spring member 621. Extreme ends of said spring 621 enshrouds component 625 and component 627 such that spring 621 is enabled to be compressed when said cylinder 631 is initiated to translate by component 632 from said shoulder 629 of 624. Said shoulder functions as a support base for component 631.

Figure 74:
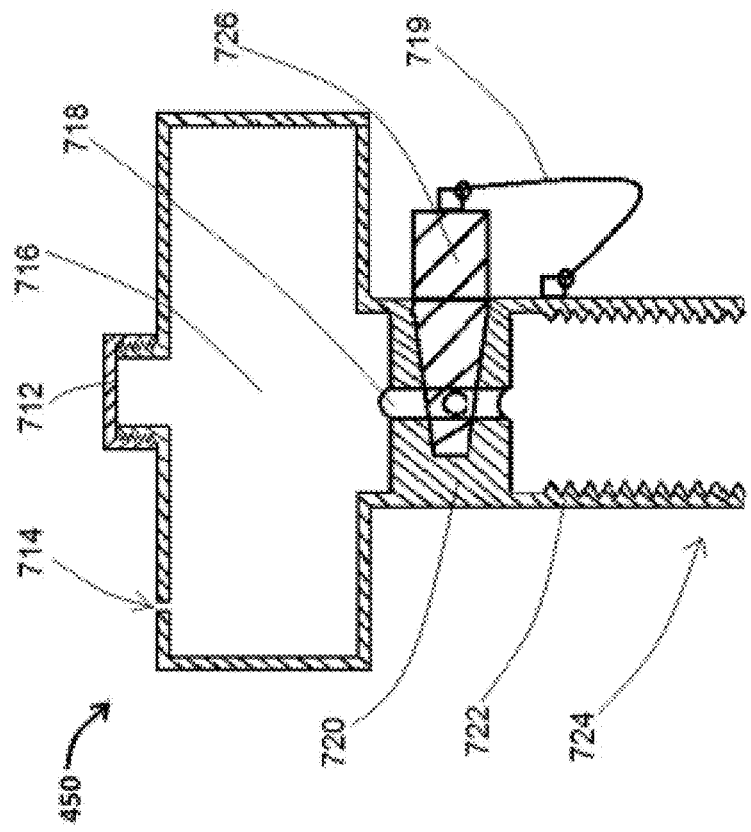
FIG. 74 shows a view in a vertical plane of the configuration of detergent reservoir unit 450.

Referring to FIG. 74; what is shown is an embodiment of the detergent component containment unit 450. Said detergent containment unit is enabled with a preferably cylindrical detergent reservoir 716 with means 726 for enabling flow or disabling flow of detergent from said detergent reservoir 716. Component 712 of said detergent reservoir functions as a spirally grooved cap. Removal of said spirally grooved cap 712 enables refilling of said detergent containment reservoir. Said detergent containment reservoir is also enabled with an opening 714. Said opening 714 functions to enable detergent fluid to enter region 487 of 464 when motion of said piston 491 enables a pressure difference between said region 487 and said detergent containment reservoir 716. Said opening 714 enables pressure in said containment reservoir 716 to be that of the atmosphere when the pressure in region 487 is allowed to be less than that of atmospheric pressure thus enabling flow of liquid detergent in said region 487. Said detergent reservoir 450 is preferably made from polypropylene, polystyrene, polycarbonate plastic or allied compatible transparent or see through recyclable plastic. Transparent or see through reservoir 450 better enables management of detergent solution for timely refilling or replacement of said detergent reservoir 450. Due to anticipated multiple intervention of the reservoir 450 for refilling or replacement a recyclable material for the said reservoir 450 is preferred thus enabling environmental energy and material conservation.

Referring to FIG. 74, said detergent containment unit is enabled with a preferably cylindrical conduit 722 were said conduit 722 is preferably of a lesser radius than 716 but contiguous with detergent containment reservoir 716. Said conduit is enabled with a thicker wall cylindrical annulus region 720 where the central concentric opening 718 is of a lesser radius than the radius of said cylindrical disposed component 722.

Referring to FIG. 74, the lower region of said 722 is internally spirally grooved for accommodating inclusion of valve component 440 shown in FIG. 65 and for interface with region 487 of detergent activation unit 430 shown in FIG. 55.

Figure 75:
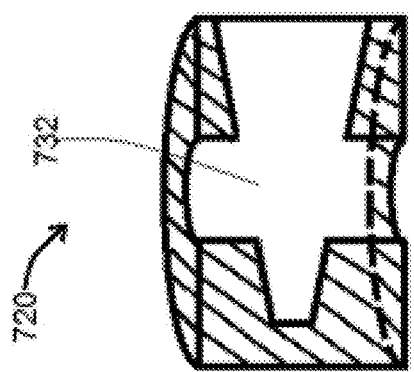
FIG. 75 shows a view in a vertical plane of symmetry of a choke point for enabling flow or disabling of detergent from the detergent reservoir.

Referring to FIG. 75 what is shown is an inclusion 732 enabled in said annulus region 720 were said inclusion 732 is configured to accommodate component 726 thus enabling said 726 to initiate enabling or disabling flow of detergent from said containment reservoir 716.

Figure 76:
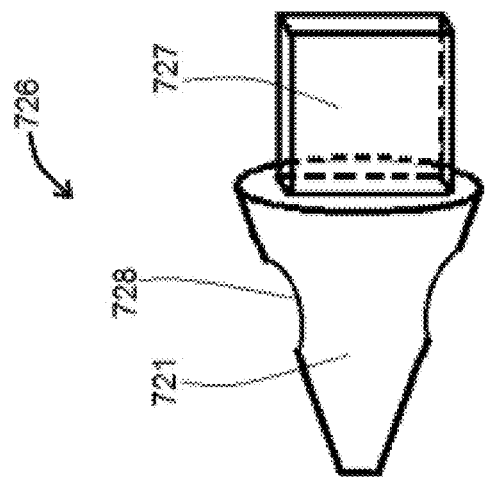
FIG. 76 shows a view of a stopper for enabling or disabling flow of detergent through choke point 720 shown in FIG. 75.

Referring to FIG. 76, what is shown is component 726. Said component 726 is disposed to be characterize as a truncated cone 721 contiguous with a rectangular prism 727 were said rectangular prism 727 functions as a lever for initiating motion of said truncated cone 721. Said truncated cone 721 is enabled with a conduit 728 where said conduit is enabled with diametric openings on the curved surface of said truncated cone 721. Said components 726 may preferably be configured from Bakelite, melamine or nylon.

Figure 79:
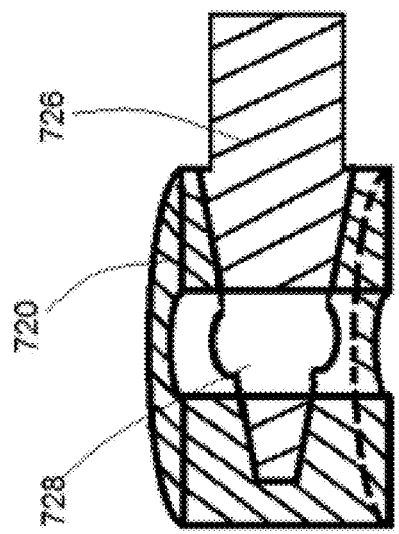
FIG. 79 shows a section in a vertical plane of the stopper 726 inserted into choke point 720 in the open mode.
Figure 78:
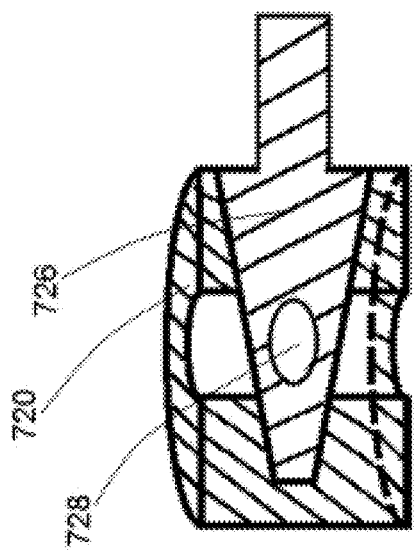
FIG. 78 shows a section in a vertical plane of stopper 726 inserted into choke point 720 in the closure mode.
Figure 77:
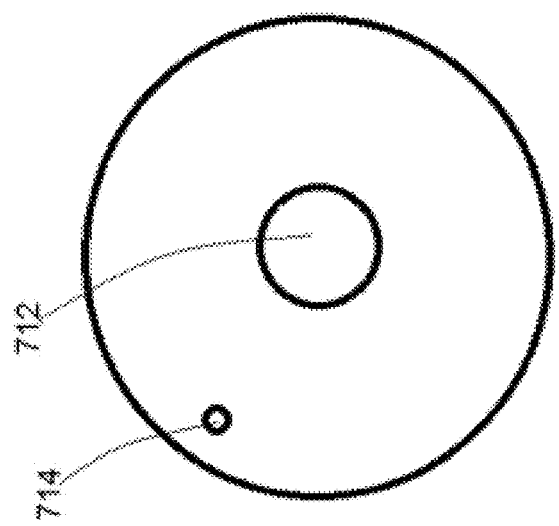
FIG. 77 shows a top view of the detergent reservoir unit 450 shown in FIG. 74.

Referring to FIG. 77, what is shown is a top view of an embodiment of the containment reservoir 716. Referring to FIG. 78 what is shown is an orientation of said component 726 in region 732 of 720 when said component 726 disables the flow of detergent from containment reservoir 716; said conduit 718 is then substantially perpendicular aligned to said conduit 728 such that the flow of detergent fluid is disabled from detergent from containment reservoir 716. Referring to FIG. 79 what is shown is an orientation of said component 726 in region 732 when said component 726 enables the flow of detergent from containment reservoir 716 of detergent containment reservoir 716; said conduit 718 is then substantially parallel aligned to with conduit 728 such that the flow of detergent fluid is enabled from containment reservoir 716.

Figure 80:
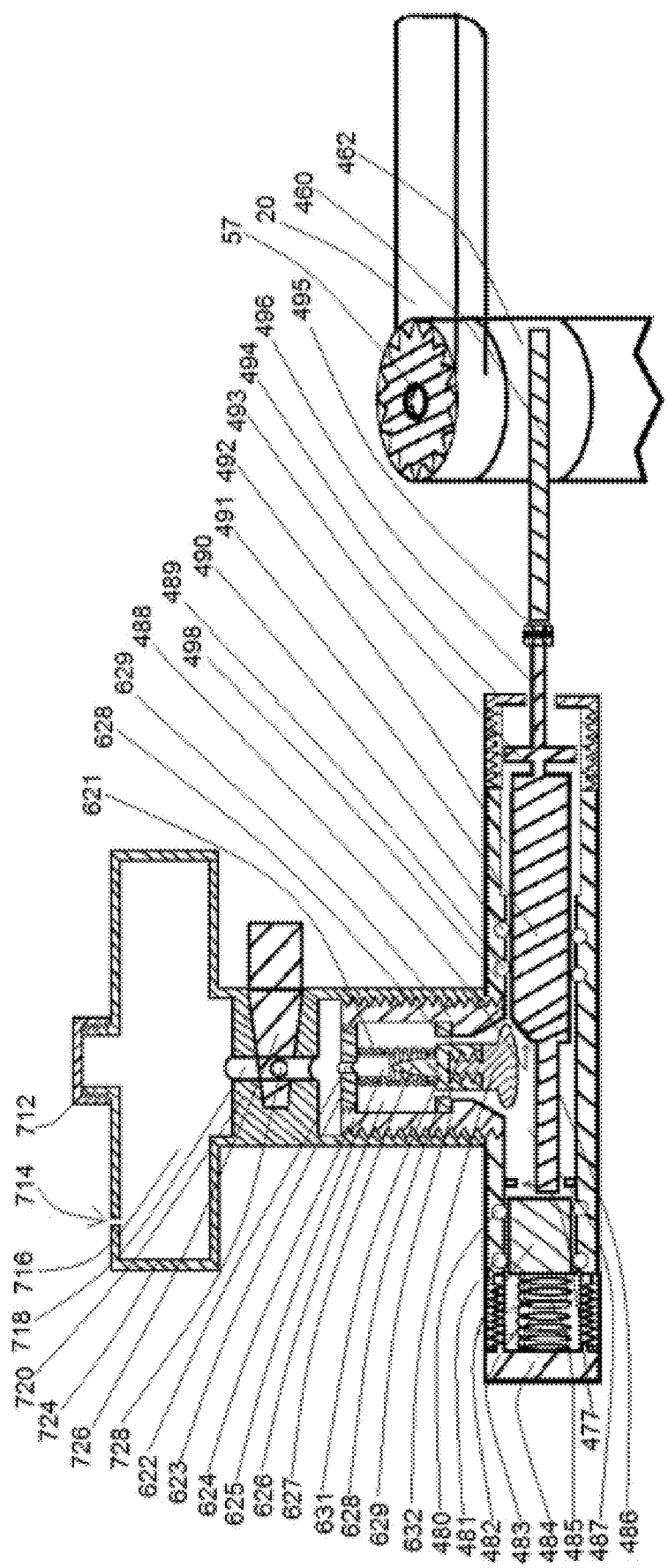
FIG. 80 shows a vertical section through the detergent unit and the detergent activation unit when assembled, and the invention is in the off mode for the position of the lever.

Referring FIG. 80, a clockwise sense of rotation of said lever 20 for the invention will now be enacted. A counter-clockwise sense of rotation of lever 20 is a mirrored action for a clockwise sense of rotation. A description for the function of the entity is for an embodiment in which detergent is expelled substantially at about the same time that water is enabled to flow through spout 10 for the washing of hands, thus a coordination between the translation of the piston substantially parallel to the axis of cylindrically disposed 464; the compressive length of spring of spring 483; the lift of the cam 410; the travel of the valve 482 prior to expulsion of detergent; the retraction of the cam 410 prior to completion of the maximum predetermined angle of rotation of lever 20 are enabled and coordinated within the maximum predetermined angle of rotation of said lever 20. An embodiment of the invention in which the leading edge 486 of piston component 491 is substantially close to outlet valve 482 in the inactive state is preferred for timely dispensing of detergent. The washing of the lever is preferably enabled on the counter rotation of said lever 20 and subsequent to the completion of the maximum predetermined rotation of said lever 20.

The washing of the lever 20 is preferably enabled on the counter rotation of said lever 20 and subsequent to the completion of the maximum predetermined angle of rotation of said lever 20 when cam 460 would have retreated while the lever 20 was being turned from the off position to its off position to its maximum predetermined angle of rotation. The vertical line of flow of water from spout 10 is not intercepted by lever 20 when stops 60 and 61 restrict said lever 20 to its predetermined maximum angle of rotation. Thus, the utility of the invention disposes its use to just washing hands with detergent prior to maximum predetermined rotation of said lever 20 when water flows through spout 10 followed by an option to wash said lever after completion of the maximum predetermined rotation of said lever 20. Consequently, when moveable disc 102 and stationary disc 112 are configured for maximum opening of 114 in the stationary disc for a turn of 90 degrees then a predetermined maximum angle of rotation of lever 20 is greater than 90 degrees consequently stops 60 and 61 on body surface 90 are not disposed to being solely diametrically opposite.

Referring to FIG. 80 what is shown is a sectional view through a vertical plane of an integrated configuration of said cam component unit 410 shown in FIG. 39; what is shown are said cartridge component 420 shown in FIG. 40, said detergent activation unit shown in FIG. 41, said inlet valve component unit shown in FIG. 42 and said detergent containment unit shown in FIG. 43 when said configuration depicted in FIG. 80 exists in an inactive configuration.

Figure 81:
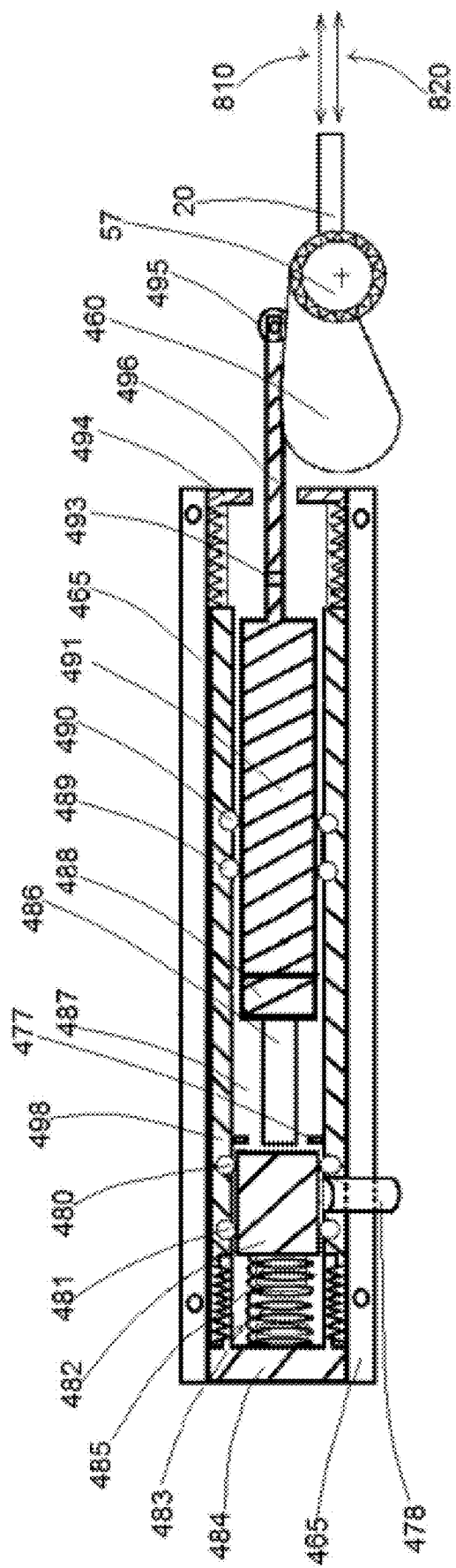
FIG. 81 shows a section in a horizontal plane through the detergent activation unit when assembled and the invention is in the off mode for the position of the lever with top view of the cam.

Referring to FIG. 81 what is shown is a section in a horizontal plane of the detergent activation unit 430; said cam follower 496 is configured to function as an off-set follower 496 were said off-set cam follower 496 may be enabled with a roller bearing 495. The cylindrical axis of said cam follower 496 coincides with line 810 of said cylindrically disposed cam follower 496.

Referring to FIG. 80 the component 486 of piston component 491 is constrained to be in substantial proximity to valve component 482 thus spring component 483 exists in its relaxed configuration, consequently enabling closure of outlet 478 by said valve component 482. Referring to FIG. 80, said component 631 rests on shoulders 629 when valve 632 is deactivated consequently enabling flow of detergent through conduits 628 to region 487 of 464 when said system is primed for initiation to function where such priming action constitutes a back and forth motion of said piston 491 to open and close valve component 632. Said back and forth motion of piston component 491 initiate opening and closing of valve 632 thus enabling a pressure difference between interior volume 716 of detergent reservoir 450 depicted in FIG. 74 and region 487 of cylinder 498 for the detergent activation unit 430.

Referring to FIG. 81 what is shown is a sectional view in a horizontal plane of an integrated configuration of said cam component unit 410 shown in FIG. 39, said cartridge component 420 shown in FIG. 40, said detergent activation unit shown in FIG. 41, said inlet valve component unit shown in FIG. 42 and said detergent containment unit shown in FIG. 43 when said configuration depicted in FIG. 81 exists in an inactive configuration. Member 495 is positioned within groove 437 of cam unit 410.

Figure 82:
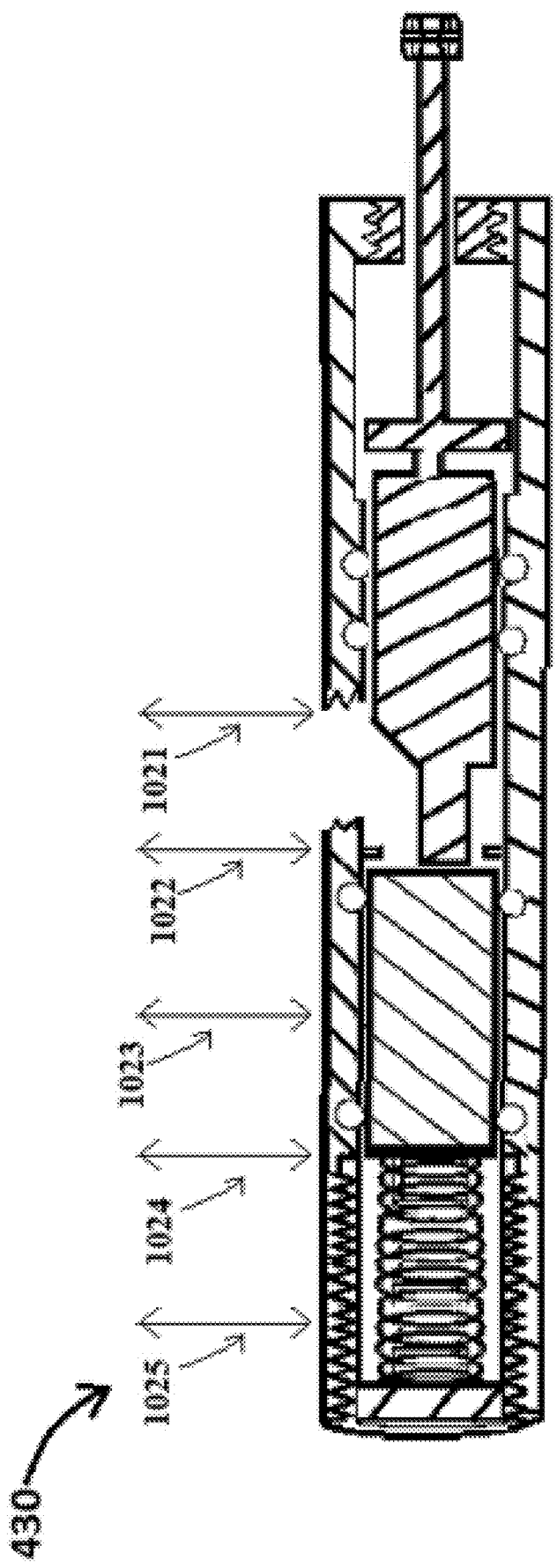
FIG. 82 shows a phase of configuration of the detergent activation unit in the closed mode for relating a relation between the input of detergent and the output of detergent.

Referring to FIG. 82, what is shown is a diagrammatic representation of the inactive state of the invention. In the inactive state when a lever handle is parallel to component 496 said valve 632 is normally open while said valve 482 is normally closed. Said leading edge 486 of piston component 491 is substantially close to valve 482 and additionally, outlet spring 483 and inlet spring 621 are in a relaxed state. FIG. 82 shows leading edge 486 and valve 632 between the lines 1021 and 1022. The outlet 478 is between lines 1022 and 1023. The outlet 478 diametric dimension is less than that of the separation between lines 1022 and 1023 thus by choosing the travel of the leading edge before opening of valve 478 to be greater than the separation between lines 1021 and 1022 both valves 632 and 482 can be closed to enable build up of pressure in 487 before valve 482 opens to dispel fluid through conduit 478 while valve 632 remains closed.

It is preferred that detergent be expelled substantially at the same time as the flow of water through spout 10 or immediately prior to the commencement of water flow through spout 10. Prior expulsion of detergent is enabled when the moveable disc 102 sufficiently blocks area 114 of the stationary disc 112 to allow turning of stem 104 by the lever 20 to enable a cam 460 and follower 496 interaction to activate detergent expulsion prior to water flow through openings 114 of the stationary disc. A geometric relation between the angular position of the cam 410 on the stem 104, the lift of said cam 410, the follower 495, the leading edge 464 and valve 482 can be enabled to allow timely expulsion of detergent within the interval of turning of lever 20.

Figure 83:
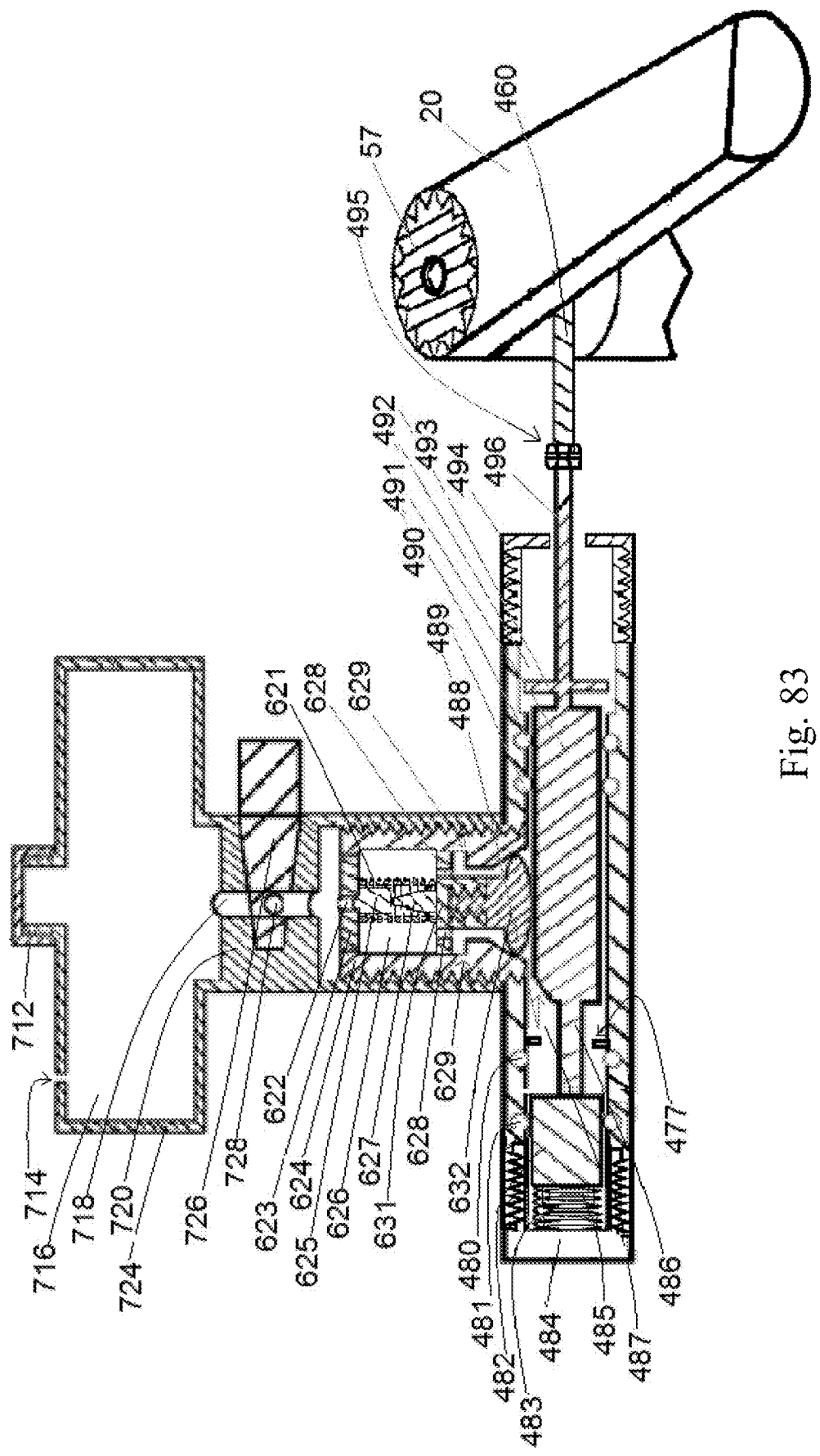
FIG. 83 shows a vertical section through the detergent unit and the detergent activation unit when assembled and the invention is in the activation mode for the position of the lever.

Referring to FIG. 83 what is shown is a vertical sectional view of an integrated configuration of said cam unit 410 shown in FIG. 39, said cartridge component 420 shown in FIG. 40, said detergent activation unit shown in FIG. 41, said inlet valve component unit shown in FIG. 42 and said detergent containment unit shown in FIG. 43 when said lever 20 has further turned clockwise a predetermined angle say clockwise and the cam unit 410 is at its maximum displacement and the spring 483 exerts a maximum restoring force on the outlet valve unit 482. As said lever 20 is further rotated clockwise, said cam 460 intercepts said cam follower 496. Said piston 491 is substantially constrained by channel 492 to only motion by translation consequently enabling predictable functioning of the invention.

Referring to FIG. 83, the rotation of lever 20 enables beveled edge 488 of said piston 491 to function as a wedge to intercept and initiate vertical translation of valve member 632 thus dislodging inlet valve component 682 shown in FIG. 67 from its seat 629 and thus initiating distortion of spring 621 and thus enabling a restoring force on said spring 621 and consequently enabling member 632 to propagated normal force on said piston unit component 491 shown in FIG. 60.

Thus piston unit component 491 shown in FIG. 60 is acted on by an axial force by said outlet spring member 483 and a normal force by inlet spring member 621 where said inlet spring force by member 621 on said piston unit 491 component functions to oppose the influence of said outlet spring force on said piston unit component 491 and thus enabling the choice of a spring component 621 that would neutralize the influence of spring 483 on the rotation of stem 104 when there is interaction between cam 410 and piston 491.

Additionally, vertical motion of valve member 632 further enables closure of said valve 632 thus disabling flow of liquid detergent through conduits 628 to region 487 of cylinder 498 consequently enabling build up of fluid pressure in region 487 of said cylinder 498 when said lever 20 continues to rotate and said valve member 632 continues to maintain a stress on said piston member 491 when valve 482 is still closed.

Referring to FIG. 83, said lever 20, said cam 460 and said stem 104 substantially function as a rigid body thus clockwise motion of lever 20 enables said cam unit 410 to translates piston 491 consequently enabling piston extension 486 to intercept and translate and open outlet valve 482 and thus enable ejection of detergent fluid through outlet 478.

Figure 84:
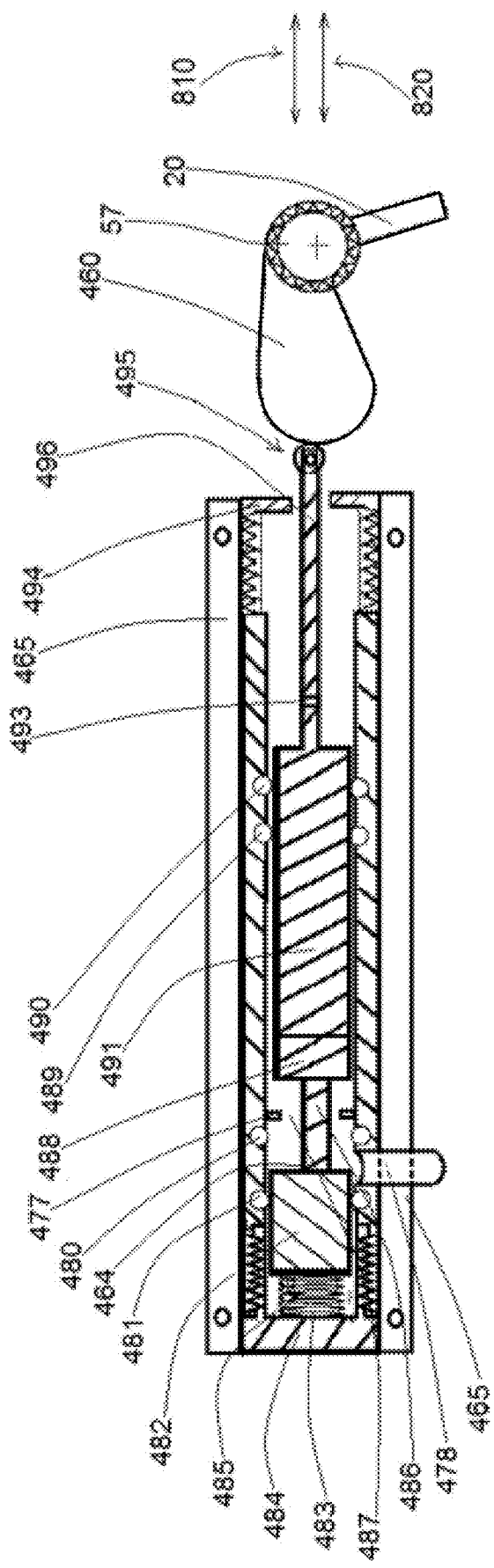
FIG. 84 shows a section in a horizontal plane through the detergent activation unit when assembled and the invention is in the activation mode for the position of the lever with top view of the cam.

Referring to FIG. 83, said cam 460 on its rise interval has translated said piston extension a measure substantially that of the lift enabled by the said cam 460 thus the extreme point on the radius of said cam 460 lies on the line 810 of the central axis of cam follower 496 depicted in FIG. 84. Said outlet spring component 483 would thus have been distorted a displacement substantially that of the lift enabled by said cam 460 when said distorted displacement of said spring member 483 is allowable by the physical characteristics of said spring component 483. Said cam member 460 is predetermined to execute its maximum lift prior the execution of the clockwise maximum predetermined angle of rotation of said lever 20.

Figure 85:
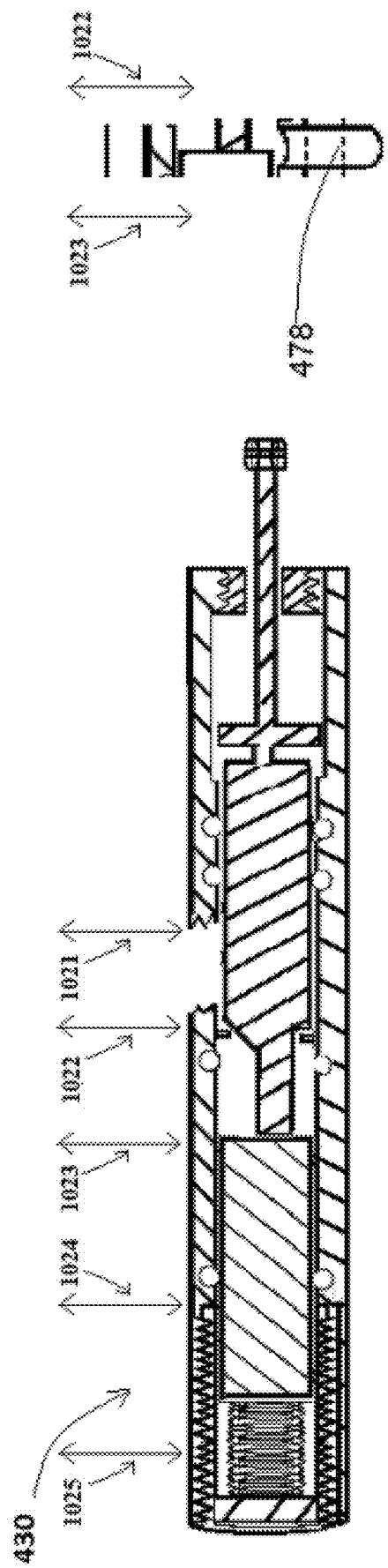
FIG. 85 shows a phase of configuration of the detergent activation unit in the activation mode for relating a relation between the input of detergent and the output of detergent.

Referring to FIG. 85, what is shown is the closure of valve 632 and the opening of valve 482 between lines 1022 and 1023. Cam 460 now is at its maximum lift while spring 482 is now exerting a maximum restoring force simultaneously as spring 621 exerts a force on piston component 491. Lever 20 has not yet turned through its maximum predetermined angle. The geometric relation of the stationary disc 112, the moveable disc 102 and the configuration of lever 20 relative to fixed stops 60 and 61 were said fixed stops 60 and 61 are positioned on the upper surface 130 is shown in FIG. 25.

At the initial turn of lever 20 when detergent has been enabled and water flows through spout 10 hands are enabled to be washed and the faucet counter turned to its off mode without enabling washing of lever 20.

Figure 86:
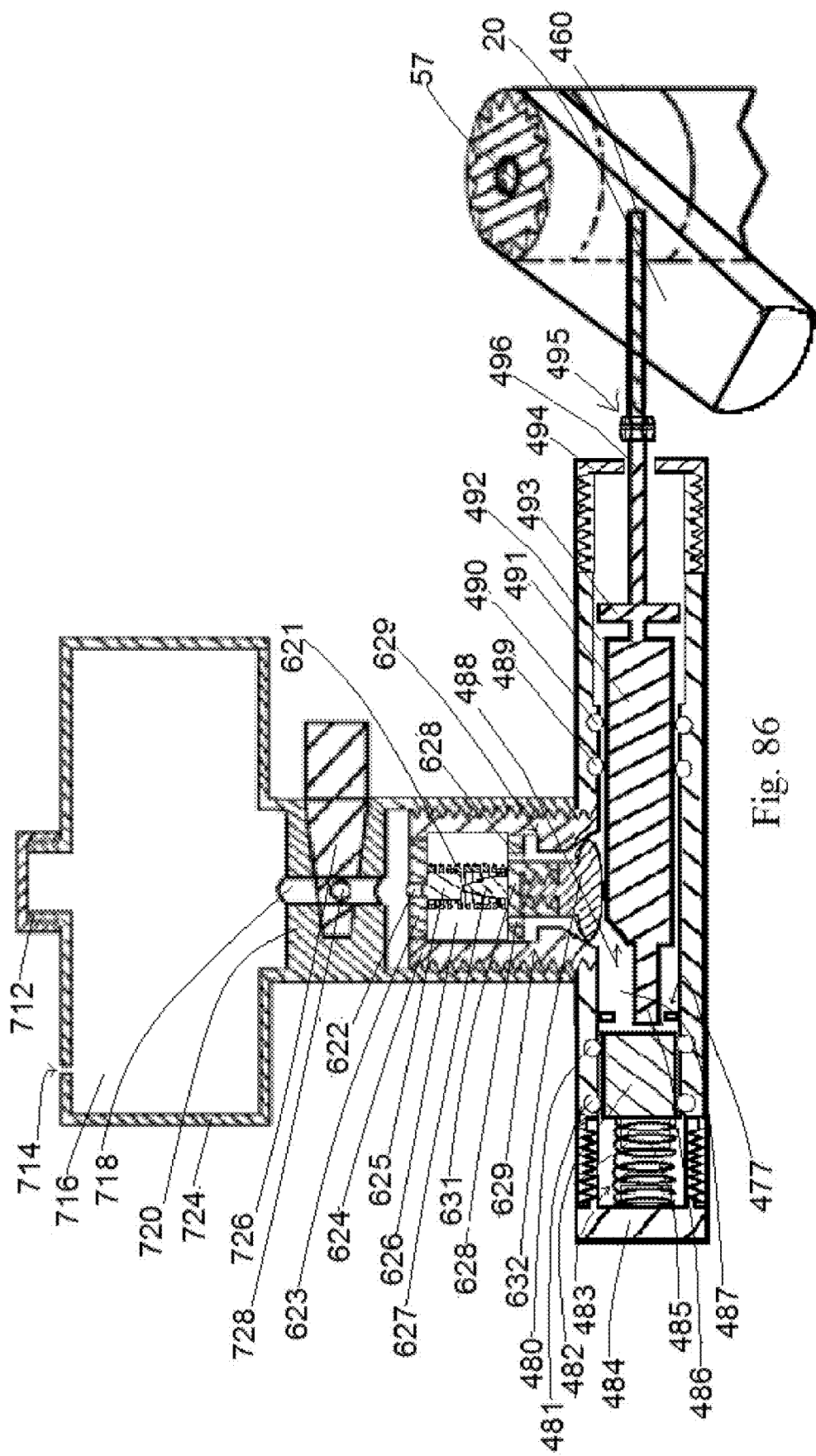
FIG. 86 shows a vertical section through the detergent unit and the detergent activation unit when assembled, and the invention is in the activation mode for the maximum predetermined rotation of the lever.

Referring to FIG. 86, what is depicted is a configuration wherein said lever 20 has executed its clockwise maximum predetermined angle of rotation and said lever 20 is deterred from further rotation by said limiting cartridge body stop 61. Said cam 460 is now locked by the follower 496 by the axial force of spring 483 in the off-set configuration with further rotation restricted by body stop 61 and the force of spring 621 acting on piston 449 thus solvent such as water is enabled to flow without interruption when the invention is being utilized say washing of hands. The configuration of the stationary discs 112 and the moveable disc 102 may now be enabled to reduce the flow rate through the spout for the predetermined maximum angle of rotation of the lever 20.

Figure 87:
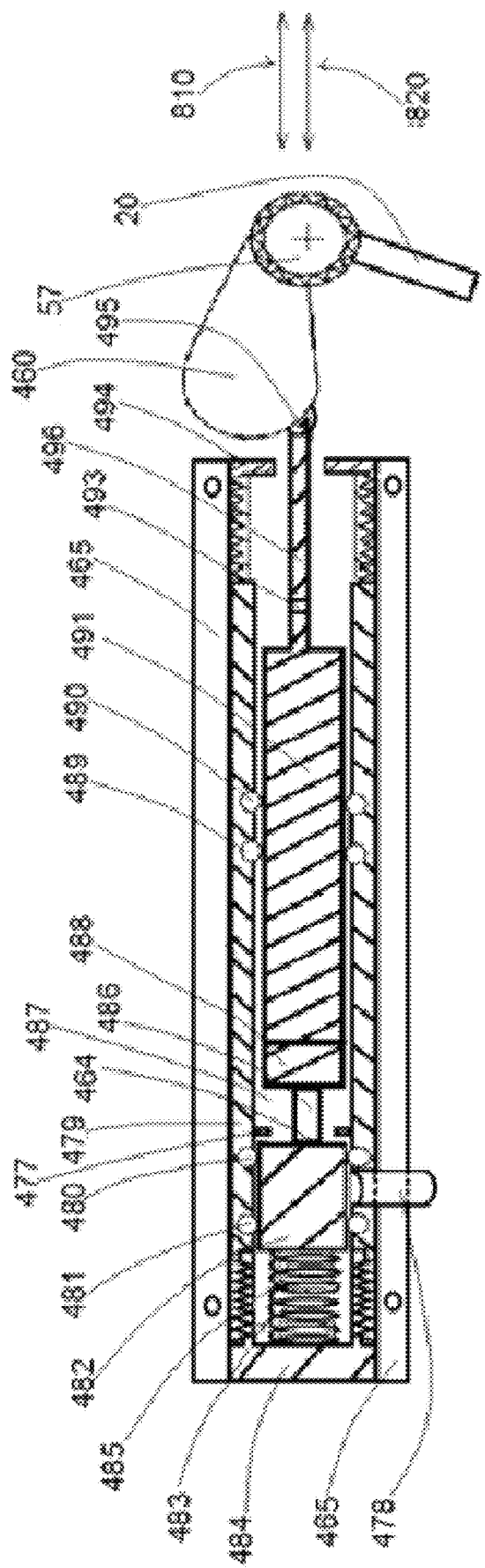
FIG. 87 shows a section in a horizontal plane through the detergent activation unit when assembled and the invention is in the activation mode for the position of the lever with top view of the cam.

Referring to FIG. 87, what is depicted is a top view configuration of the configuration shown in FIG. 86.

Referring to FIG. 87a what is shown is a diagrammatic representation in the active state when the lever 20 has been turned through its maximum predetermined angle of turn and the piston 491 ould has retreated from the valve 482 while being acted on by a reduced axial force by spring 483.

Referring to FIG. 87a, the cam 460 has also now retreated and the choice of the dimension of the cross section of outlet conduit 478 and the separation between line 1022 and line 1023 has enabled the closure of valves 482 and valve 632. The combined force of action by spring 621 on the piston 491 and the reduction of the force of spring 482 coupled with the off set in combination with the action of stop member 61 immobilizes the lever at it maximum predetermined angle of rotation thus water or any other solvent is enabled to flow through the spout 10 without interruption for the washing of hands.

Referring to FIG. 87b what is shown is a section in comparison to FIG. 87a that includes outlet 478. When said cam 460 retracts at the turning of lever 20 to its maximum predetermined angle of rotation, it is preferred that when cam 460 is arrested in the off-set configuration that outlet 478 be enabled between region 1023 and 1024 thus enabling said valve 632 and said valve 482 to be in closure mode thus minimizing dripping or leakage.

A counter turn of lever 20 to enable said lever to intercept line of flow 777 from the spout 10 enables washing of the lever 20 and further washing of hands.

When said system depicted in FIG. 86 is being deactivated after use said lever 20 is further rotated counter clockwise thus enabling closure of valve 482 while said valve component 632 opens, thus further counter clockwise rotation of lever 20 enables a pressure difference in region 487 and thus enables flow of detergent in said region 487 when said valve member 482 is enabled to be closed prior to the opening of valve 632. Said system is now in a state for its next utility function.

The interaction between said cam 460 and said cam follower 496 is independent of the fixed position of said cam 460 on said upper portion 57 of stem unit 104 thus enabling flexibility in choice of positioning of said detergent activating system with a faucet system. Additionally multiple configurations are enabled for timely dispensing of fluid while lever 20 is being rotated.

Figure 88:
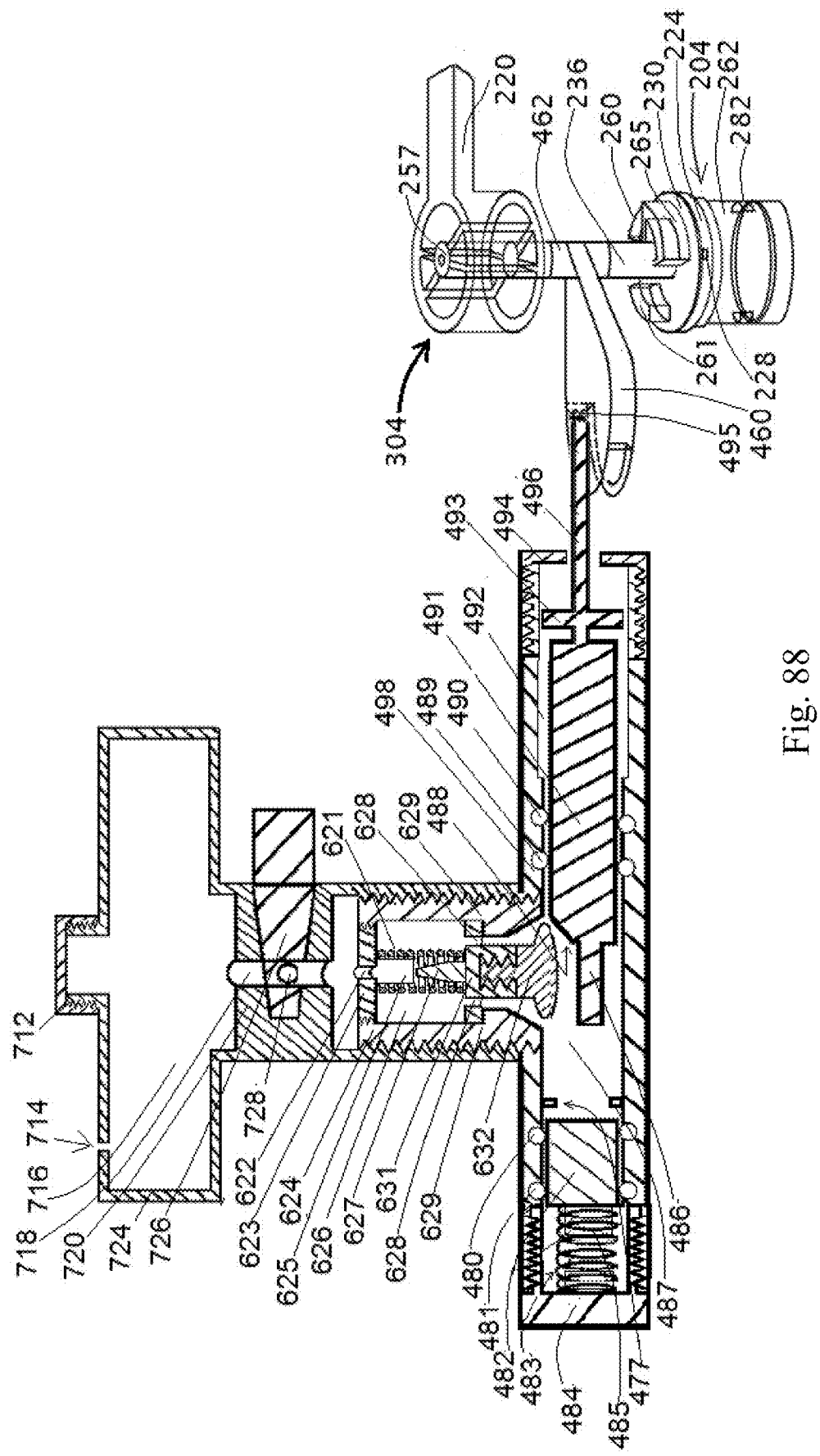
FIG. 88 shows a vertical section in a plane symmetric to the detergent activation unit and the detergent reservoir in relation to the position of the cam unit, the cartridge unit and the lever unit in the inactive or closed mode of the invention.

Referring to FIG. 88 what is shown is a vertical section in a plane symmetric to the detergent activation unit and the detergent reservoir in relation to the position of the cam unit 410, the cartridge unit and the lever unit in the inactive or closed mode of the invention.

Referring to FIG. 89, what is shown is a configuration of the lever, the moveable disc 102 and the fixed disc for the closed mode for FIG. 88.

Figure 90:
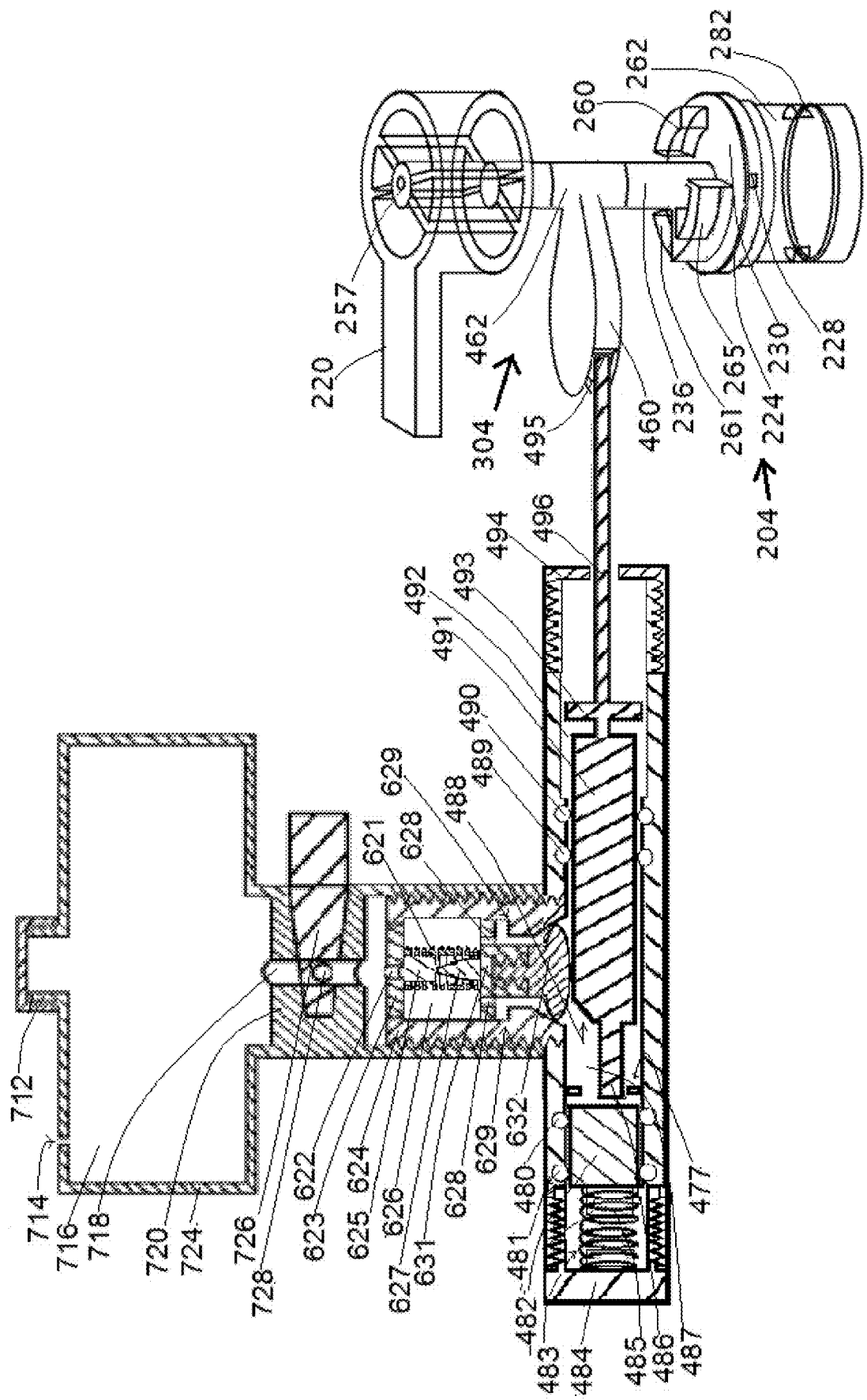
FIG. 90 shows a vertical section in a plane symmetric to the detergent activation unit and the detergent reservoir in relation to the position of the cam unit, the cartridge unit and the lever unit in the active or open mode of the invention.

Referring to FIG. 90 what is shown is a vertical section in a plane symmetric to the detergent activation unit and the detergent reservoir in relation to the position of the cam unit 410, the cartridge unit and the lever unit in the active or open mode of the invention.

Referring to FIG. 91, what is shown is a configuration of the lever, the moveable disc 102 and the fixed disc in the open mode for FIG. 90.

Figure 92:
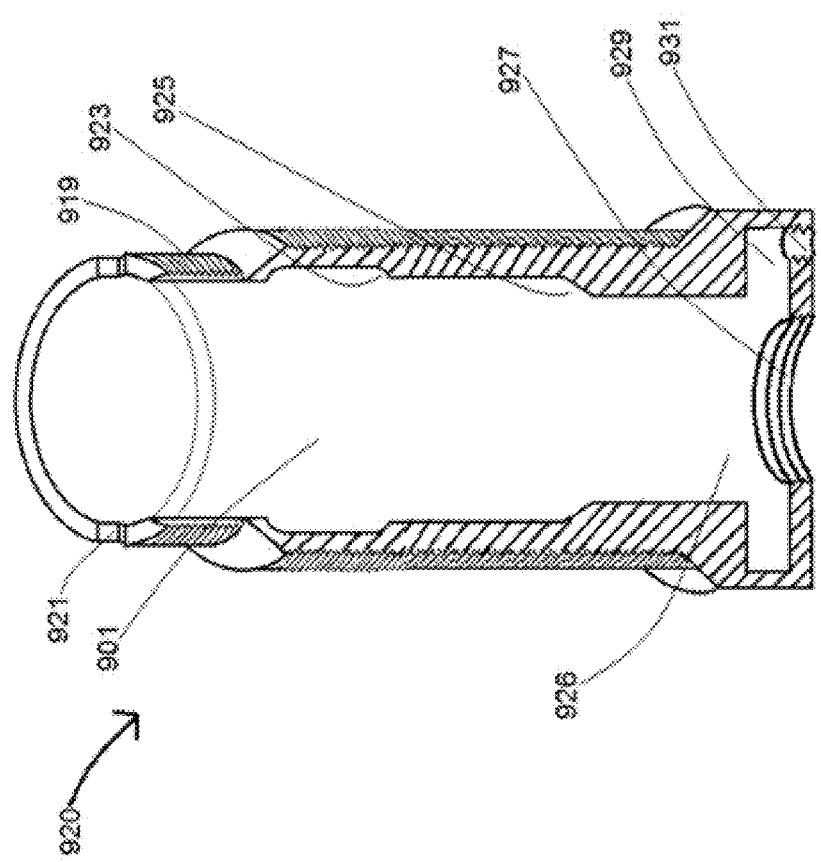
FIG. 92 shows a configuration for mounting and stabilizing the cartridge unit for use with a wash basin.

Referring to FIG. 92, what is shown is a sectional configuration of a substantial cylindrically disposed solid cartridge mount member 920 enabled with slots 921 for mounting the cartridge unit 420. Said member 920 functions to laterally encloses cartridge unit 420 with space between the inner wall of 920 and the outer wall of cartridge body 90 for the cartridge unit 420. Said member 920 also functions to arrest rotary motion of said cartridge body 90 when said cartridge body 90 is associated with said cartridge mount 920 and said tabs 128 of said cartridge body 90 are recessed in symmetrically arranged slots 921 on the perimeter region 919 of said member 920.

Figure 95:
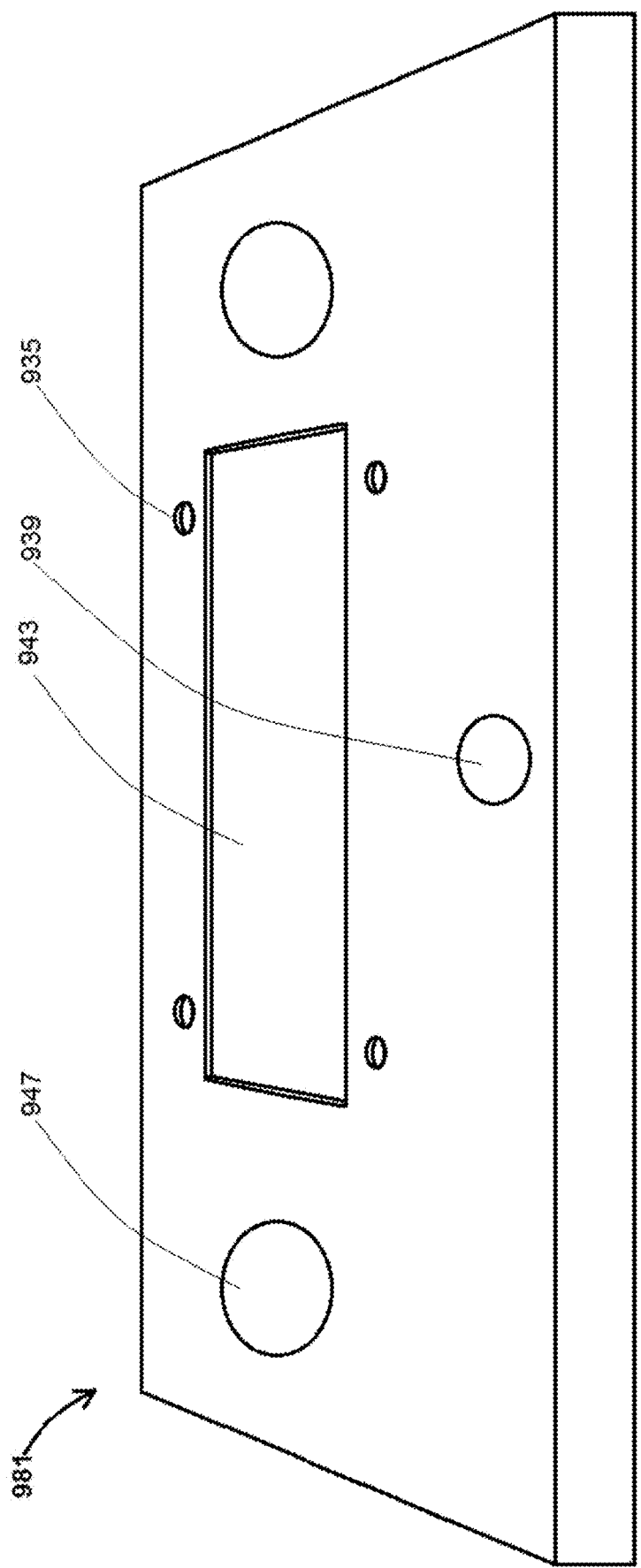
FIG. 95 shows a configuration of the mounting block for the invention in relation to a wash basin.

Referring to FIG. 92, solid member 920 is configured with a grooved upper end 919 with a smaller diameter for accepting bonnet nut 205. Said member 920 lower end is configured with a larger diameter region 926. Said larger diameter region 926 is configured with a grooved access 927 for connection to an inlet conduit and a grooved region 931 for connection to an outlet conduit. The outer surface of said cartridge mount 920 between the upper reduced diameter region 919 and the lower larger diameter region 926 is spirally grooved for rigidly attaching said cartridge mount 920 by nuts to a mounting surface. Such a mounting surface 981 is depicted in FIG. 95. In an assembly of the invention cartridge unit 420 is stabilized in region 901 of said cartridge mount 920 when flanges 128 of said cartridge body 130 are recessed in slots 921 of said cartridge mount 920.

Figure 93B:
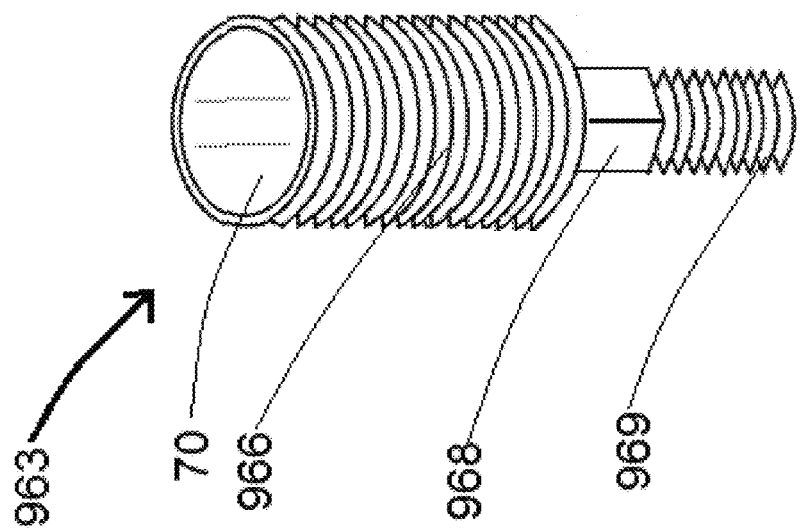
Figure 93A:
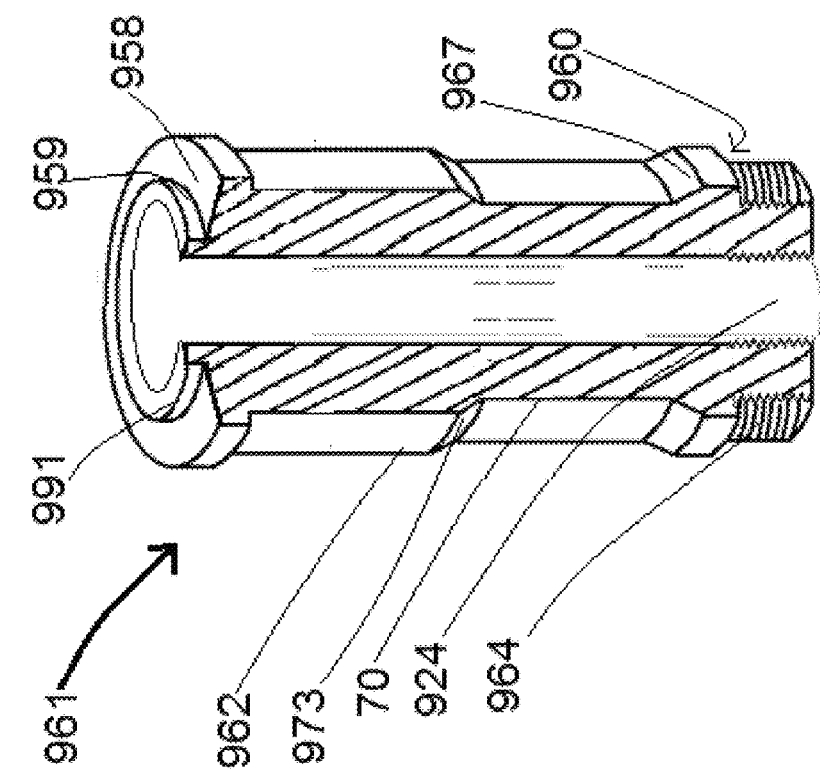
FIG. 93a shows a configuration for interfacing with the cartridge unit and enabling water from an inlet to the cartridge valve.

Referring to FIG. 93a, what is shown is interface 961 for cartridge unit 420. Said interface 961 includes a conduit 70 for allowing water through the openings 114 of the stationary disc 112. Surface 959 on upper portion of 961 interfaces with the lower surface 123 of fixed disc 112 by way of a seal 88 to provide a seal between member 961 and said stationary disc 112 to prevent leakage between 961 and 920. A space 900 is enabled between the inner wall of cartridge mount 920 and the outer perimeter of flange surface 958 of said interface 961 consequently in a working unit of the invention, said space 900 enables flow from region 110 to region 929 of said cartridge mount 920 thus enabling flow through outlet connection 965 to spout 10; said 961 is then firmly attached to region 927 of cartridge mount 920 when the fixed disc 112 is situated in region 132 of said cartridge body 90.

Referring to 93b what is shown is an interfacial inlet attachment 963 with conduit 70. Said interfacial conduit has a larger grooved diameter region 966 and a smaller grooved diameter region 969. Said outer grooved larger diameter region 966 locks into inner grooved diameter region 924 of 961 and preferably soldered to 961. Means 968 is provided for insertion of said conduit 963 into grooved region 924 of 961. The lesser diameter region 969 of 963 interfaces with water line attachments from an inlet source. FIG. 93 shows a section view of said inlet conduit 963.

Figure 93D:
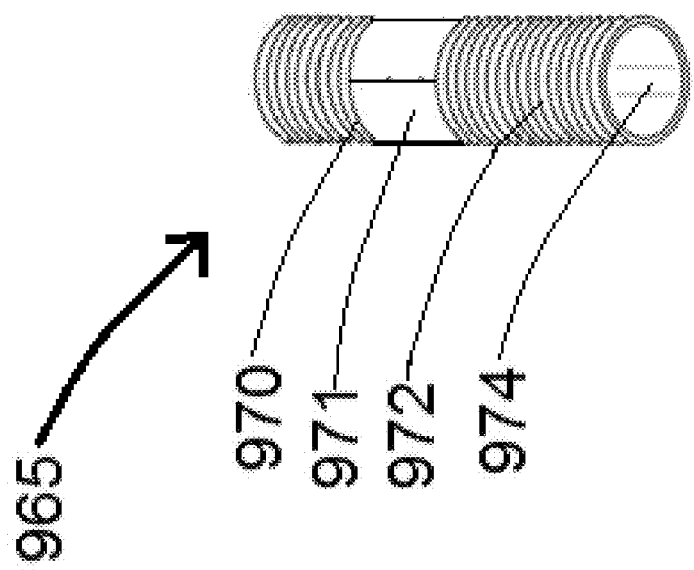
FIG. 93d shows an outlet attachment in accordance with one embodiment of the present invention.
Figure 93C:
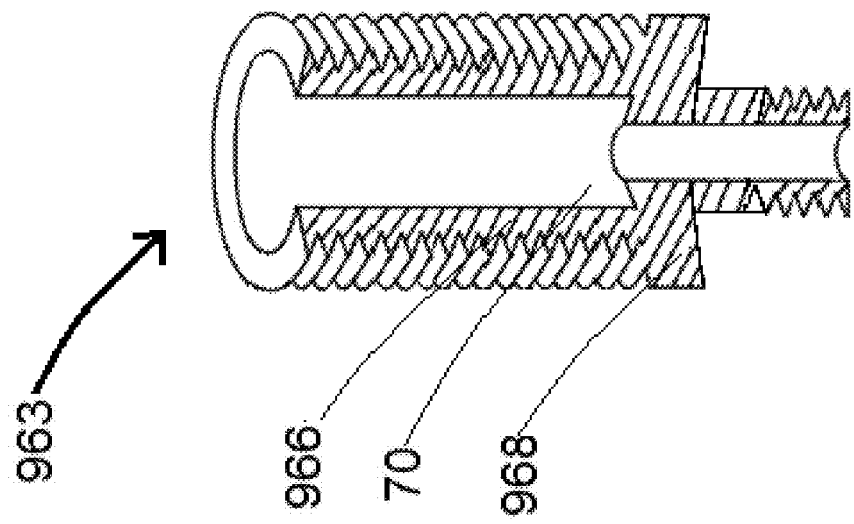
FIG. 93c shows a section through 963 of FIG. 93b.

Referring to FIG. 93d what is shown is an outlet attachment 965 with conduit 974 for connecting to the spout 10 of the faucet unit. Said outlet conduit 965 is configured with grooved end portions 970 and 972 and a region 971 between said grooved region 970 and said grooved region 972. Said region 971 is enabled with means for insertion into access 931 of cartridge mount 920. It is preferred that 965 be soldered to cartridge mount 920.

Figure 93E:
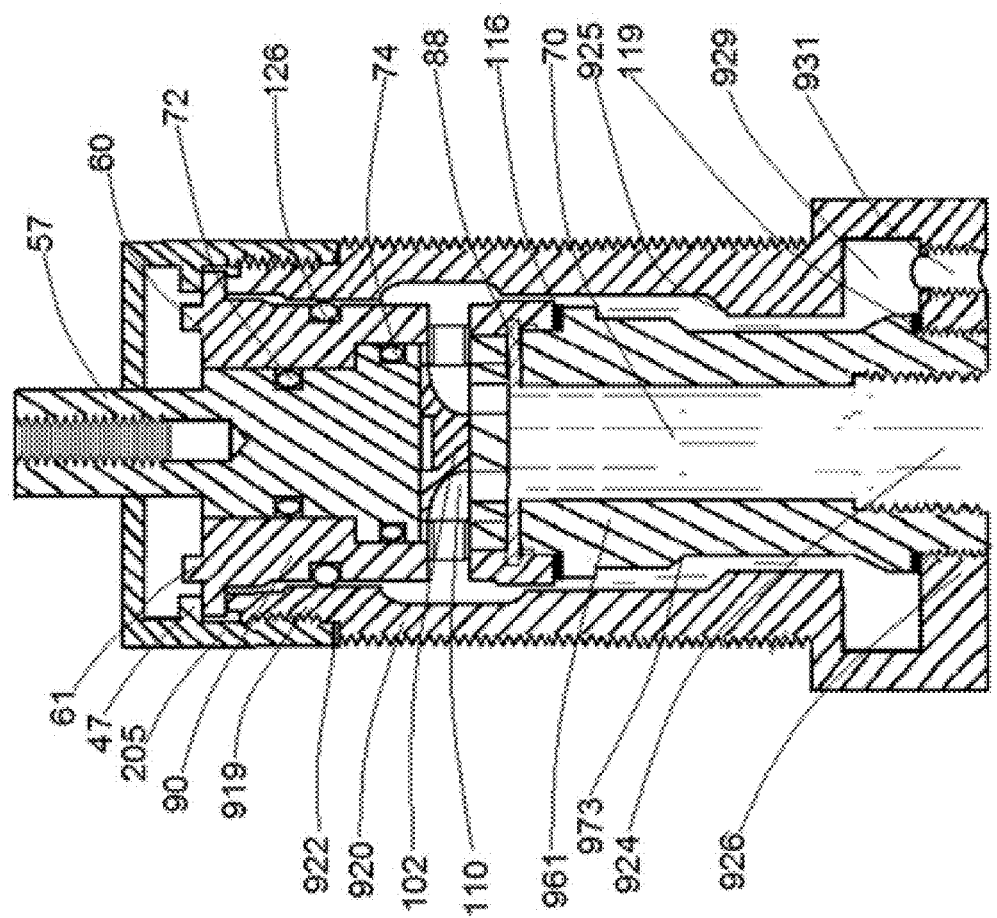
FIG. 93e shows a section of the assembly of the cartridge, bonnet nut, and inlet interfacing member 981 to the cartridge mounting and stabilizing member 920 of FIG. 92.

Referring to FIG. 93e when said interface 961 is firmly locked in 927 of the lower region 926 of 920 and said lower surface 123 of fixed disc 112 of cartridge 420 interfaces with the upper surface 959 of 961 and said bonnet nut 205 is attached to 920 to allow the flange 47 of said bonnet nut 205 is applied over the upper surface 130 of the cartridge body 90 and open region 45 of said bonnet nut 205 fully encloses region 59 of the stem 104 then said stem 104 is disposed to be stabilized for interaction with the disc assembly. A washer 922 interfaces 920 and 205.

Referring to FIG. 93e when the bonnet nut 205 is in firm relation with the upper surface 130 of body 90 of the cartridge unit 420 and said bonnet nut 205 is firmly attached to cartridge mount 920 a seal 88 between the upper surface of 961 and the lower surface 123 of fixed disc 112 is included to prevent leakage between the outer surface of 961 and the inner surface of cartridge 920. The seal 88 interfaces flange 959 and surface 958 of the upper surface of said 961 with the lower face 123 of the fixed cartridge 112. The lower grooved end 964 of said 961 would also be firmly attached at 927 of said cartridge mount 920.

Referring to FIG. 93e said upper region 958 of 961 is configured to accept an elastomeric seal 116 between a ledge 958 of 961 and the lower part 132 of said cartridge body 90; such a seal 116 functions to prevent 35 leakage between the outer surface of 961 and the interior surface of 920.

Referring to 93e the attachment between the lower portion 924 of 961 and the lower portion 926 of 920 is enabled with an elastomeric seal 119. Said seal 119 functions to prevent leakage between 961 and 920.

Figure 94:
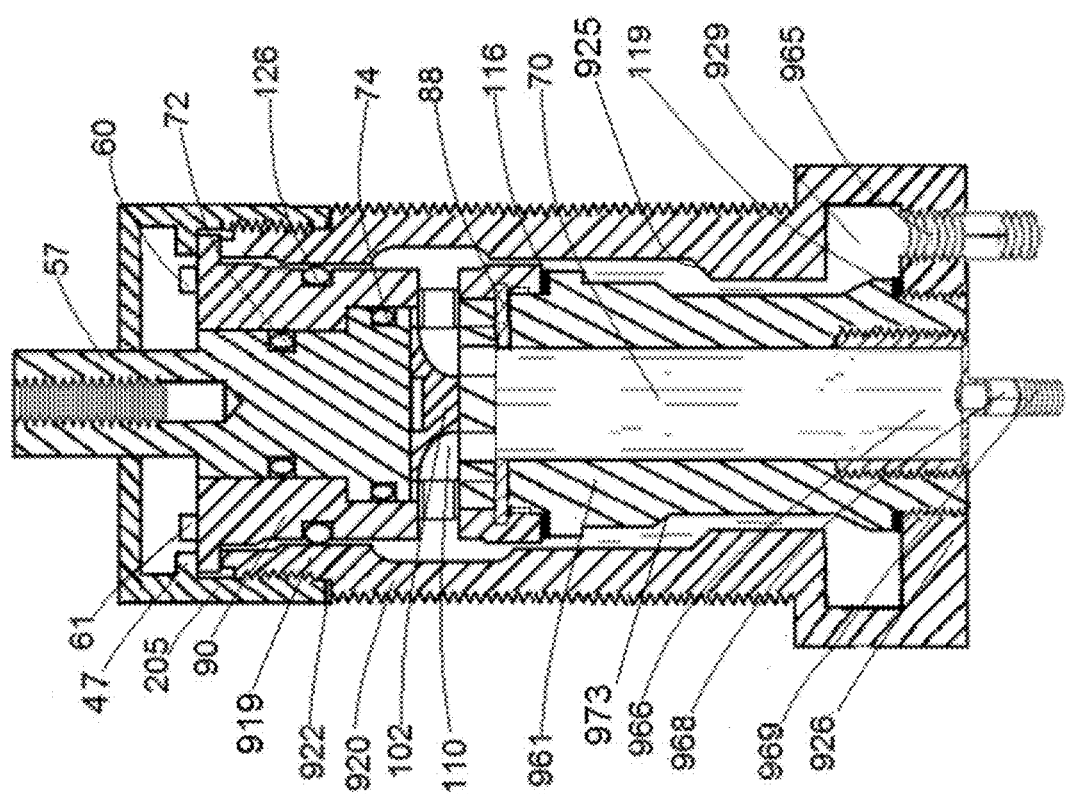
FIG. 94 shows a section of the assembly of the cartridge, bonnet nut, inlet interfacing member 981, cartridge mounting and stabilizing member 920 and member 965.

Referring to FIG. 94 what is shown is the embodiment of FIG. 93e when input mains water supply attachment 963 is attached and preferably soldered to 961 at access opening 924 of said 961 and output water attachment 965 is attached and preferably soldered to 920 at access opening 931 of said cartridge mount 920. Said conduit 965 functions to direct water to spout 10 when a water line is connected from conduit 965 to spout 10. Said attachments 965 and 963 are preferably made from copper, brass or stainless steel and soldered to member 920.

Referring to FIG. 95, what is shown is a section of an embodiment 981 for mounting the invention for use with a wash basin. To secure the detergent activation unit 430 shown in FIG. 48 more ways than one is available; one available means for securing said detergent activation unit involve having access slots 935 for accepting fasteners to which is attached a nut for bonding said detergent activation unit 430 to said embodiment 981. Said embodiment member 981 has access openings 947 for receiving cartridge housing 920 for enabling nuts 933 to firmly secure said cartridge housing 920 to said mounting base 981. Said embodiment member 981 has access openings 947 for receiving cartridge housing 920 to allow nuts 933 to firmly secure said cartridge housing 920 to said embodiment 981.

Referring to FIG. 95 said embodiment 981 is enabled with access 939 for receiving spout assembly to allow a nut to secure said spout assembly to said base 981.

Referring to FIG. 95 said mounting base 981 is enabled with opening 943 for setting detergent activation unit 430 and also with access openings 935 for receiving bolts 948. Said bolts 948 firmly associate undercover plate 930 and detergent activation unit to 430 when a nut 942 is applied to 948 in such a manner that the members 930, 981 and base member 465 of the cartridge activation unit 430 are contiguous and firmly associated.

Figure 96:
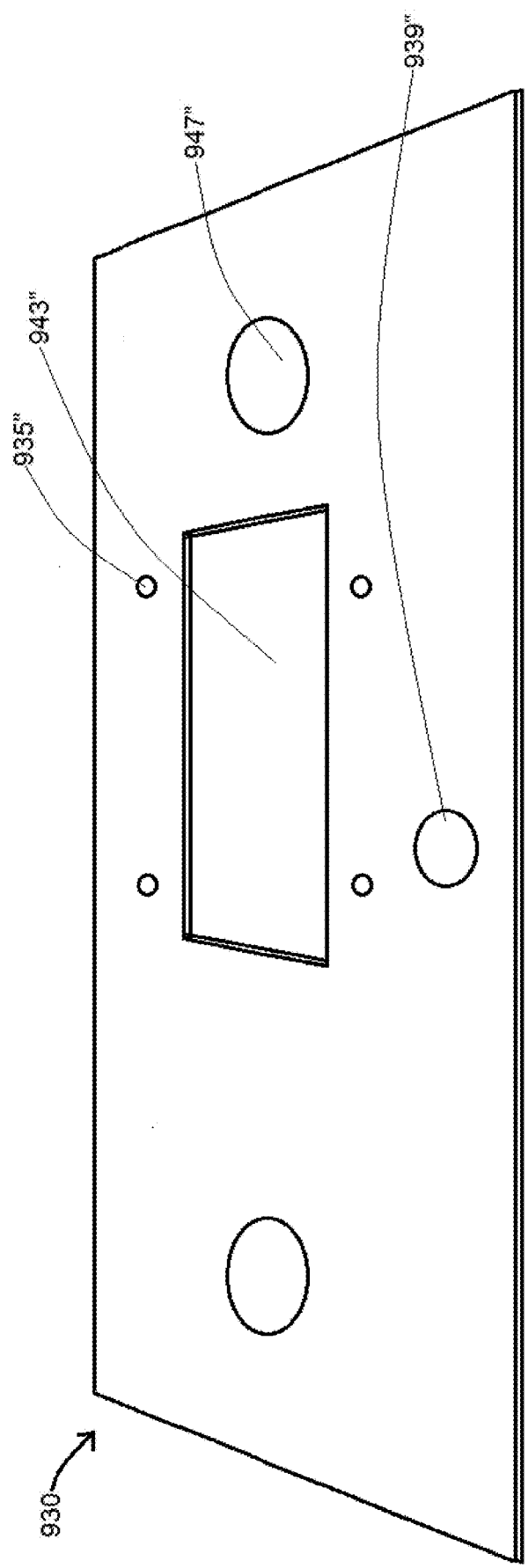
FIG. 96 shows a configuration of an under-cover plate for the invention when mounted in relation to a wash basin.

Referring to FIG. 96, what is shown is the embodiment of an under-cover plate 930 for interfacing with mounting base 981 when said 981 is in relation to a wash basin. To secure the under-cover plate 930 more ways than one is available; one available means for securing said detergent activation unit involve having access slots 935" for accepting fasteners 948 to which is attached a nut 942 for securing said detergent activation unit 430. Said embodiment member 930 has access openings 947" where the diameter measurement of said openings 947" is greater than the measurement of the most significant diameter of nuts 933. Said openings 947" enable access for cartridge mount 920.

Referring to FIG. 96, said embodiment 930 is enabled with access 939" for receiving spout assembly 10 and to allow a nut 933 to secure said spout assembly 10 to said base 981 and to said under-cover plate 930.

Referring to FIG. 96, under-cover plate 930 is enabled with opening 943" for setting detergent activation unit 430 and also with access openings 935" for receiving bolts 948. Said bolts 948 firmly associate undercover plate 930 and detergent activation unit to 930 when a nut 942 is applied to 948 in such a manner that the members 930, 981 and base member 465 of the cartridge activation unit 430 are contiguous and firmly associated.

Figure 97A:
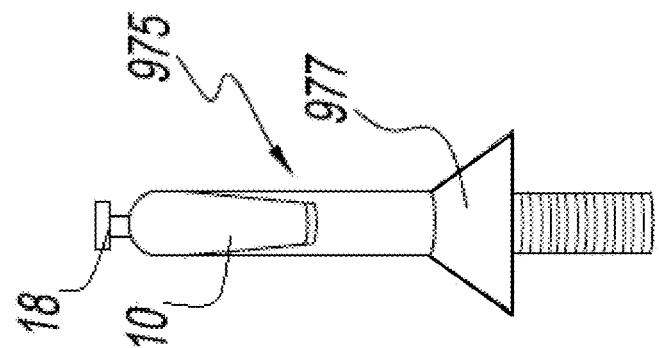
FIG. 97a shows a configuration of the spout assembly.
Figure 97:
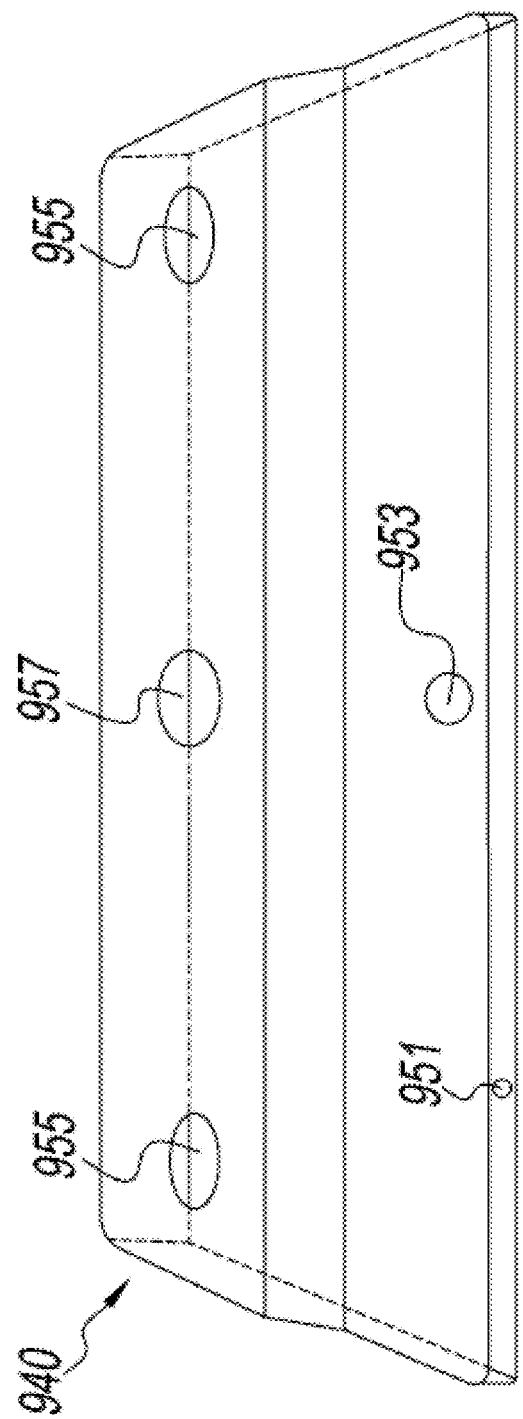
FIG. 97 shows a configuration of an escutcheon for the invention when mounted with a wash basin.

FIG. 97 what is shown is an escutcheon embodiment 940 for mounting on surface 981 when said embodiment is in relation to a wash basin. To secure the escutcheon 940 more ways than one are available; one available means for securing said escutcheon 940 involve having access slots 955 for accepting lever assembly 304 configured so that when said lever assembly is attached to region 58 of stem portion 57 of stem 104 the lower surface of said lever assembly abuts the surface of escutcheon embodiment 940. To further secure the escutcheon 940 when spout 10 is included in opening 953 and escutcheon 975 is attached to the lower end of said spout 10 the lower edge of escutcheon 975 abuts the surface of escutcheon 940.

Said escutcheon 940 shown in FIG. 97 is also enabled with access opening 957 were said access opening 957 accepts lower portion 724 of detergent reservoir unit 450 when said lower portion 724 of the said detergent reservoir unit 450 is attached to region 487 of the detergent activation unit 430. a nut for securing said detergent activation unit 430. Referring to FIG. 97 access opening 951 enables availability of detergent when outlet conduit 478 is accepted by said opening 951 of said detergent activation unit 430.

Referring to FIG. 97a what is shown is a spout assembly 975 for inclusion with spout 10 where said spout escutcheon 977 of spout assembly 975 is enabled to abut an elastomeric washer 976 and said elastomeric washer 976 abuts surface 981 in an assembly of the invention and is in a relation to the lower region of said spout 10. Nut 944 is applied to the under surface of 981 to firmly attached spout assembly 975 to said 981. An elastomeric gasket 945 is preferred between said nut 944 and the under surface of 981 in the assembly of the spout assembly 975. Opening 939" of undercover gasket 930 is enabled to accommodate the diametric dimensions of nut 944.

Figure 98:
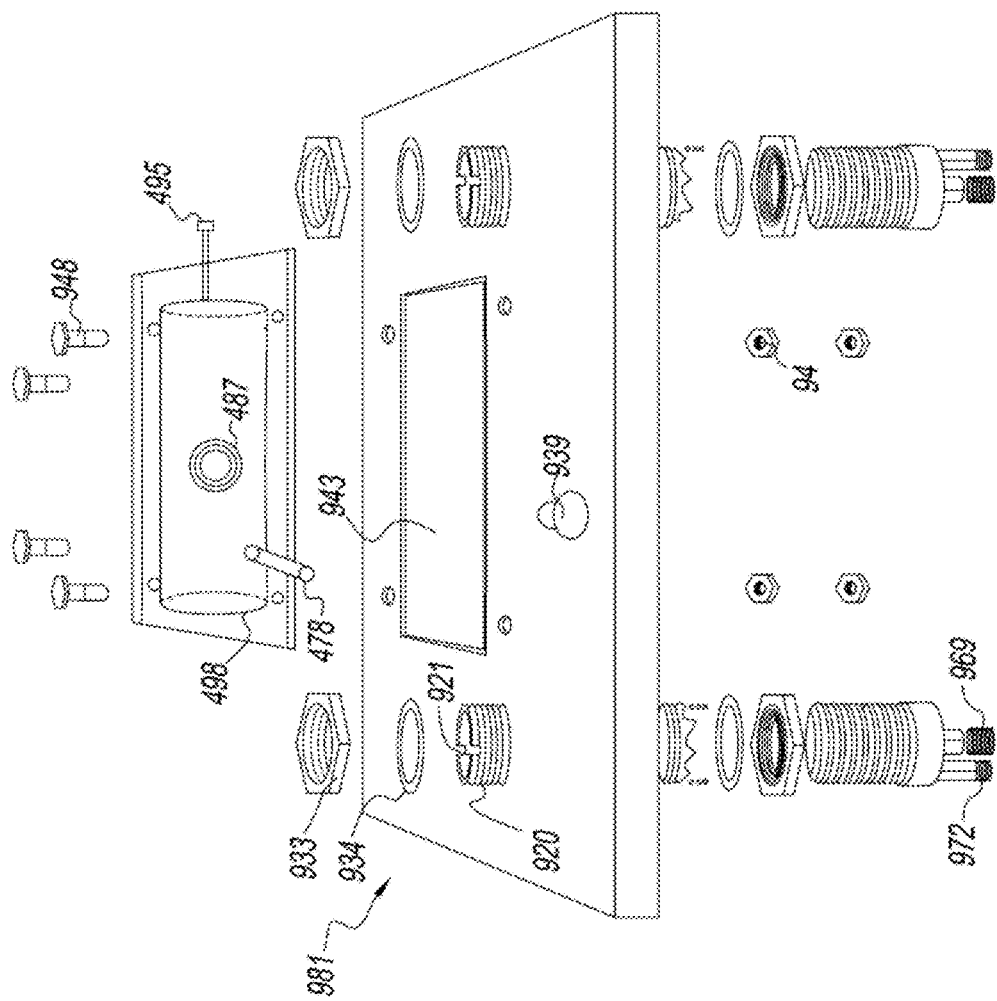
FIG. 98 shows the first step for mounting and securely attaching the invention to its mounting base with rubber washers and nuts. The detergent activation unit is also mounted to the mounting base.

Referring to FIG. 98 what is shown is an explosion of nut 933, rubber washer 934 and cartridge housing 920, the detergent activation unit 430, the fasteners 948 and nuts 94 in relation to mounting base 981.

FIG. 98a shows said nut 933, said washer 934 and said cartridge housing 920 assembled on faucet mounting base 981.

Figure 99:
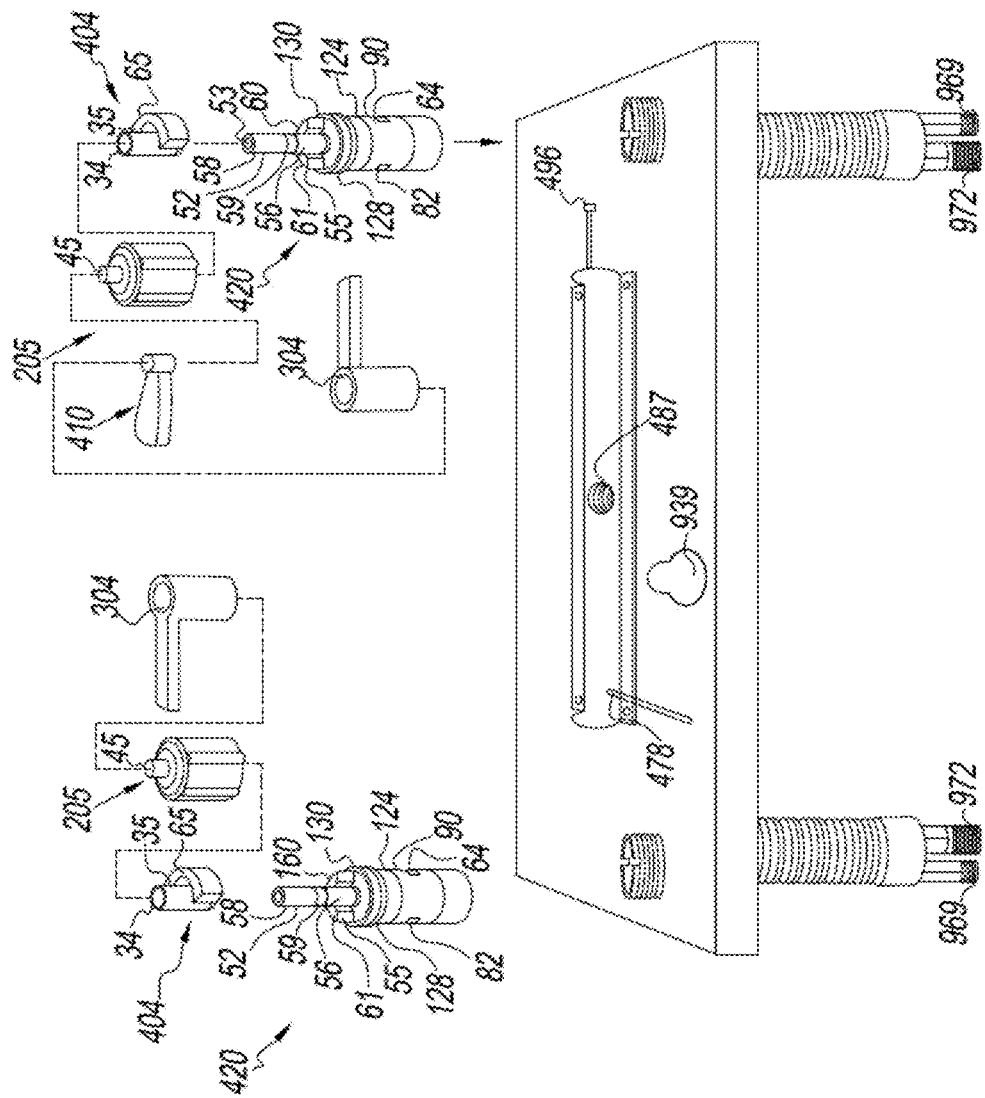
FIG. 99 shows the next phase in assembling the invention with the cartridge unit, then the turning stop restrictor, then the bonnet nut and then the cam unit.

Referring to FIG. 99 what is shown is the spatial positioning of order of assembly of detergent activation unit 430, cam unit 410 and cartridge unit 430 for, bonnet nut 205 and stop attachment 404 for an embodiment in which the detergent activation unit 430 is activated when a right hand-side lever 20 is rotated. The lever handle 305 is not shown.

Referring to 99a shows the assembly of FIG. 99 with escutcheon 940.

Figure 99A:
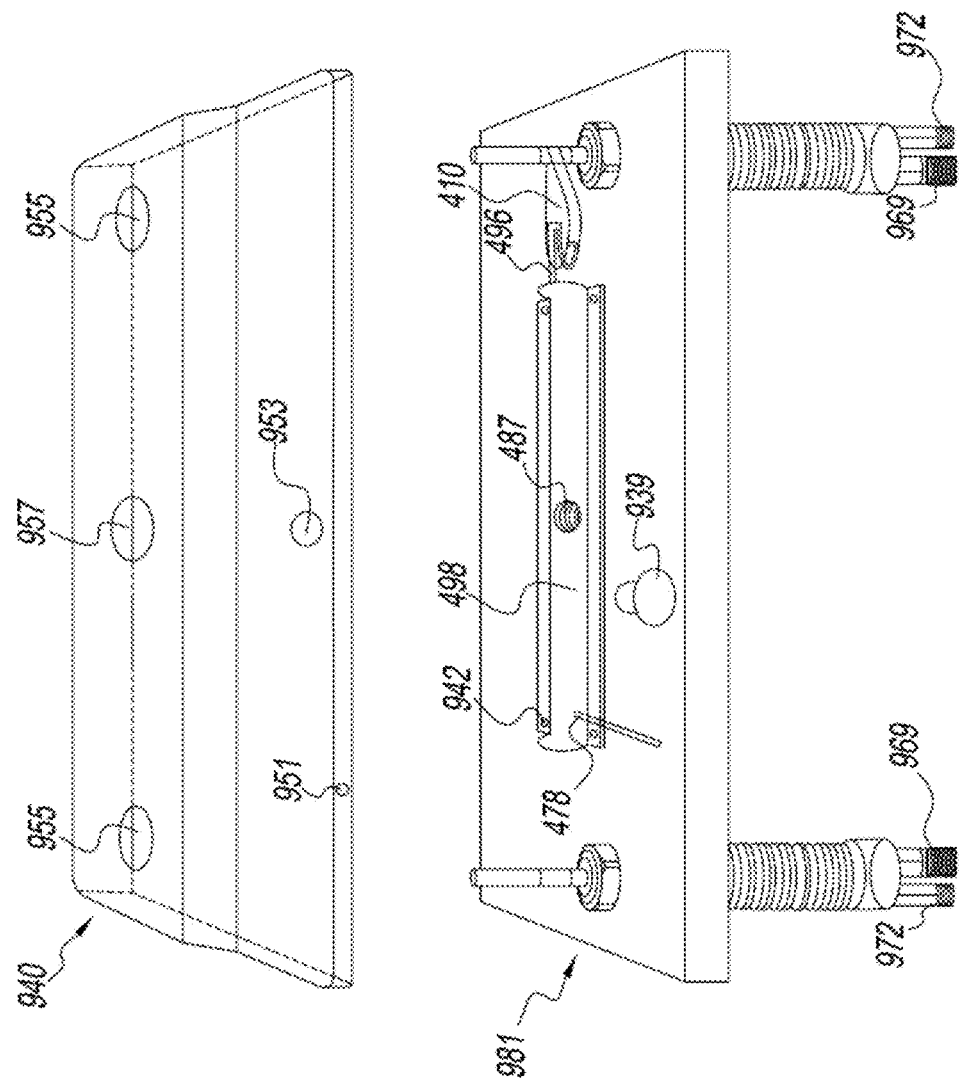
FIG. 99a the escutcheon 940 is next assembled.

Referring to 99b shows the assembly of FIG. 99a with spout assembly 975 and lever handle 304.

In summary, the washable faucet lever with cam-activated detergent dispenser is depicted herein that includes a lever cartridge 420 having a stem 104 operably coupled to a hand lever 20 configured to rotate in a lever axis of rotation and operably coupled to a cam member 410 having an arcuate outer surface and configured to rotate in a cam axis of rotation parallel to and simultaneous with the lever axis of rotation. In one embodiment, the cam member 410 has a greater sloping side surface 439 and a lesser sloping side 436 forming the arcuate outer surface. Further, the cam member 410 may also be of an obolid shape. In some embodiments, the arcuate outer surface of the cam member 410 defines a channel guide 437 for the follower 496 and the follower 496 includes a roller bearing 495 configured to translate (e.g., roll or slide) within the channel guide 437 to move the piston 491. In one embodiment, the cam member 410 is constrained to rotate in a single horizontal plane as discussed above.

The washable faucet lever with cam-activated detergent dispenser also includes a detergent reservoir member 450 configured to house a liquid detergent therein, having an internal channel 718 configured to receive the liquid detergent, and has a reservoir valve 632 coupled to the detergent reservoir member 450 and operably configured to selectively translate to open and permit flow of the liquid detergent through the internal channel 718 and to close and restrict flow of the liquid detergent through the internal channel 718. The dispenser also includes an encasement member 498 defining an enclosed region 468 therein, defining an outlet 478, having an outlet valve 482 disposed within the enclosed region 468 and operably configured to selectively translate to open and permit flow of the liquid detergent through the outlet 478, to close and restrict flow of the liquid detergent through the outlet 478, and biased with a spring 483 retained by the encasement member 498. Further, the dispenser includes a piston 491 disposed within the enclosed region 468, having a follower 496 translatably (as discussed herein) coupled to the arcuate outer surface of the cam member 410, and operably configured to translate within the enclosed region 468 upon rotating the hand lever 20 in the lever axis of rotation to selectively and simultaneously displace the reservoir valve 632 and outlet valve 482 to permit flow of the liquid detergent through the internal channel 718, into the enclosed region 468, and out through the outlet 478.

In one embodiment, the piston 491 is configured to translate in a single and linear axis of translation within the enclosed region 468 upon rotating the hand lever 20 in the lever axis of rotation to selectively and simultaneously displace the reservoir valve 632 and outlet valve 482. In additional embodiments, the piston 491 is configured to translate within the enclosed region 468 upon rotating the hand lever 20 in the lever axis of rotation and in one of a counterclockwise or clockwise rotation to selectively and simultaneously displace the reservoir valve 632 and outlet valve 482. In yet other embodiments, the cam axis of rotation is coaxial with respect to the lever axis of rotation for the benefits discussed herein.

In some embodiments, a mounting base 981 defines an opening with the lever cartridge 420 disposed therein and coupled thereto with at least one fastener, coupled to the encasement member 498 with at least one fastener, and defines an opening with a faucet member disposed therein, defining a spout 10 with an opening configured to emit liquid therethrough, and coupled thereto with at least one fastener. The dispenser also includes a protective covering 940 defining an opening with the lever cartridge 420 disposed therein, covering the encasement member 498, defines an opening with the faucet member disposed therein, and defines an opening with the detergent reservoir member 450 disposed therein.

In one embodiment, the dispenser includes the protective covering 940 defining an internal channel fluidly coupled to the outlet 478 and configured to permit flow of the liquid detergent therethrough and the reservoir valve 632 being biasedly coupled to the detergent reservoir member 450 with a spring. Additionally, the internal channel 718 is spatially configured in the detergent reservoir member 450 to enable gravity-based receipt of the liquid detergent therein.

Figure 99B:
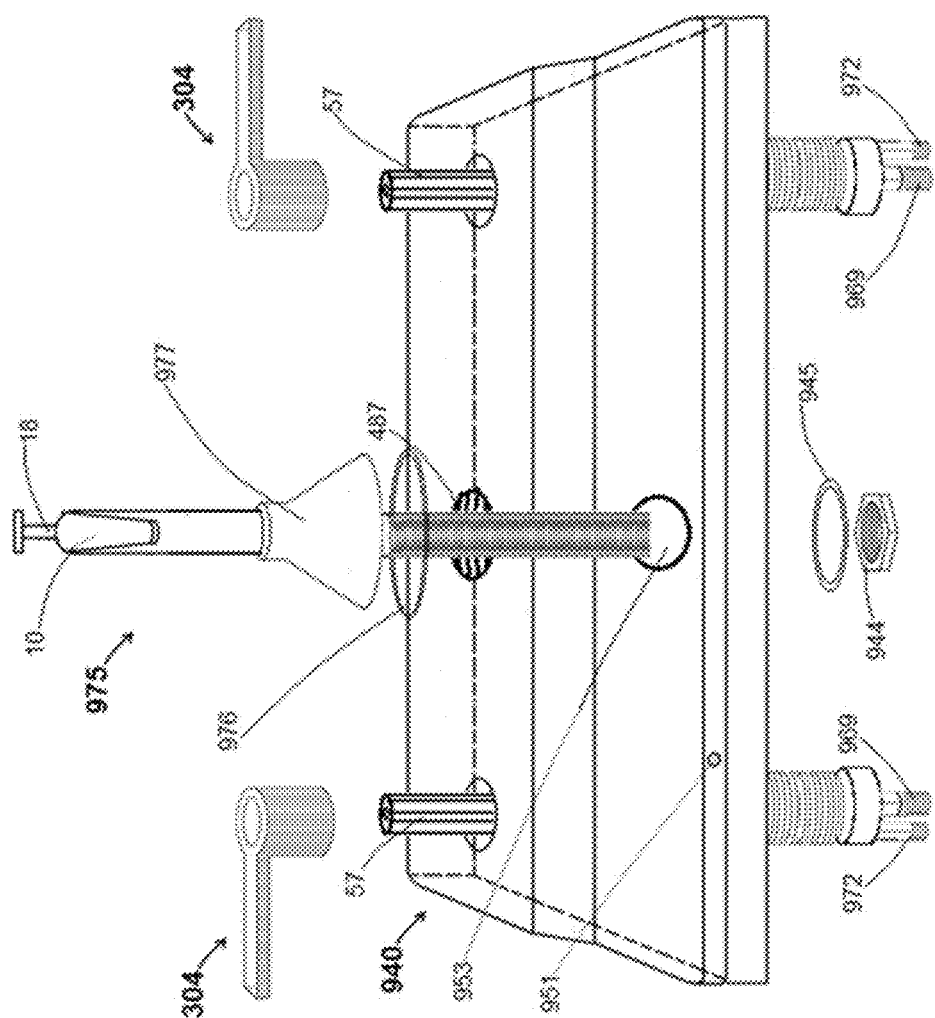
FIG. 99b shows the assembly of the spout unit, the pop-up unit and lever unit.
Figure 100:
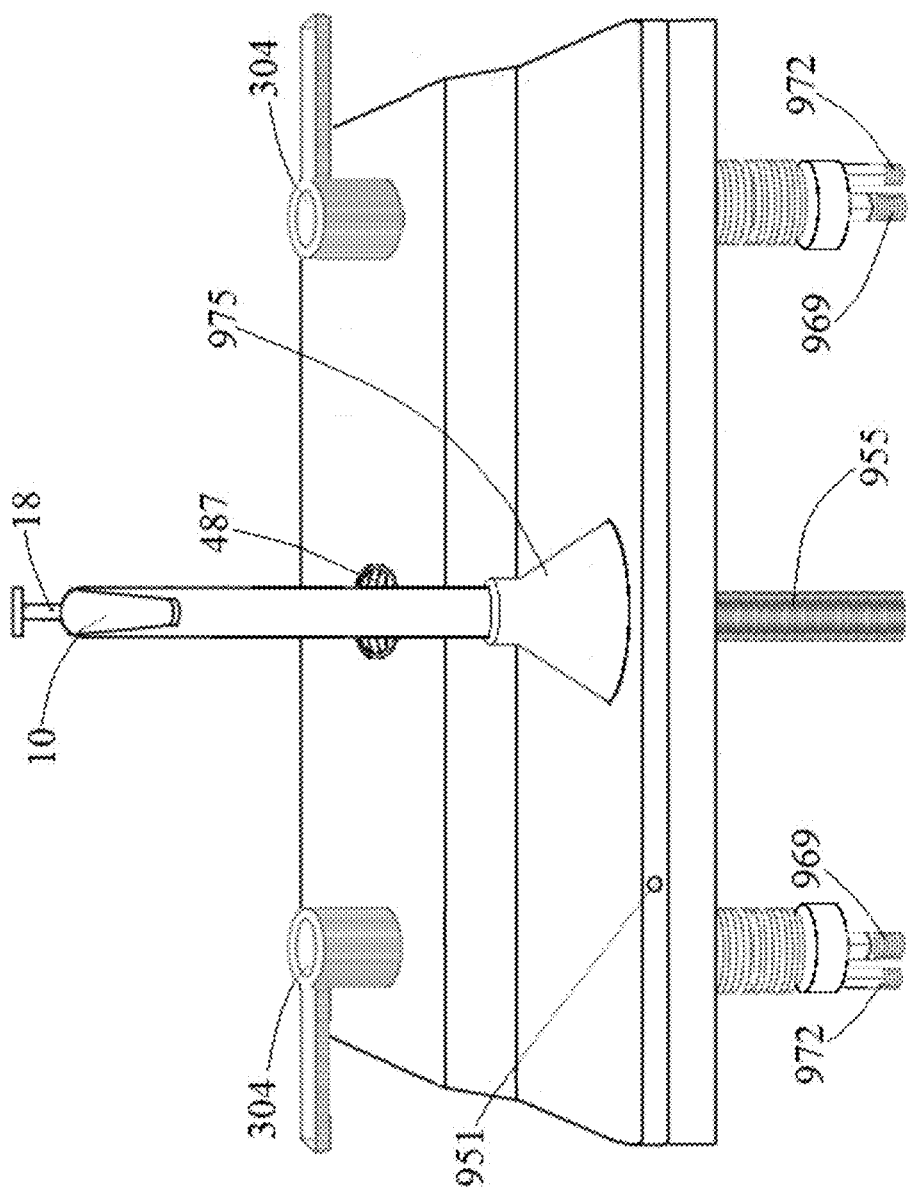
FIG. 100 shows an assembly of the invention without the detergent reservoir unit.

Referring to FIG. 100, what is shown is the configuration of FIG. 99*b* assembled with spout unit 10, lift rod 18 and bonnet nut 205 were said bonnet nut 205 is firmly associated with cartridge housing 920. When said bonnet nut 205 is firmly associated with cartridge housing 920 and region 45 of said bonnet nut 205 surrounds region 59 of stem assembly 104 optimum stability of said stem 104 is facilitated. The outer surface of region 59 of stem unit 104 is enabled to rotate substantially frictionally against the inner surface 45 of the bonnet nut by the application of a Teflon coating to said surface 59 of stem unit 104.

Figure 101:
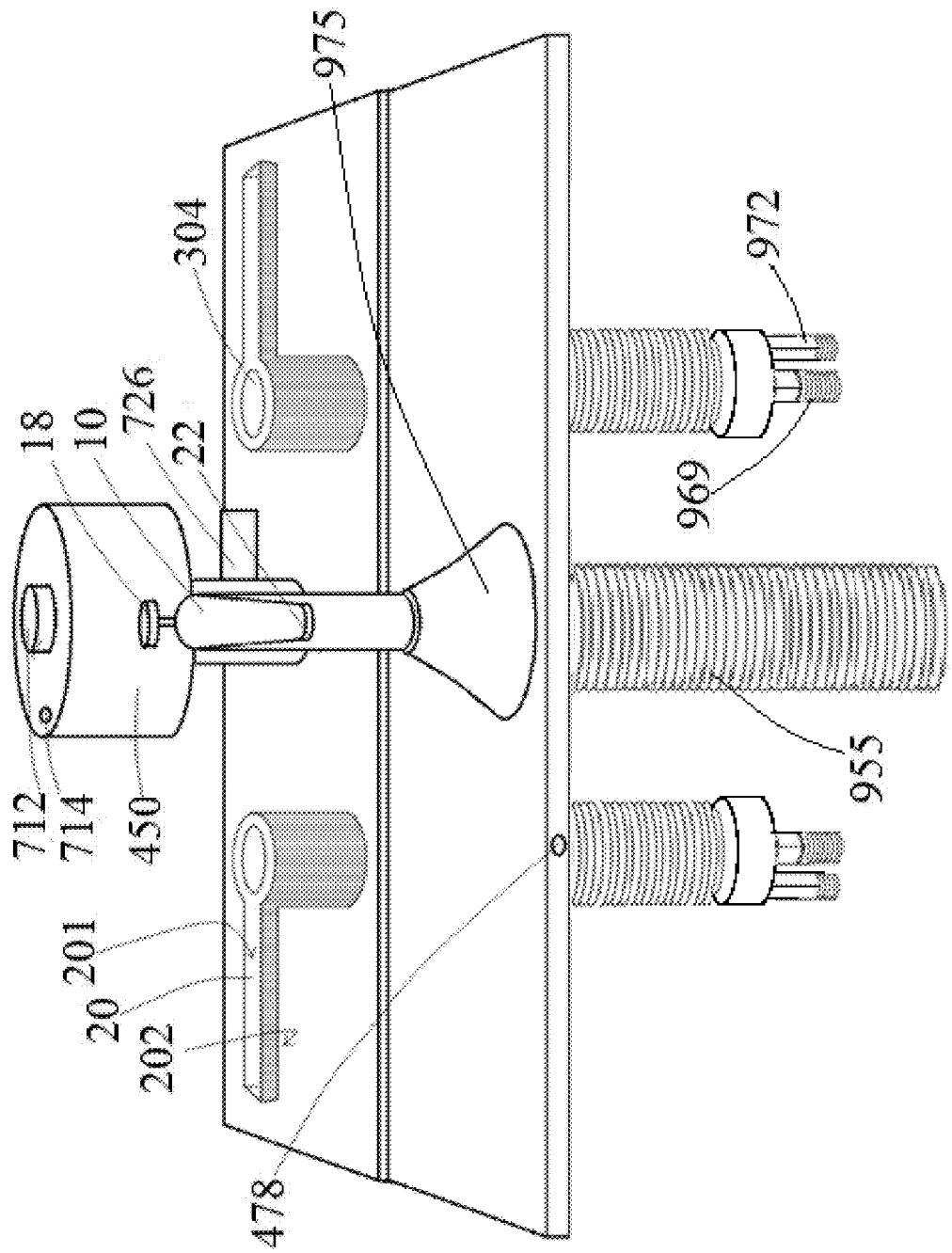
FIG. 101 shows a configuration of the assembly of the invention when mounted with a wash basin and the detergent reservoir unit.

Referring to FIG. 101, what is shown is the configuration of FIG. 100 assembled with the detergent reservoir unit 450 in region 487. Said access opening 487 is spirally grooved to be compatible with the externally spirally grooved portion 724 of reservoir unit 450 such that when portion 724 is spiraled into access 487 said detergent reservoir is firmly attached to the detergent activation unit.

Figure 102:
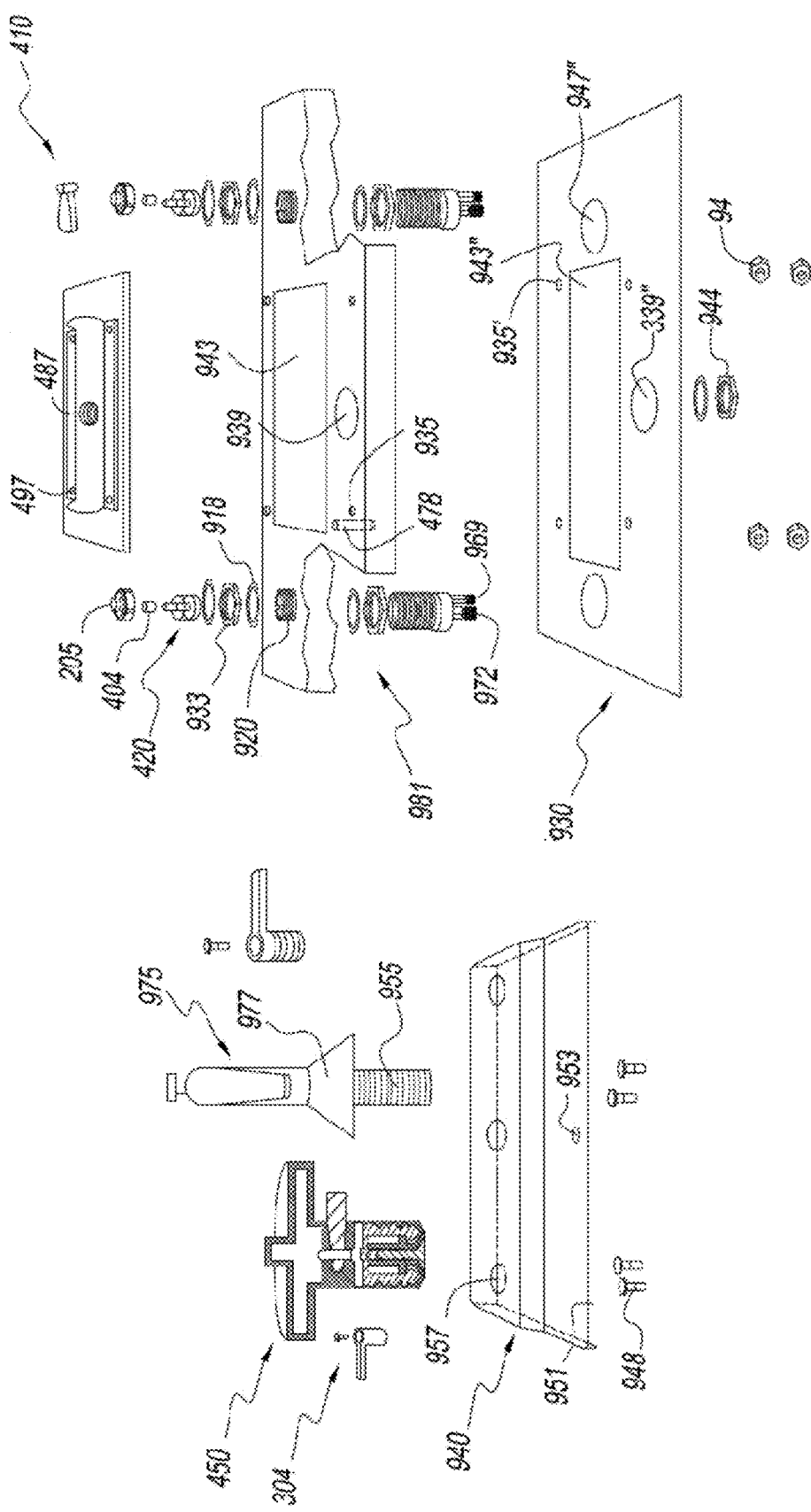
FIG. 102 shows and exploded view of the configuration of the assembly of the invention.

Referring to FIG. 102 what is shown is an exploded conceptual view of an embodiment of the invention with 35 under cover plate 930. The diameter of openings 947" of said undercover plate 930 is superior to that the most significant diameter of nut 933 thus minimizing interaction influence with the cartridge unit when the detergent activation unit is being activated.

Additionally, said under cover plate 930 interfaces securely with mounting 981 when nut 944 is attached to region 955 of spout 10 shown in FIG. 102; in such a manner said nut 944 functions to secure 930 to the lower face 981. Said under-cover plate is further stabilized when screws 948 are introduced from the upper surface of 498 through openings 497 of said 498 then through openings 935 of 981 and then through openings 935" of 930 thus enabling screw fasteners to be chosen and be applied to firmly bond together the body 465 the of detergent activation unit 430, the mounting block 981 and said undercover plate 930 by one or more screw nut fasteners 942.

Referring to FIGS. 103*a*, 103*b* and 103*c*, what is shown is another embodiment of the water line system into the cartridge unit and water line system out of the cartridge unit for the invention. The embodiment shown for FIG. 103*a*, FIG. 103*b* and FIG. 103*c* are an alternative for what has been previously described and thus only information related to this embodiment for installation and assembly needs to be described. The valve chamber is composed of an inlet tube 961', a main tube body 920' and an outlet/inlet sleeve 963'. The inlet tube 961' is preferably made from copper of brass or stainless steel and formed with an inlet tunnel 70'. The outer circumference of the upper end of the inlet tube 961' is formed with an annular engaging section 958' with a larger diameter. The middle portion is milled to form a stepped section. An annular flow guiding rib 967' with a larger diameter is adjacent to the lower side of the stepped section. A water sealing ring 119' is fitted under the flow guiding rib 967'. The lower end of the inlet tube 961' under the flow guiding rib 967' is milled with a locking outer thread section 964'. The main tube body 920' is also made from copper, brass or stainless steel and milled to form an internal receiving tunnel 901'.

The inner circumference of the receiving tunnel 901' near the lower end thereof is formed with an annular stop section 925'. The outer circumference of the upper end of the main tube body 920' is formed with an outer thread section 921' with a smaller diameter. The edge of the upper opening is cut with two diametric notches 921'. The middle portion of the main tube body 920' is formed with a main outer thread section 903' with a certain length.

The lower end of the main tube body 920' under the main thread section 903' is a smaller diameter section milled with fastening outer thread section 902'. A water sealing ring 117' is fitted on the small diameter section. The out/let sleeve 963' is made by pressing cast. The center thereof is with a stepped adapting flow passage 910. The opening of the larger diameter section of the adapting flow passage 910' is formed with a fastening inner thread section 904' and the smaller diameter section thereof is formed with a locking inner thread section 909'. A lower side of the outlet/inlet tube 50' is formed with an inlet tube 908' and a lateral side thereof is formed with an outlet tube 906'. The inlet tube 908' and the outlet tube 906' both communicate with the adapting flow passage 910'. In addition, the outer circumference of the end of the inlet tube 908' is formed with an inlet outer thread section 907' while the outer circumference of the end of the tube 906' is formed with an outlet outer thread section 905'.

Figure 104:
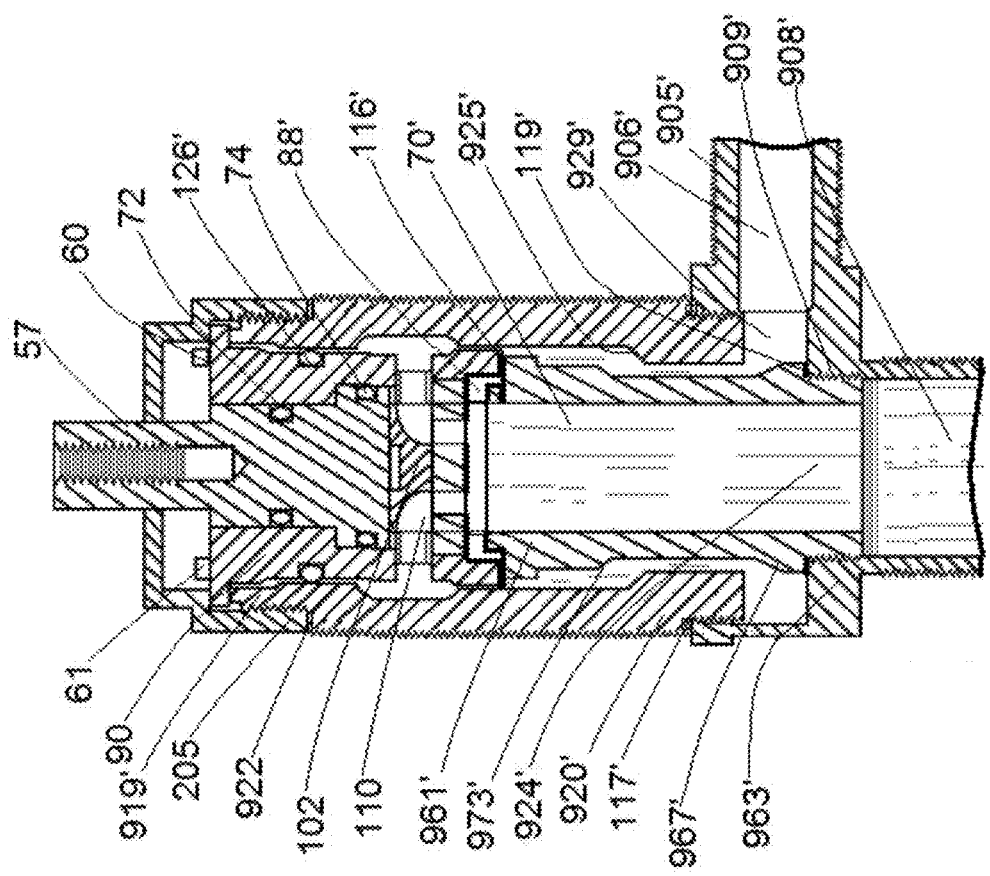
FIG. 104 shows a section of the assembly of the cartridge, bonnet nut, inlet interfacing member 981', cartridge mounting and stabilizing member 920' and member 963'.

Referring to FIG. 104, when assembled the inlet tube 961' is first fitted with the receiving tunnel 901' of the main tube body 920' with the engaging section 958' engaged with stop section 925' of main tube body 920'. At this time, the inlet tube 961' is preliminary assembled with the main tube body 920' with locking outer thread section 964' of the inlet tube 961' extending out of the main tube body 920' to be screwed in with the locking inner thread section 909' of the outlet/inlet sleeve 963'. The locking outer thread section 47' 902' of the main tube body 920' is screwed with the fastening inner thread section 904' of the outlet/inlet tube 963'. Under such circumstances the inlet tube 961', main tube body 920' and the outlet/inlet tube 963' are integrally associated together. A valve chamber xxx' with a certain depth is defined between the upper end of the engaging section 958' of the inlet tube 961 and the upper opening of the receiving tunnel 901' of the main tube body 920'. Also, an annular outlet passage 900' with a certain size is defined between the outer circumference wall of the tube 961' and the inner circumference walls of the main tube body 920' and the large diameter section of the outlet/inlet sleeve 963'. At this moment, the insertion of the cartridge unit and stabilization of the cartridge by bonnet nut completes the assembly for the functioning of the cartridge chamber.

Figure 107:
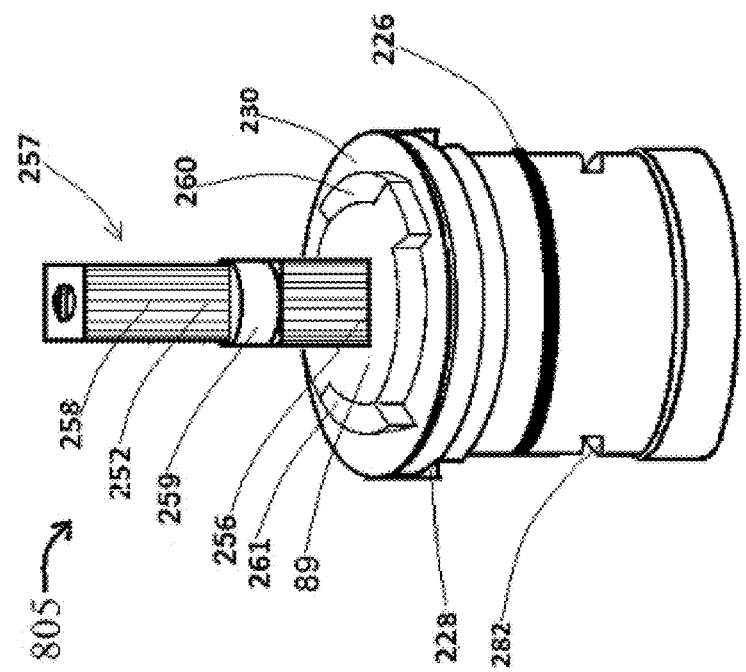
FIG. 107 shows the cartridge unit assembled with alternative stop 89 and alternative stem 104'.
Figure 106:
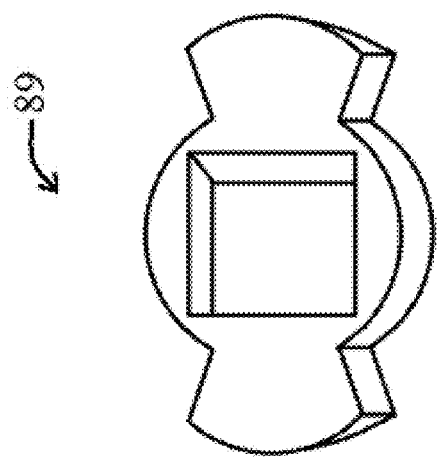
FIG. 106 shows an alternative configuration 89' for the stop interception.
Figure 105:
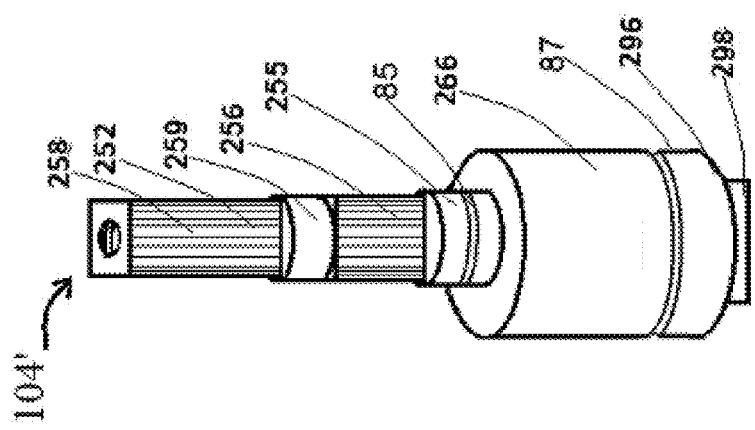
FIG. 105 shows an alternative configurative 104' for the stem unit of the invention.
Figure 110:
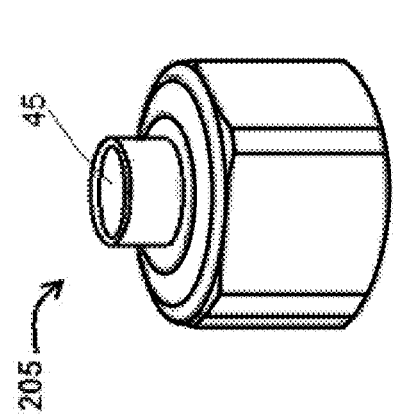
Figure 111:
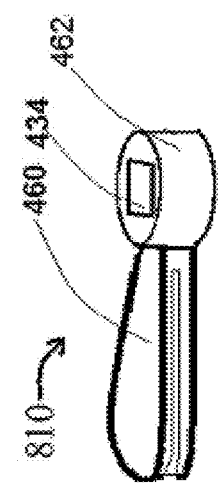
Figure 108:
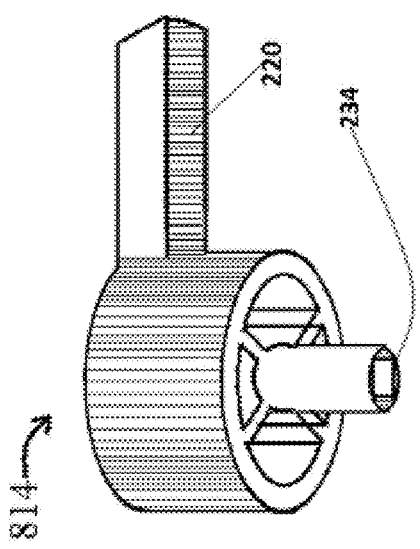
FIG. 108 shows an alternative configuration for the lever handle unit for a rectangular cross-section inlet for the cartridge stem.
Figure 109:
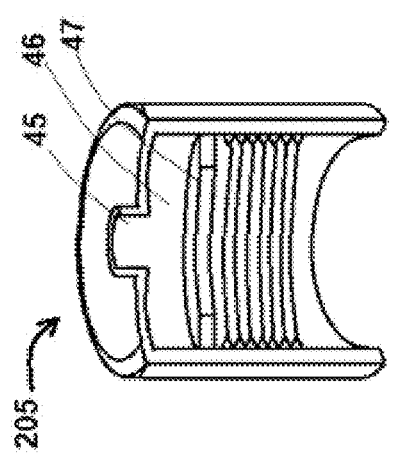

Referring to FIG. 105 what is shown is an alternative embodiment of the stem portion 57' for the cartridge 604. Said stem portion 57' has an upper region 258 configured as a rectangular prism for inserting said portion 258 into rectangular access 234 of the lever assembly 814; said lever assembly 814 is shown in FIG. 108. Contiguous with portion 258 of stem portion 258 is cam attachment region 252; said region 252 fits into rectangular access opening 234 of cam unit 810. Cam unit 810 is shown in FIG. 111. Contiguous with region 252 of stem portion 57' is a cylindrical region 259 were said cylindrical region 259 fits into smooth inner circular opening 45 of bonnet nut 205 shown in FIG. 110. Said bonnet nut 205 when assembled is firmly attached to cartridge housing 920 and thus said bonnet nut is disabled from motion when the lever assembly 814 is rotated. A section view of bonnet nut 205 is shown in FIG. 109. Referring to FIG. 106 what is shown is an alternative embodiment 89 for intercepting body stops 260 and 261 and thus restricting the rotation of lever unit to its maximum predetermined angle of rotation. Said embodiment 89 has rectangular opening that intimately fits over region 256 of region 57' of the stem unit 104' shown in FIG. 105. FIG. 107 shows a configuration of 89 fitted onto the upper surface 230 of the cartridge body 90.

Figure 112:
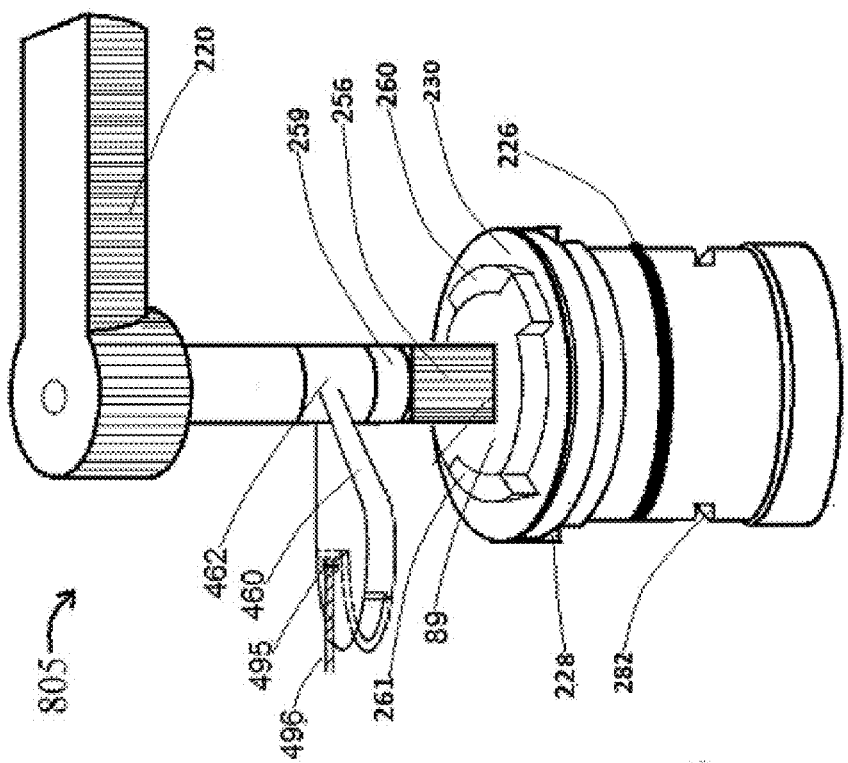

Referring to FIG. 112, when the cartridge stem is already inserted in body passage 68 member 89 is first attached to region 256; bonnet nut 814 is then applied to the cartridge housing 920 to stabilize the cartridge unit; bonnet nut 814 now completely encloses member 89. Subsequently cam body unit 810 is attached above the bonnet nut and followed by attachment of lever assembly 814.

Other features and advantages will become apparent from the following description preferably taken relative to the accompanying drawings, which in combination discloses an embodiment of the invention. It is apparent for example, that a dispensing of detergent while enabling reduction in flow rate from the faucet' spout of the invention when the lever is turned its maximum predetermined angle enables an embodiment of the invention where the lever remains unwashed for appropriate dimensioning of said lever.

What is claimed is:

1. A washable faucet lever with cam-activated detergent dispenser comprising:
    a lever cartridge having a stem operably coupled to a hand lever configured to rotate in a lever axis of rotation and operably coupled to a cam member having an arcuate outer surface and configured to rotate in a cam axis of rotation parallel to and simultaneous with the lever axis of rotation;
    a detergent reservoir member configured to house a liquid detergent therein, having an internal channel configured to receive the liquid detergent, and having a reservoir valve coupled to the detergent reservoir member and operably configured to selectively translate to open and permit flow of the liquid detergent through the internal channel and to close and restrict flow of the liquid detergent through the internal channel;
    an encasement member defining an enclosed region therein, defining an outlet, having an outlet valve disposed within the enclosed region and operably configured to selectively translate to open and permit flow of the liquid detergent through the outlet, to close and restrict flow of the liquid detergent through the outlet, and biased with a spring retained by the encasement member; and
    a piston disposed within the enclosed region, having a follower translatably coupled to the arcuate outer surface of the cam member, and operably configured to translate within the enclosed region upon rotating the hand lever in the lever axis of rotation to selectively and simultaneously displace the reservoir valve and outlet valve to permit flow of the liquid detergent through the internal channel, into the enclosed region, and out through the outlet.

2. The washable faucet lever with cam-activated detergent dispenser according to claim 1, wherein the cam member further comprises:
    a greater sloping side surface and a lesser sloping side forming the arcuate outer surface.

3. The washable faucet lever with cam-activated detergent dispenser according to claim 1, wherein the cam member is of an obolid shape.

4. The washable faucet lever with cam-activated detergent dispenser according to claim 1, wherein the arcuate outer surface of the cam member defines a channel guide for the follower.

5. The washable faucet lever with cam-activated detergent dispenser according to claim 4, wherein the follower further comprises:
    a roller bearing configured to translate within the channel guide.

6. The washable faucet lever with cam-activated detergent dispenser according to claim 1, wherein the cam member is constrained to rotate in a single horizontal plane.

7. The washable faucet lever with cam-activated detergent dispenser according to claim 1, wherein the piston is configured to translate in a single and linear axis of translation within the enclosed region upon rotating the hand lever in the lever axis of rotation to selectively and simultaneously displace the reservoir valve and outlet valve.

8. The washable faucet lever with cam-activated detergent dispenser according to claim 1, wherein the piston is configured to translate within the enclosed region upon rotating the hand lever in the lever axis of rotation and in one of a counterclockwise or clockwise rotation to selectively and simultaneously displace the reservoir valve and outlet valve.

9. The washable faucet lever with cam-activated detergent dispenser according to claim 1, wherein the cam axis of rotation is coaxial with respect to the lever axis of rotation.

10. The washable faucet lever with cam-activated detergent dispenser according to claim 1, further comprising:
    a mounting base defining an opening with the lever cartridge disposed therein and coupled thereto with at least one fastener, coupled to the encasement member with at least one fastener, and defining an opening with a faucet member disposed therein, defining a spout with an opening configured to emit liquid therethrough, and coupled thereto with at least one fastener; and
    a protective covering defining an opening with the lever cartridge disposed therein, covering the encasement member, defining an opening with the faucet member disposed therein, and defining an opening with the detergent reservoir member disposed therein.

11. The washable faucet lever with cam-activated detergent dispenser according to claim 10, wherein the protective covering defines an internal channel fluidly coupled to the outlet and configured to permit flow of the liquid detergent therethrough.

12. The washable faucet lever with cam-activated detergent dispenser according to claim 1, wherein the reservoir valve is biasedly coupled to the detergent reservoir member with a spring.

13. The washable faucet lever with cam-activated detergent dispenser according to claim 1, wherein the internal channel is spatially configured in the detergent reservoir member to enable gravity-based receipt of the liquid detergent therein.

\* \* \* \* \*